US012611779B1

(12) United States Patent
Wei et al.

(10) Patent No.: US 12,611,779 B1
(45) Date of Patent: Apr. 28, 2026

(54) CALIBRATION METHOD, AUTONOMOUS MOBILE MACHINE AND CONTROL SYSTEM

(71) Applicant: VisionNav Robotics USA Inc., Acworth, GA (US)

(72) Inventors: Lei Wei, Acworth, GA (US); Bingchuan Yang, Acworth, GA (US); Yujie Lu, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/403,421

(22) Filed: Nov. 28, 2025

(51) Int. Cl.
| | |
|---|---|
| B25J 9/16 | (2006.01) |
| B25J 5/00 | (2006.01) |
| B25J 19/02 | (2006.01) |

(52) U.S. Cl.
CPC ............. B25J 9/1692 (2013.01); B25J 5/007 (2013.01); B25J 9/1697 (2013.01); B25J 19/022 (2013.01); B25J 19/023 (2013.01)

(58) Field of Classification Search
CPC ........ B25J 9/1692; B25J 5/007; B25J 9/1697; B25J 19/022; B25J 19/023
USPC ................. 700/245–258; 318/568.11–568.25
See application file for complete search history.

(56) References Cited

U.S. PATENT DOCUMENTS

| | | | | |
|---|---|---|---|---|
| 4,698,775 | A * | 10/1987 | Koch | G05D 1/027 |
| | | | | 414/940 |
| 9,986,233 | B1 * | 5/2018 | Curlander | H04N 17/002 |

| | | | | |
|---|---|---|---|---|
| 10,447,995 | B1 * | 10/2019 | Curlander | H04N 13/332 |
| 10,554,950 | B1 * | 2/2020 | Curlander | H04N 13/332 |
| 10,860,871 | B2 * | 12/2020 | Zhu | G01S 7/4972 |

(Continued)

FOREIGN PATENT DOCUMENTS

| | | |
|---|---|---|
| CN | 113739712 A | 12/2021 |
| CN | 114047487 A | 2/2022 |

(Continued)

OTHER PUBLICATIONS

Hu et al. "TEScalib: Targetless Extrinsic Self-Calibration of LiDAR and Stereo Camera for Automated Driving Vehicles with Uncertainty Analysis"; 2022 IEEE/RSJ International Conference on Intelligent Robots and Systems (IROS); Oct. 23-27, 2022, Kyoto, Japan; 978-1-6654-7927-1/22 (Year: 2022).*

(Continued)

*Primary Examiner* — Jaime Figueroa
(74) *Attorney, Agent, or Firm* — Westbridge IP LLC

(57) ABSTRACT

A calibration method is applied to an autonomous mobile machine provided with a LiDAR to be calibrated. The method includes: acquiring first point cloud data of a calibration room; calculating, based at least on the first point cloud data and coordinate system data of the autonomous mobile machine, a first transformation relationship; acquiring second point cloud data of a marker in the calibration room through the LiDAR to be calibrated; performing registration on the second point cloud data and the first point cloud data to obtain a second transformation relationship; and acquiring, based on the first transformation relationship and the second transformation relationship, a transformation relationship between the coordinate system of the LiDAR to be calibrated and the coordinate system of the autonomous mobile machine as a calibration result.

20 Claims, 22 Drawing Sheets

(56) References Cited

U.S. PATENT DOCUMENTS

| 11,460,855 | B1 * | 10/2022 | Lim | G05D 1/024 |
|---|---|---|---|---|
| 12,085,678 | B1 * | 9/2024 | Shotan | G08G 1/22 |
| 12,288,294 | B2 * | 4/2025 | Singh | G06T 17/10 |
| 2018/0313942 | A1 * | 11/2018 | Wu | G01S 17/42 |
| 2019/0392228 | A1 * | 12/2019 | Zhu | G01S 17/931 |
| 2020/0180160 | A1 * | 6/2020 | Lu | B24B 21/006 |
| 2022/0155776 | A1 * | 5/2022 | Qian | G05D 1/0011 |
| 2022/0244395 | A1 * | 8/2022 | Chen | G01S 17/86 |
| 2022/0365186 | A1 * | 11/2022 | Schwiesow | G01S 7/497 |
| 2023/0008398 | A1 * | 1/2023 | Xie | G01S 17/42 |
| 2023/0145082 | A1 * | 5/2023 | Naikal | G01S 13/931 |
| | | | | 356/4.01 |
| 2023/0326216 | A1 * | 10/2023 | Duan | G06V 20/58 |
| | | | | 382/181 |
| 2024/0104879 | A1 * | 3/2024 | Jiang | G06V 20/56 |
| 2024/0142588 | A1 * | 5/2024 | Alismail | G01S 17/89 |
| 2024/0183984 | A1 * | 6/2024 | Song | G01S 17/931 |
| 2024/0393443 | A1 * | 11/2024 | Shotan | G05D 1/0291 |
| 2024/0426987 | A1 * | 12/2024 | Kim | G01S 7/497 |
| 2024/0426988 | A1 * | 12/2024 | Kim | G06T 7/80 |
| 2024/0426989 | A1 * | 12/2024 | Kim | G01S 17/86 |
| 2024/0427019 | A1 * | 12/2024 | Kim | G01S 17/86 |
| 2025/0060285 | A1 * | 2/2025 | Longo | B25J 9/06 |

FOREIGN PATENT DOCUMENTS

| CN | 112462350 | B | 4/2023 |
|---|---|---|---|
| CN | 117889785 | A | 4/2024 |
| CN | 119338920 | A | 1/2025 |

OTHER PUBLICATIONS

Wu et al; "AFLI-Calib: Robust LiDAR-IMU extrinsic self-calibration based on adaptive frame length LiDAR odometry"; 2023; Elsevier; ISPRS Journal of Photogrammetry and Remote Sensing; vol. 199, May 2023, pp. 157-181 (Year: 2023).*

Taylor, Zachary; Nieto, Juan—Parameterless Automatic Extrinsic Calibration of Vehicle Mounted Lidar-Camera Systems; Mar. 31, 2014; ResearchGate; Conference: ICRA 2014 LTA Workshop; DO 10.13140/2.1.4648.3200; (Year: 2014).*

Song et al.; "Galibr: Targetless LiDAR-Camera Extrinsic Calibration Method via Ground Plane Initialization"; 2024 IEEE Intelligent Vehicles Symposium (IV) Jun. 2-5, 2024. Jeju Island, Korea; 979-8-3503-4881-1/24 (Year: 2024).*

* cited by examiner

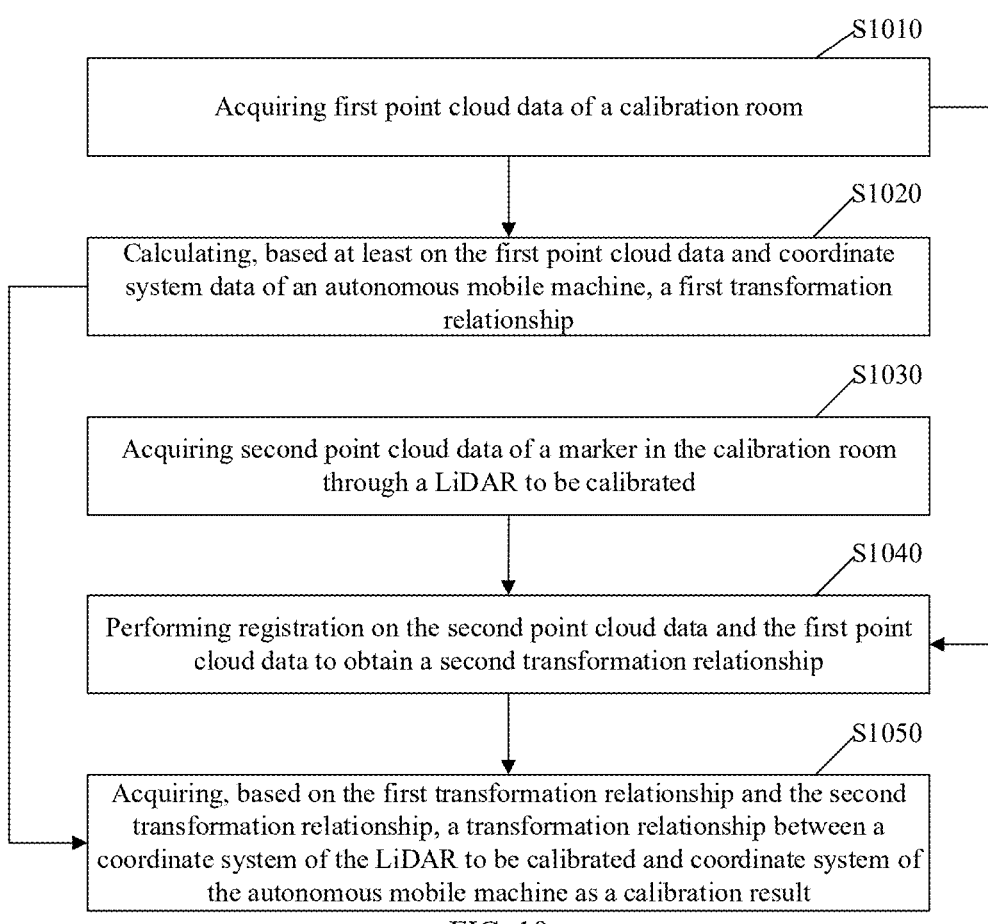

S1010

Acquiring first point cloud data of a calibration room

S1020

Calculating, based at least on the first point cloud data and coordinate system data of an autonomous mobile machine, a first transformation relationship

S1030

Acquiring second point cloud data of a marker in the calibration room through a LiDAR to be calibrated

S1040

Performing registration on the second point cloud data and the first point cloud data to obtain a second transformation relationship

S1050

Acquiring, based on the first transformation relationship and the second transformation relationship, a transformation relationship between a coordinate system of the LiDAR to be calibrated and coordinate system of the autonomous mobile machine as a calibration result

FIG. 10

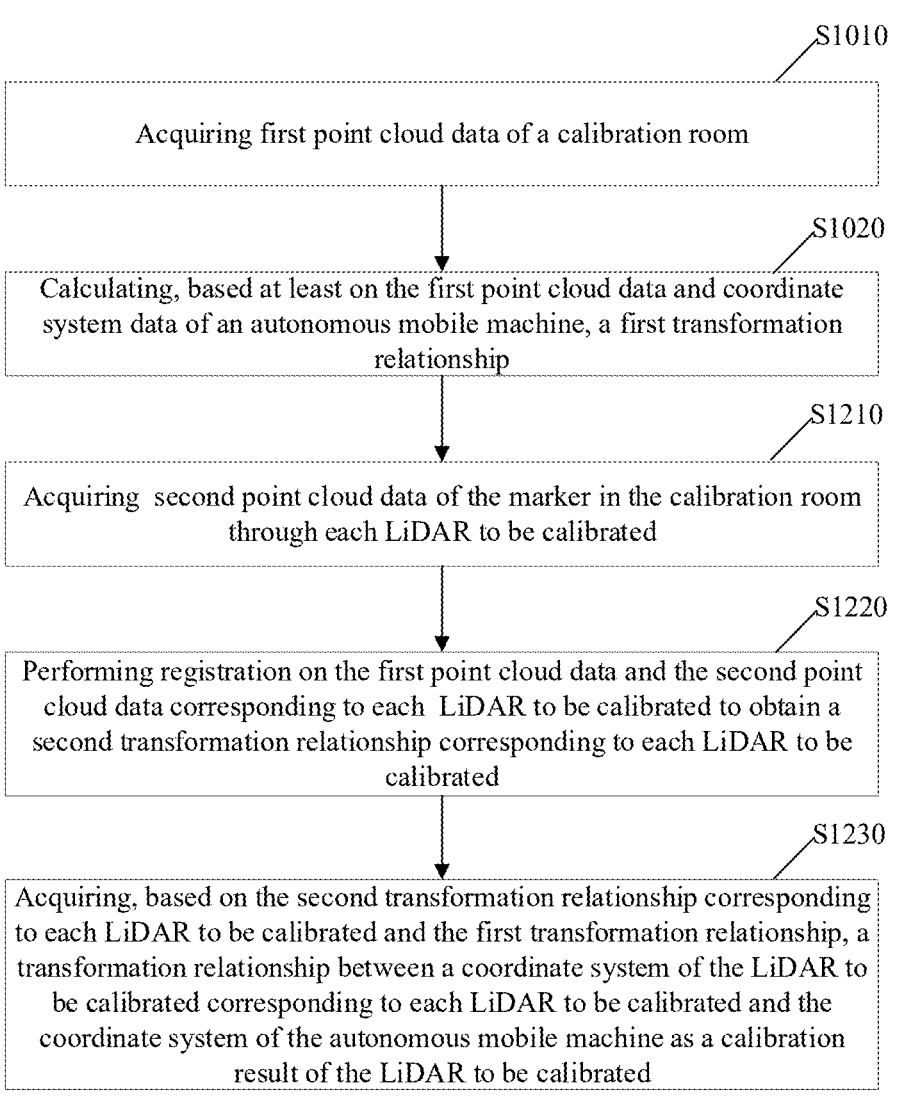

S1010

Acquiring first point cloud data of a calibration room

S1020

Calculating, based at least on the first point cloud data and coordinate system data of an autonomous mobile machine, a first transformation relationship

S1210

Acquiring second point cloud data of the marker in the calibration room through each LiDAR to be calibrated

S1220

Performing registration on the first point cloud data and the second point cloud data corresponding to each LiDAR to be calibrated to obtain a second transformation relationship corresponding to each LiDAR to be calibrated

S1230

Acquiring, based on the second transformation relationship corresponding to each LiDAR to be calibrated and the first transformation relationship, a transformation relationship between a coordinate system of the LiDAR to be calibrated corresponding to each LiDAR to be calibrated and the coordinate system of the autonomous mobile machine as a calibration result of the LiDAR to be calibrated

FIG. 11

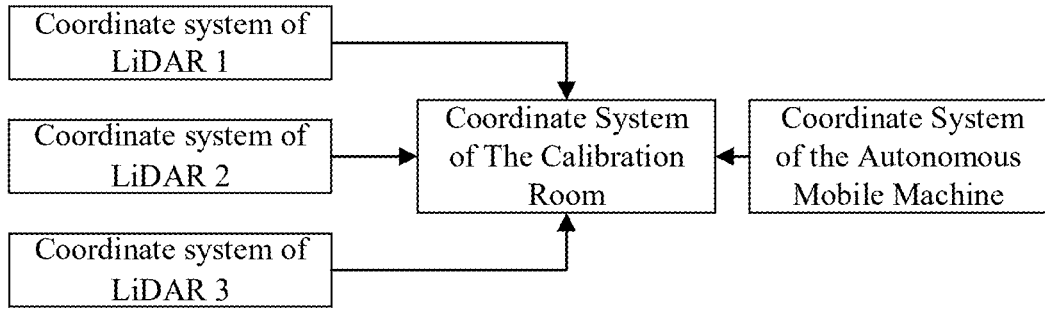

Coordinate system of LiDAR 1

Coordinate system of LiDAR 2

Coordinate system of LiDAR 3

Coordinate System of The Calibration Room

Coordinate System of the Autonomous Mobile Machine

FIG. 12

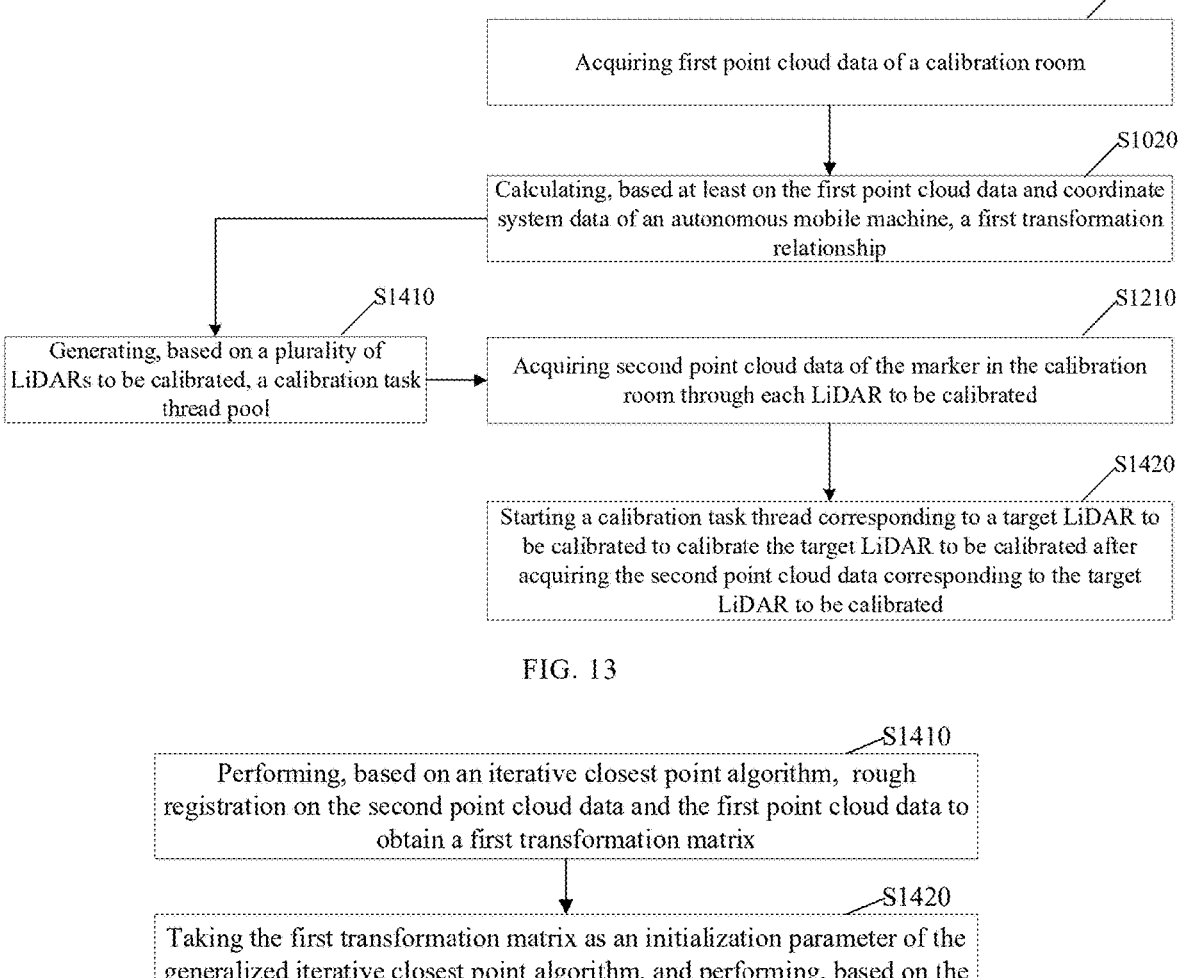

S1010

Acquiring first point cloud data of a calibration room

S1020

Calculating, based at least on the first point cloud data and coordinate system data of an autonomous mobile machine, a first transformation relationship

S1410

Generating, based on a plurality of LiDARs to be calibrated, a calibration task thread pool

S1210

Acquiring second point cloud data of the marker in the calibration room through each LiDAR to be calibrated

S1420

Starting a calibration task thread corresponding to a target LiDAR to be calibrated to calibrate the target LiDAR to be calibrated after acquiring the second point cloud data corresponding to the target LiDAR to be calibrated

Performing, based on an iterative closest point algorithm, rough registration on the second point cloud data and the first point cloud data to obtain a first transformation matrix

S1420

Taking the first transformation matrix as an initialization parameter of the generalized iterative closest point algorithm, and performing, based on the generalized iterative closest point algorithm, the fine registration on the second point cloud data and the first point cloud data to obtain the second transformation relationship

FIG. 14

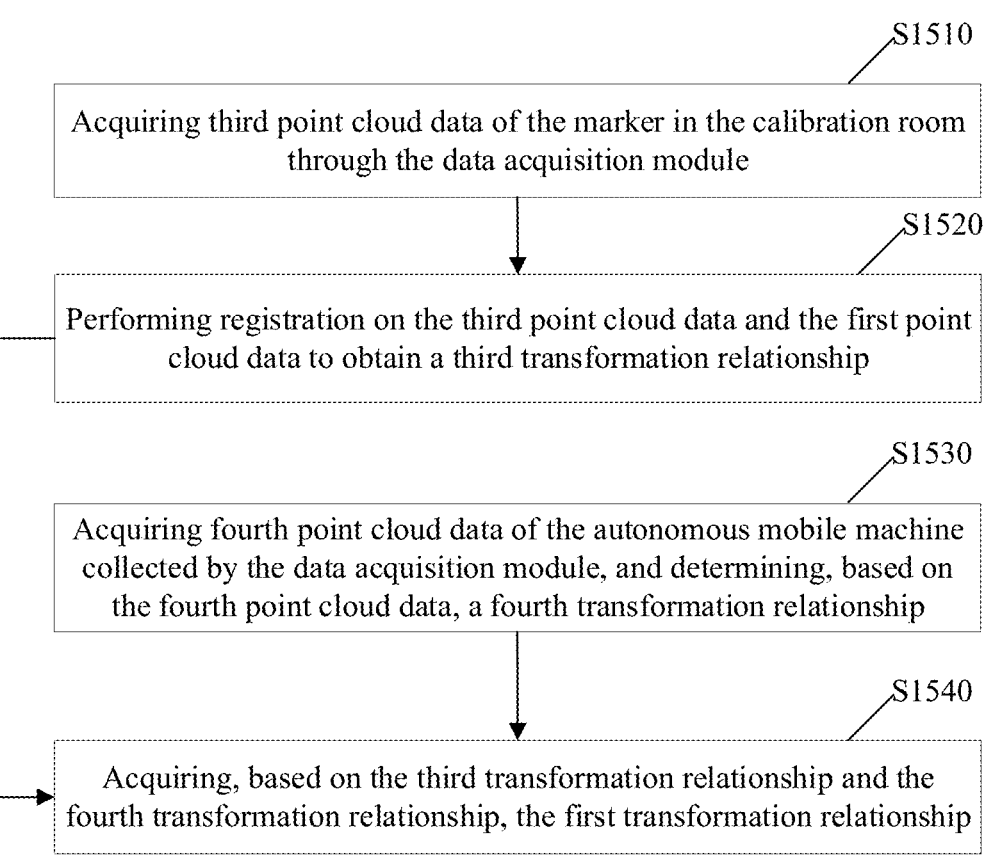

S1510

Acquiring third point cloud data of the marker in the calibration room through the data acquisition module

S1520

Performing registration on the third point cloud data and the first point cloud data to obtain a third transformation relationship

S1530

Acquiring fourth point cloud data of the autonomous mobile machine collected by the data acquisition module, and determining, based on the fourth point cloud data, a fourth transformation relationship

S1540

Acquiring, based on the third transformation relationship and the fourth transformation relationship, the first transformation relationship

Acquiring coordinates of a center of the autonomous mobile machine in the coordinate system of the autonomous mobile machine

S1620

Calculating, based on the fourth point cloud data of the autonomous mobile machine collected by the data acquisition module, coordinates of the center of the autonomous mobile machine in the coordinate system of the data acquisition module

S1630

Determining, based on the coordinates of the center of the autonomous mobile machine in the coordinate system of the data acquisition module and the coordinates of the center of the autonomous mobile machine in the coordinate system of the autonomous mobile machine, the fourth transformation relationship

FIG. 16

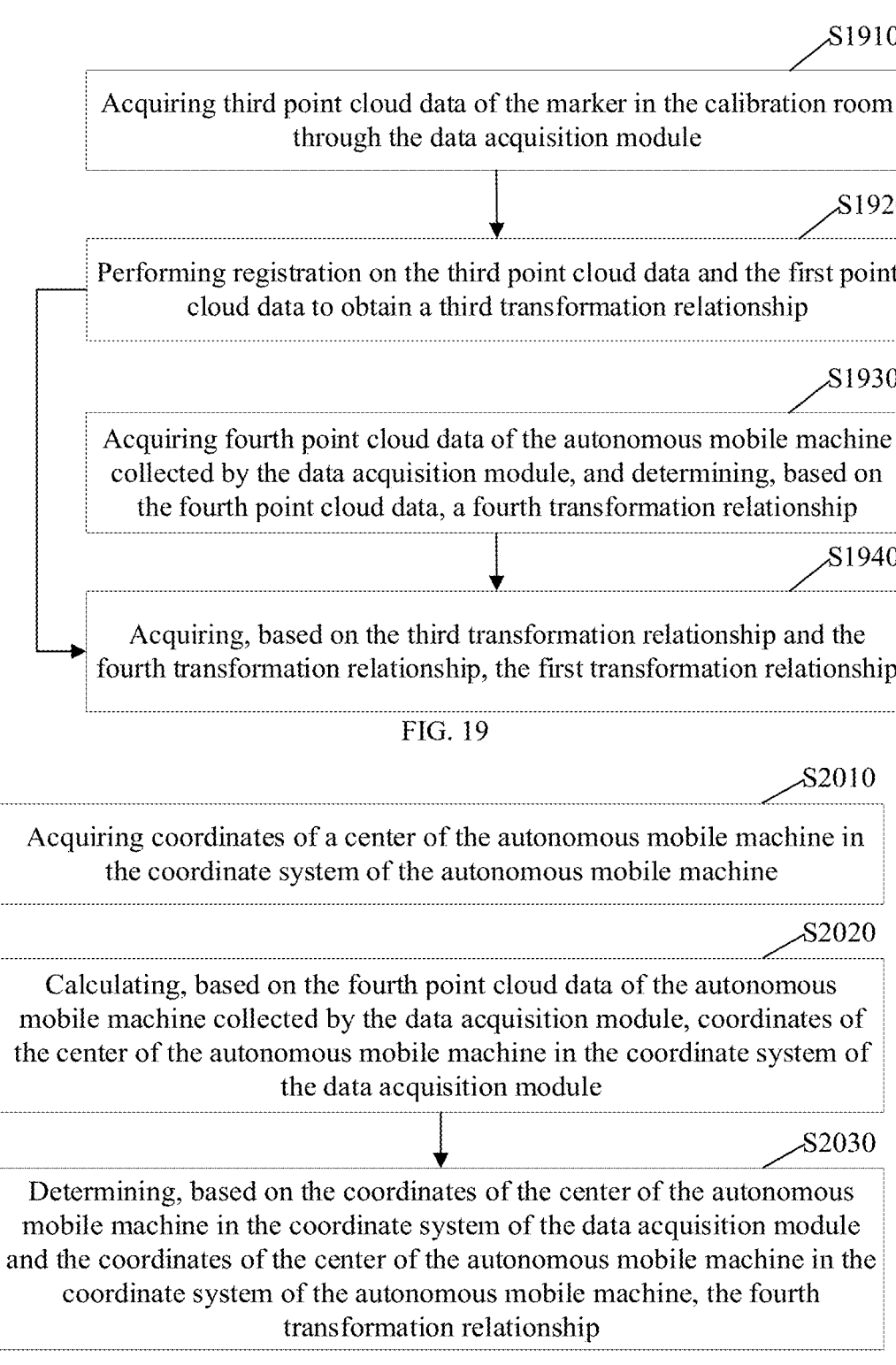

S1910

Acquiring third point cloud data of the marker in the calibration room through the data acquisition module

S1920

Performing registration on the third point cloud data and the first point cloud data to obtain a third transformation relationship

S1930

Acquiring fourth point cloud data of the autonomous mobile machine collected by the data acquisition module, and determining, based on the fourth point cloud data, a fourth transformation relationship

S1940

Acquiring, based on the third transformation relationship and the fourth transformation relationship, the first transformation relationship

Acquiring coordinates of a center of the autonomous mobile machine in the coordinate system of the autonomous mobile machine

S2020

Calculating, based on the fourth point cloud data of the autonomous mobile machine collected by the data acquisition module, coordinates of the center of the autonomous mobile machine in the coordinate system of the data acquisition module

S2030

Determining, based on the coordinates of the center of the autonomous mobile machine in the coordinate system of the data acquisition module and the coordinates of the center of the autonomous mobile machine in the coordinate system of the autonomous mobile machine, the fourth transformation relationship

Determining, based on the centroid, a target region corresponding to the first reflective layer

S2920

Extracting, based on the target region, the point cloud of the first reflective layer

Determining point cloud of the first reflective layer from the sixth point cloud data

S3020

Performing plane fitting based on the point cloud of the first reflective layer to obtain the second point cloud plane

FIG. 30

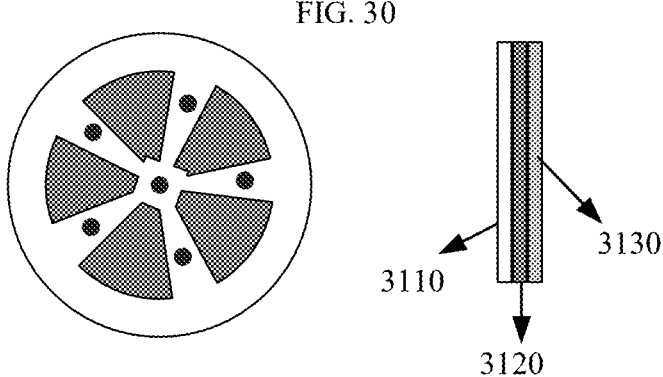

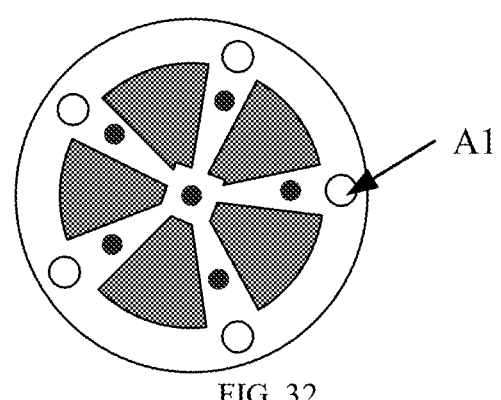

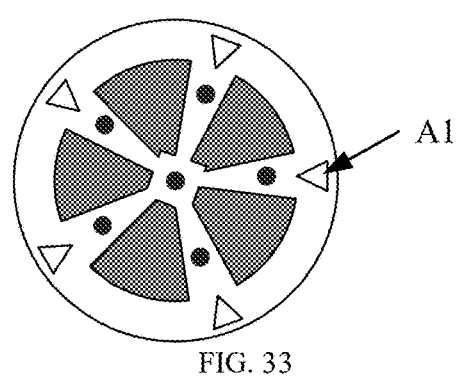

Extracting a point cloud of the second reflective layer from the sixth point cloud data

S3420

Determining a centroid of the point cloud of the second reflective layer, and determining, based on the centroid, the point cloud of the first reflective layer

Determining a normal vector of the first point cloud plane, center coordinates of the second point cloud plane, and center coordinates of the third point cloud plane

S3520

Determining, based on the normal vector of the first point cloud plane, the center coordinates of the second point cloud plane, and the center coordinates of the third point cloud plane, the center of the autonomous mobile machine

FIG. 35

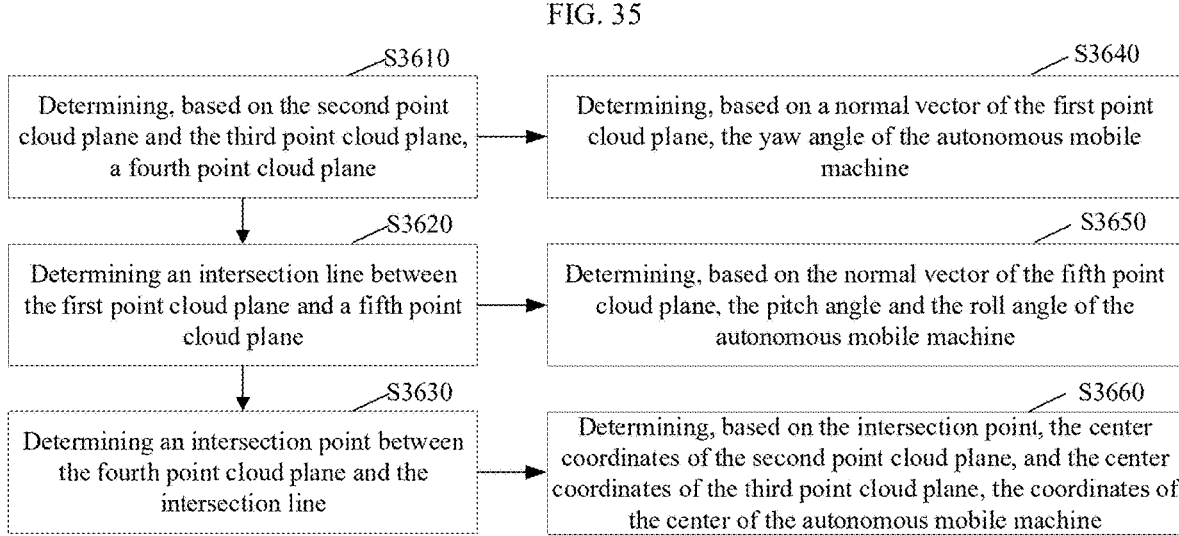

S3610

Determining, based on the second point cloud plane and the third point cloud plane, a fourth point cloud plane

S3620

Determining an intersection line between the first point cloud plane and a fifth point cloud plane

S3630

Determining an intersection point between the fourth point cloud plane and the intersection line

S3640

Determining, based on a normal vector of the first point cloud plane, the yaw angle of the autonomous mobile machine

S3650

Determining, based on the normal vector of the fifth point cloud plane, the pitch angle and the roll angle of the autonomous mobile machine

S3660

Determining, based on the intersection point, the center coordinates of the second point cloud plane, and the center coordinates of the third point cloud plane, the coordinates of the center of the autonomous mobile machine

FIG. 36

Determining, based on the intersection point and the yaw angle, a first axis coordinate value of the center of the autonomous mobile machine

Determining, based on the center coordinates of the second point cloud plane and the center coordinates of the third point cloud plane, a second axis coordinate value of the center of the autonomous mobile machine

Determining, based on the first axis coordinate value, the second axis coordinate value, and the fifth point cloud plane, a third axis coordinate value of the center of the autonomous mobile machine

Acquiring, based on a sine value of the yaw angle and a target distance value, a first value

_S3820_

Acquiring, based on a first axis coordinate value of the intersection point and the first value, a second value

_S3830_

Acquiring, based on the first value and the second value, the first axis coordinate value of the center of the autonomous mobile machine, where the target distance value is a value of the distance from the first point cloud plane to the center of the autonomous mobile machine

FIG. 38

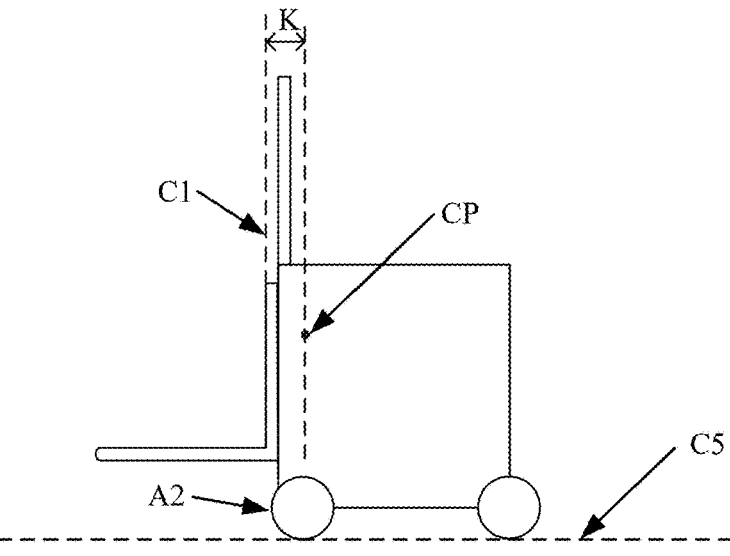

FIG. 39

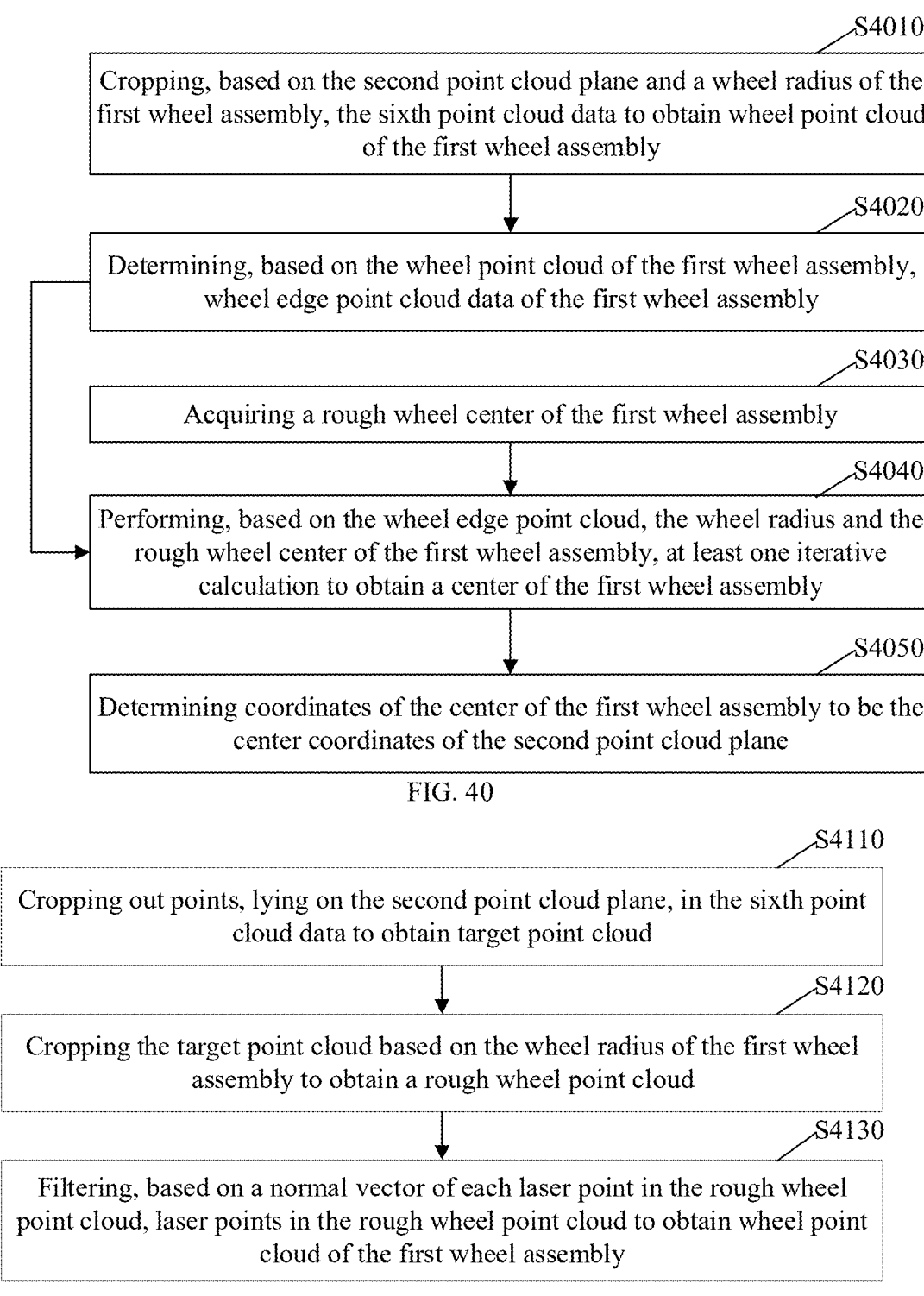

S4010

Cropping, based on the second point cloud plane and a wheel radius of the first wheel assembly, the sixth point cloud data to obtain wheel point cloud of the first wheel assembly

S4020

Determining, based on the wheel point cloud of the first wheel assembly, wheel edge point cloud data of the first wheel assembly

S4030

Acquiring a rough wheel center of the first wheel assembly

S4040

Performing, based on the wheel edge point cloud, the wheel radius and the rough wheel center of the first wheel assembly, at least one iterative calculation to obtain a center of the first wheel assembly

S4050

Determining coordinates of the center of the first wheel assembly to be the center coordinates of the second point cloud plane

Cropping out points, lying on the second point cloud plane, in the sixth point cloud data to obtain target point cloud

S4120

Cropping the target point cloud based on the wheel radius of the first wheel assembly to obtain a rough wheel point cloud

S4130

Filtering, based on a normal vector of each laser point in the rough wheel point cloud, laser points in the rough wheel point cloud to obtain wheel point cloud of the first wheel assembly

FIG. 41

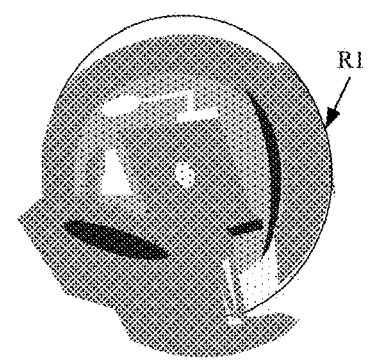

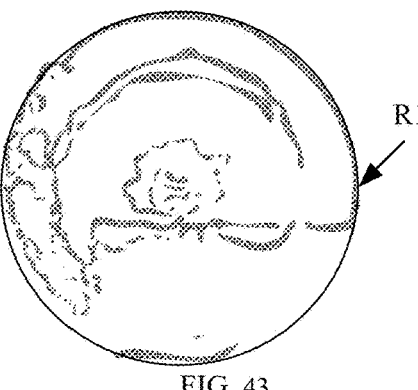

Acquiring rough wheel edge point cloud based on the wheel point cloud of the first wheel assembly and the wheel radius of the first wheel assembly

S4420

Performing circle fitting based on the rough wheel edge point cloud to obtain the wheel edge point cloud

Acquiring, based on point cloud data of the marking tool collected by the data acquisition module, position information of the marking tool

S4520

Acquiring, based on the position information of the marking tool and a relative positional relationship between the marking tool and the part to be measured, position information of the part to be measured

S4530

Extracting, based on the position information of the part to be measured, point cloud data of the part to be measured from the point cloud data of the marking tool collected by the data acquisition module

S4540

Determining, based on the point cloud data of the part to be measured, a structural parameter of the part to be measured

FIG. 45

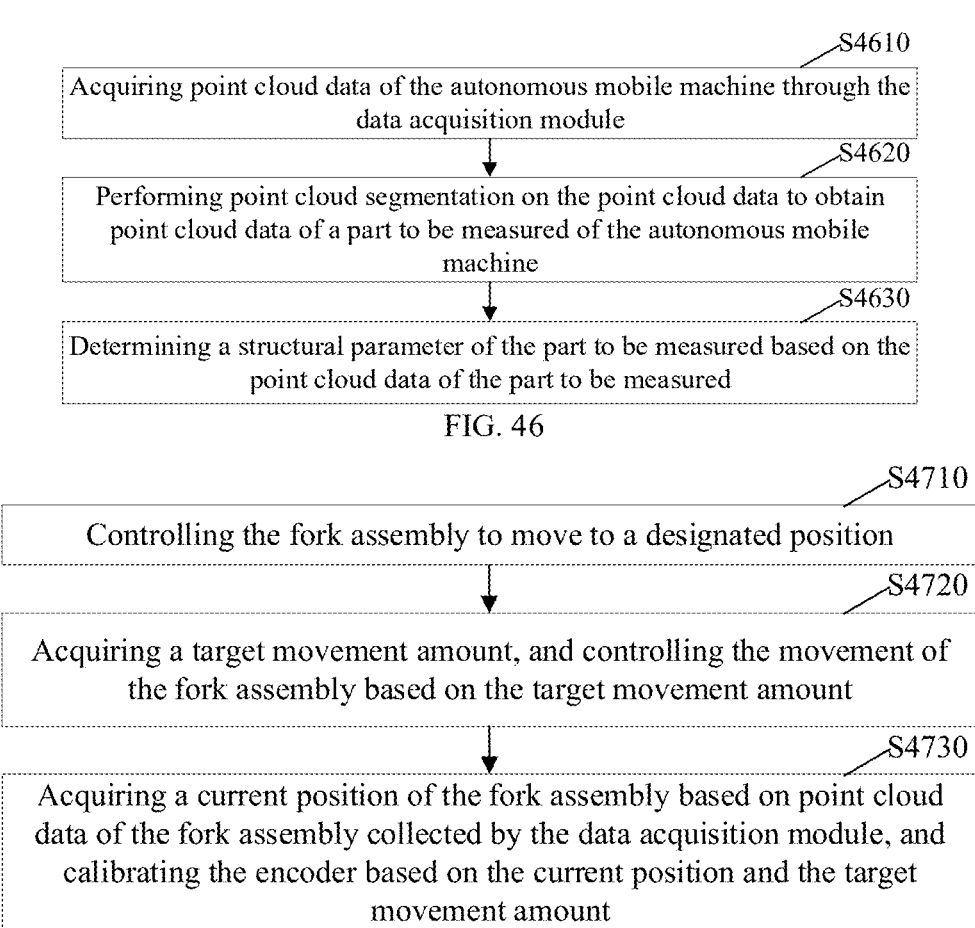

S4610

Acquiring point cloud data of the autonomous mobile machine through the data acquisition module

S4620

Performing point cloud segmentation on the point cloud data to obtain point cloud data of a part to be measured of the autonomous mobile machine

S4630

Determining a structural parameter of the part to be measured based on the point cloud data of the part to be measured

Controlling the fork assembly to move to a designated position

S4720

Acquiring a target movement amount, and controlling the movement of the fork assembly based on the target movement amount

S4730

Acquiring a current position of the fork assembly based on point cloud data of the fork assembly collected by the data acquisition module, and calibrating the encoder based on the current position and the target movement amount

FIG. 47

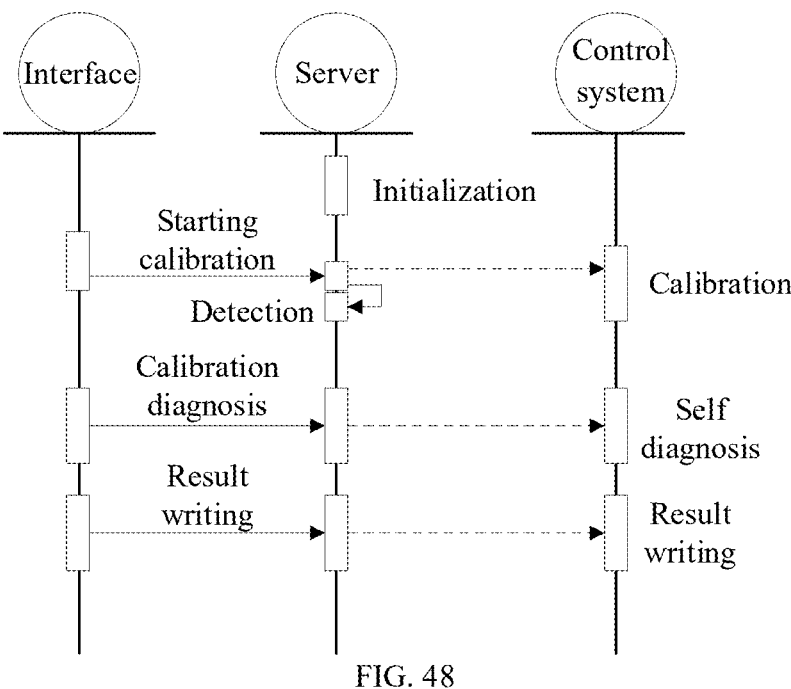

Preliminarily inspecting

S4920

Equipping a marking tool with a vehicle body

S4930

Parking the autonomous mobile machine at a designated position

S4940

Setting parameter and communication

S4950

Calibrating

S4960

Self-verifying

S4970

Adjusting a calibration result

S4980

Verifying an entire device

CALIBRATION METHOD, AUTONOMOUS MOBILE MACHINE AND CONTROL SYSTEM

TECHNICAL FIELD

The present disclosure relates to the field of calibration technologies, and in particular, to a calibration method, an autonomous mobile machine and a control system.

BACKGROUND

Calibration accuracy of LiDARs disposed on an autonomous mobile machine determines environmental perception accuracy of the autonomous mobile machine, and the environmental perception accuracy is a foundation for decision-making and operation. Currently, the calibration of LiDARs still mainly relies on manual operation, which is not only cumbersome to perform but also lacks accuracy.

SUMMARY

The present disclosure provides a calibration method, an autonomous mobile machine and a control system.

In a first aspect, a calibration method, applied to an autonomous mobile machine, is provided. The autonomous mobile machine is provided with a LiDAR, and the method includes: acquiring first point cloud data of a calibration room, where the first point cloud data is full-scene point cloud map data of the calibration room; calculating, based at least on the first point cloud data and coordinate system data of the autonomous mobile machine, a first transformation relationship, where the first transformation relationship is a transformation relationship between a coordinate system of the autonomous mobile machine and a coordinate system of the calibration room; acquiring second point cloud data of a marker in the calibration room through the LiDAR to be calibrated; performing registration on the second point cloud data and the first point cloud data to obtain a second transformation relationship, where the second transformation relationship is a transformation relationship between a coordinate system of the LiDAR to be calibrated and the coordinate system of the calibration room; and acquiring, based on the first transformation relationship and the second transformation relationship, a transformation relationship between the coordinate system of the LiDAR to be calibrated and the coordinate system of the autonomous mobile machine as a calibration result.

In a second aspect, an autonomous mobile machine is provided, where a LiDAR to be calibrated is disposed on the autonomous mobile machine, and the LiDAR to be calibrated is calibrated by the calibration method according to the first aspect.

In a third aspect, there is provided a control system. The control system includes: a processor and a non-volatile memory, where the non-volatile memory is configured to store a program instruction; and the processor is configured to execute the program instruction to implement the following steps: acquiring first point cloud data of a calibration room, where the first point cloud data is full-scene point cloud map data of the calibration room; calculating, based at least on the first point cloud data and coordinate system data of the autonomous mobile machine, a first transformation relationship, where the first transformation relationship is a transformation relationship between a coordinate system of the autonomous mobile machine and a coordinate system of the calibration room; acquiring second point cloud data of a marker in the calibration room through the LiDAR to be calibrated; performing registration on the second point cloud data and the first point cloud data to obtain a second transformation relationship, where the second transformation relationship is a transformation relationship between a coordinate system of the LiDAR to be calibrated and the coordinate system of the calibration room; and acquiring, based on the first transformation relationship and the second transformation relationship, a transformation relationship between the coordinate system of the LiDAR to be calibrated and the coordinate system of the autonomous mobile machine as a calibration result.

BRIEF DESCRIPTION OF THE DRAWINGS

To more clearly illustrate the technical solutions in embodiments of the present disclosure or the prior art, drawings required for the embodiments will be briefly described below. Obviously, the drawings in the following description are merely some embodiments of the present disclosure, and for those skilled in the art, other drawings can also be obtained based on these drawings without exerting creative efforts.

FIG. 10 is a schematic flowchart of a calibration method according to some embodiments of the present disclosure.

FIG. 11 is a schematic flowchart of determining a calibration result according to another embodiment of the present disclosure.

FIG. 12 is a schematic diagram of a transformation relationship between coordinate systems according to some embodiments of the present disclosure.

FIG. 13 is a schematic flowchart of a calibration method according to another embodiment of the present disclosure.

FIG. 14 is a schematic flowchart of point cloud registration according to some embodiments of the present disclosure.

FIG. 15 is a schematic flowchart of determining a first transformation relationship according to some embodiments of the present disclosure.

FIG. 16 is a schematic flowchart of determining a fourth transformation relationship according to some embodiments of the present disclosure.

FIG. 19 is a schematic flowchart of determining a first transformation relationship according to another embodiment of the present disclosure.

FIG. 20 is a schematic flowchart of determining a fourth transformation relationship according to another embodiment of the present disclosure.

FIG. 29 is a schematic flowchart of a method for determining point cloud according to some embodiments of the present disclosure.

FIG. 30 is a schematic flowchart of a method for determining a second point cloud plane according to some embodiments of the present disclosure.

FIG. 31 is a schematic installation diagram of a marking tool according to another embodiment of the present disclosure.

FIG. 32 is a schematic diagram of a first reflective layer according to some embodiments of the present disclosure.

FIG. 33 is a schematic diagram of a first reflective layer according to another embodiment of the present disclosure.

FIG. 34 is a schematic flowchart of a method for determining point cloud of a first reflective layer according to some embodiments of the present disclosure.

FIG. 35 is a schematic flowchart of a method for determining a center of an autonomous mobile machine according to another embodiment of the present disclosure.

FIG. 36 is a schematic flowchart of a method for determining a center of an autonomous mobile machine according to still another embodiment of the present disclosure.

FIG. 37 is a schematic flowchart of a method for determining a center of an autonomous mobile machine according to yet another embodiment of the present disclosure.

FIG. 38 is a schematic flowchart of a method for determining a first axis coordinate value according to some embodiments of the present disclosure.

FIG. 39 is a schematic structural diagram of an autonomous mobile machine according to some embodiments of the present disclosure.

FIG. 40 is a schematic flowchart of a method for determining center coordinates of a second point cloud plane according to some embodiments of the present disclosure.

FIG. 41 is a schematic flowchart of a method for determining point cloud of a wheel according to some embodiments of the present disclosure.

FIG. 42 is a schematic diagram of rough point cloud of a wheel according to some embodiments of the present disclosure.

FIG. 43 is a schematic diagram of point cloud of a wheel according to some embodiments of the present disclosure.

FIG. 44 is a schematic flowchart of a method for determining point cloud of a wheel edge according to some embodiments of the present disclosure.

FIG. 45 is a schematic flowchart of a method for determining a structural parameter according to some embodiments of the present disclosure.

FIG. 46 is a schematic flowchart of a method for determining a structural parameter according to another embodiment of the present disclosure.

FIG. 47 is a schematic flowchart of a method for calibrating an encoder according to some embodiments of the present disclosure.

FIG. 48 is a schematic diagram of interaction according to some embodiments of the present disclosure.

DETAILED DESCRIPTIONS OF THE EMBODIMENTS

Figures 1, 2:
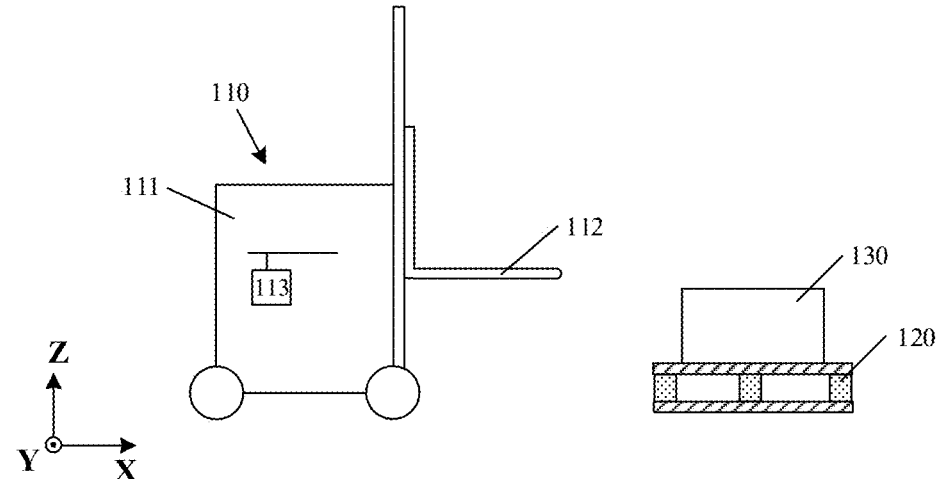
FIG. 1 is a schematic diagram of an application scenario applicable to some embodiments of the present disclosure.
FIG. 2 is a schematic structural diagram of a calibration room according to some embodiments of the present disclosure.

The following clearly and completely describes the technical solutions in embodiments of the present application with reference to the accompanying drawings in embodiments of the present application. Apparently, the described embodiments are merely some but not all of embodiments of the present application. All other embodiments obtained by persons of ordinary skill in the art based on the embodiments of the present application shall fall within the protection scope of the present application.

Terms used in the embodiments of the present invention are merely intended to describe specific embodiments, but are not intended to limit the present invention. The singular forms of "a/an", "said", and "the" used in embodiments of the present invention and the appended claims are also intended to include plural forms, unless the context clearly implies otherwise.

The term "and/or" used in this specification is merely an association relationship that describes associated objects, and represents that there may be three relationships. For example, A and/or B may represent three cases: only A exists, both A and B exist, and only B exists. In addition, the character "/" in this specification generally indicates an "or" relationship between the associated objects. In addition, the term "based on" used in this specification is not limited to being based on an object only. For example, determining B based on A may indicate: determining B directly based on A only, or determining B partially based on A.

Before introducing the embodiments of the present disclosure, professional terms that may be involved in the embodiments of the present disclosure will be illustrated below.

An autonomous mobile machine refers to a machine or robot that can autonomously move and perform tasks in a real environment without direct and continuous physical control from humans, such as service robots (sweeping robots, companion robots, etc.), material handling equipment, unmanned vehicles, etc.

Material handling equipment refers to equipment that is capable of automatically or semi automatically performing handling tasks. Common forms of the material handling equipment include forklifts, Automated Guided Vehicles (AGVs), Autonomous Mobile Robots (AMRs), humanoid robots, and robotic arms.

Automated Guided Forklift (AGF) refers to an intelligent industrial vehicle that integrates forklift technology and Automated Guided Vehicle (AGV) technology. It can automatically complete tasks such as material handling and stacking.

A controller refers to a system usually including a processor and a memory at a hardware level. Optionally, the control system may further include an input/output interface, a main board, peripheral circuits and other components. At a software level, the control system usually includes control algorithms, operating systems, communication protocols, and other parts. As used herein, the control system may refer to a set of control systems for performing the same or different tasks.

A processor is configured to perform core functions such as computation, control and decision-making. It receives data from sensors, executes control algorithms and commands actuators to complete tasks. Common types of the processor include a Central Processing Unit (CPU), a Digital Signal Processor (DSP), a Microcontroller Unit (MCU), and the like. As used herein, the "processor" may refer to a set of processors performing the same or different tasks.

A memory is configured to store data, programs, and the like. As used herein, the "memory" may refer to a set of memories performing the same or different tasks.

The LiDAR disposed on the autonomous mobile machine is equivalent to the "eyes" for the device to perceive the environment, and is one of the core sensors for autonomous and intelligent operation of the autonomous mobile machine. Specifically, LiDAR obtains accurate three-dimensional information of the surrounding environment by emitting laser beams and receiving echoes, endowing the autonomous mobile machine with depth vision and spatial understanding capabilities.

Currently, calibration methods for an autonomous mobile machine usually include: fork encoder calibration, fork actuator calibration, chassis encoder calibration, chassis actuator calibration, navigation multi-radar calibration, pick-and-place multi-radar calibration, and pick-and-place camera calibration. Among them, the calibration for multiple LiDARs disposed on the autonomous mobile machine is particularly critical, and its accuracy directly affects positioning and navigation accuracy as well as accuracy of pick-and-place operation of the autonomous mobile machine. Currently, a calibration method for an autonomous mobile machine usually includes "pallet calibration". However, this calibration method relies on the quality of manual operations, featuring a low degree of automation. The calibration process is cumbersome and time-consuming, resulting in low efficiency and poor accuracy of calibration results.

In response to the aforementioned technical problems, embodiments of the present disclosure provide a calibration method applied to an autonomous mobile machine, where a LiDAR to be calibrated is disposed on the autonomous mobile machine, and the method including: acquiring first point cloud data of a calibration room, where the first point cloud data is full-scene point cloud map data of the calibration room; calculating, based at least on the first point cloud data and coordinate system data of the autonomous mobile machine, a first transformation relationship, where the first transformation relationship is a transformation relationship between a coordinate system of the autonomous mobile machine and a coordinate system of the calibration room; acquiring second point cloud data of a marker in the calibration room through the LiDAR to be calibrated; performing registration on the second point cloud data and the first point cloud data to obtain a second transformation relationship, where the second transformation relationship is a transformation relationship between a coordinate system of the LiDAR to be calibrated and the coordinate system of the calibration room; and acquiring, based on the first transformation relationship and the second transformation relationship, a transformation relationship between the coordinate system of the LiDAR to be calibrated and the coordinate system of the autonomous mobile machine as a calibration result.

In the embodiment of the present disclosure, the first transformation relationship and the second transformation relationship is obtained based on the first point cloud data, the autonomous mobile machine coordinate system data, and the second point cloud data. Since the first transformation relationship is the transformation relationship between the coordinate system of the autonomous mobile machine and the coordinate system of the calibration room, and the second transformation relationship is the transformation relationship between the coordinate system of the LiDAR to be calibrated and the coordinate system of the calibration room, both transformation relationships are associated with the coordinate system of the calibration room, the transformation relationship between the coordinate system of the LiDAR to be calibrated and the coordinate system of the autonomous mobile machine can thus be obtained based on the two transformation relationships, realizing the calibration of the LiDAR to be calibrated. As the calibration result is obtained only through point cloud registration and transformation relationship conversion, the entire process requires no manual intervention, is convenient and efficient to operate, and improves the accuracy of the calibration result.

An exemplary application scenario of the present disclosure is described below with reference to FIG. 1.

FIG. 1 is a schematic diagram of an application scenario applicable to some embodiments of the present disclosure. As shown in FIG. 1, the application scenario includes an autonomous mobile machine 110, a pallet 120, and a cargo 130 placed on the pallet 120.

The autonomous mobile machine 110 is defined as a machine capable of moving autonomously or performing specific tasks. It includes a main body of the autonomous mobile machine 111, a stacking execution component 112, and a control system 113. In the embodiment of the present disclosure, the autonomous mobile machine 110 includes material handling equipment, unmanned vehicles, and the like. The material handling equipment may include an automated guided forklift, a pallet truck, a hoisting truck, an automated guided vehicle (AGV), an autonomous mobile robot (AMR), a humanoid robot, and the like. The stacking execution component 112 may be a fork, a robotic arm, or the like. The control system 113 may be a system or device used for computing or controlling on the main body of the autonomous mobile machine 111, such as a control main-board, a control box, a control unit, an on-board computer, a computing platform, a tablet computer, or a computer; it may also be a system or device for used for computing or controlling in a local server or a cloud server, or other forms such as a handheld control system or a remote control system, which will not be limited in the present disclosure.

In practical applications, the control system 113 is used for calibrating the LiDAR to be calibrated disposed on the autonomous mobile machine 110. For example, the control system 113 is configured to execute program instructions to implement the following steps: acquiring first point cloud data of a calibration room, where the first point cloud data is full-scene point cloud map data of the calibration room; calculating, based at least on the first point cloud data and coordinate system data of the autonomous mobile machine, a first transformation relationship, where the first transfor-mation relationship is a transformation relationship between a coordinate system of the autonomous mobile machine and a coordinate system of the calibration room; acquiring second point cloud data of a marker in the calibration room through the LiDAR to be calibrated; performing registration on the second point cloud data and the first point cloud data to obtain a second transformation relationship, where the second transformation relationship is a transformation rela-tionship between a coordinate system of the LiDAR to be calibrated and the coordinate system of the calibration room; and acquiring, based on the first transformation relationship and the second transformation relationship, a transformation relationship between the coordinate system of the LiDAR to be calibrated and the coordinate system of the autonomous mobile machine as a calibration result.

In some embodiments, the autonomous mobile machine 110 may further include a memory (not shown in the figures), which is mainly configured to store data collected by the LiDAR, such as point cloud data.

The calibration method provided in the present disclosure can be implemented in a calibration room. An example of a structure of the calibration room will be illustrated with reference to the accompanying drawings in the following.

FIG. 2 is a schematic structural diagram of a calibration room according to some embodiments of the present dis-closure. As shown in FIG. 2, the calibration room includes: a calibration room 210, configured to accommodate an autonomous mobile machine 220; a data acquisition module 230, disposed in the calibration room 210, where the data acquisition module 230 includes a LiDAR and a detection range of the data acquisition module 230 covers the autono-mous mobile machine 220; and a calculation module 240, connected to the data acquisition module 230, where the calculation module 240 is configured to calibrate the autono-mous mobile machine 220 based on detection data of the data acquisition module 230.

The calibration room 210 is an enclosed space configured to accommodate the autonomous mobile machine 220, and may be of various shapes. Exemplarily, the calibration room 210 may be constructed as a rectangular enclosed structure, with minimum dimensions of 4.5 meters in width, 7 meters in length, and 2.5 meters in height.

The data acquisition module 230 includes at least one LiDAR, and a quantity of the LiDAR may be determined based on a field of view of the LiDAR. Exemplarily, a measuring distance of the LiDAR ranges from 1.2 meters to 1.5 meters, and a detection range of the data acquisition module 230 composed of the LiDAR needs to cover the autonomous mobile machine 220, so as to ensure that complete information of the autonomous mobile machine 220 may be collected.

The dimensions of the calibration room 210 are deter-mined based on a type of the autonomous mobile machine 220 and a measurement distance of the data acquisition module 230. Specifically, the autonomous mobile machine 220 may include various types, such as a high-mast forklift, a long-fork forklift, and so on. Different types of the autonomous mobile machine 220 have different dimensions. To be adapted to different types of the autonomous mobile machine 220, the dimensions of the calibration room 210 may be set corresponding to the dimensions of the autono-mous mobile machine 220. In addition to reserving sufficient space for the autonomous mobile machine 220, it is also necessary to consider the field of view and the measurement distance of the data acquisition module 230 to ensure that the detection range of the data acquisition module 230 can fully cover the autonomous mobile machine 220. For example, the calibration room 210 may be set to 5.5 meters in width, 8 meters in length, and 4 meters in height.

Furthermore, the data acquisition module 230 may further include a camera, which works in conjunction with the LiDAR to detect the calibration room 210 and the autono-mous mobile machine 220.

Figures 8, 9:
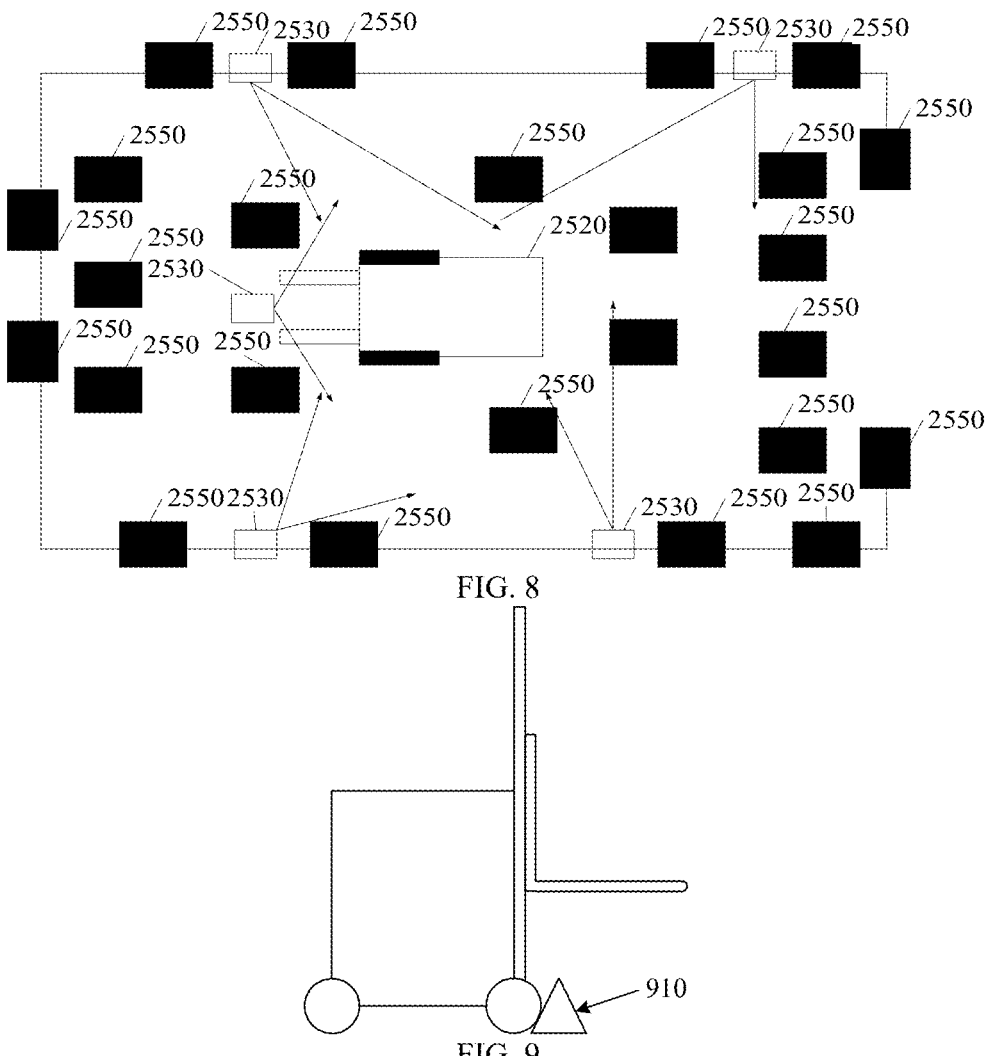
FIG. 8 is a schematic layout diagram of a calibration room according to some embodiments of the present disclosure.
FIG. 9 is a schematic diagram of a guiding component according to some embodiments of the present disclosure.

With reference to FIG. 8, in some embodiments, a quan-tity of the data acquisition modules 230 may be greater than one, and a plurality of data acquisition modules 230 are disposed around the autonomous mobile machine 220, so that the detection range formed by the plurality of data acquisition modules 230 covers the autonomous mobile machine 220. For example, when the autonomous mobile machine 220 is a forklift, five LiDARs (i.e., five data acquisition modules 230) are provided in the main body of the calibration room, disposed respectively in an area in front of forks of the forklift, areas opposite wheel assemblies of the forklift on both sides, and areas on both sides of a head of the vehicle, for implementing functions such as pose detection of the fork, wheel positioning, and dimensional measurement of a vehicle body. By providing the plurality of data acquisition modules 230, automatic registration and external parameter calculation between main and auxiliary navigation LiDARs, and main and auxiliary handling LiDARs may be achieved.

The LiDAR arranged in front of the fork needs to be installed at a position outside a length range of an extended fork, so as to avoid collision with the LiDAR during lifting and lowering of the fork. Meanwhile, the field of view of the LiDAR must cover an entire area including a fork structure and a forklift mast to ensure integrity of features extraction. Exemplarily, an installation height of the LiDAR is 1.5 meters to balance spatial arrangement and sensing perfor-mance. The LiDAR corresponding to each wheel assembly is mainly used to measure a position of the wheel assembly and an installation position of the LiDAR maintains a horizontal distance of approximately 1.5 meters from the wheel assembly. Meanwhile, a distance between the instal-lation position and a bearing surface is within a height threshold, so as to reduce smearing effect caused by an observation angle of the LiDAR and ensure accuracy of wheel position extraction. For example, the height threshold may be 1 meter, so that the field of view of the LiDAR may cover an entire working area of the wheel assembly to avoid blind spots. The LiDARs on both sides of the head of the vehicle are configured to measure dimensions, such as a length, a width, and a height, of the entire vehicle. A total detection range of two LiDARs on both sides of the head of the vehicle needs to cover an entire outer contour of the vehicle body, so as to ensure that all required dimensions of the vehicle body may be extracted in a single scan, thereby improving measurement efficiency and consistency.

In some embodiments, the calculation module 240 is disposed in the calibration room 210 or on a remote server. The detection data collected by the data acquisition module 230 may be transmitted to the calculation module 240 via a switch. The calculation module 240 may receive the detection data collected by the data acquisition module 230 and execute a calibration method to complete the calibration of the autonomous mobile machine 220. Exemplarily, the calculation module 240 may perform operations such as feature extraction, data fusion, and pose calculation on the detection data, to register a coordinate system of the data acquisition module 230 with a coordinate system of the calibration room 210 and further to identify a three-dimensional pose of the autonomous mobile machine 220 in the calibration room. Combined with a structural recognition result of the autonomous mobile machine 220 by the data acquisition module 230, an origin position of the coordinate system corresponding to the autonomous mobile machine 220 may be determined. Then, the origin position will be transmitted to the autonomous mobile machine 220 via internal Local Area Network (LAN), so that the autonomous mobile machine 220 may be calibrated based on the origin position by the control system of the autonomous mobile machine 220.

An example of an interaction process between the calculation module and the data acquisition module will be illustrated with reference to FIGS. 3 and 4 in the following.

Figure 3:
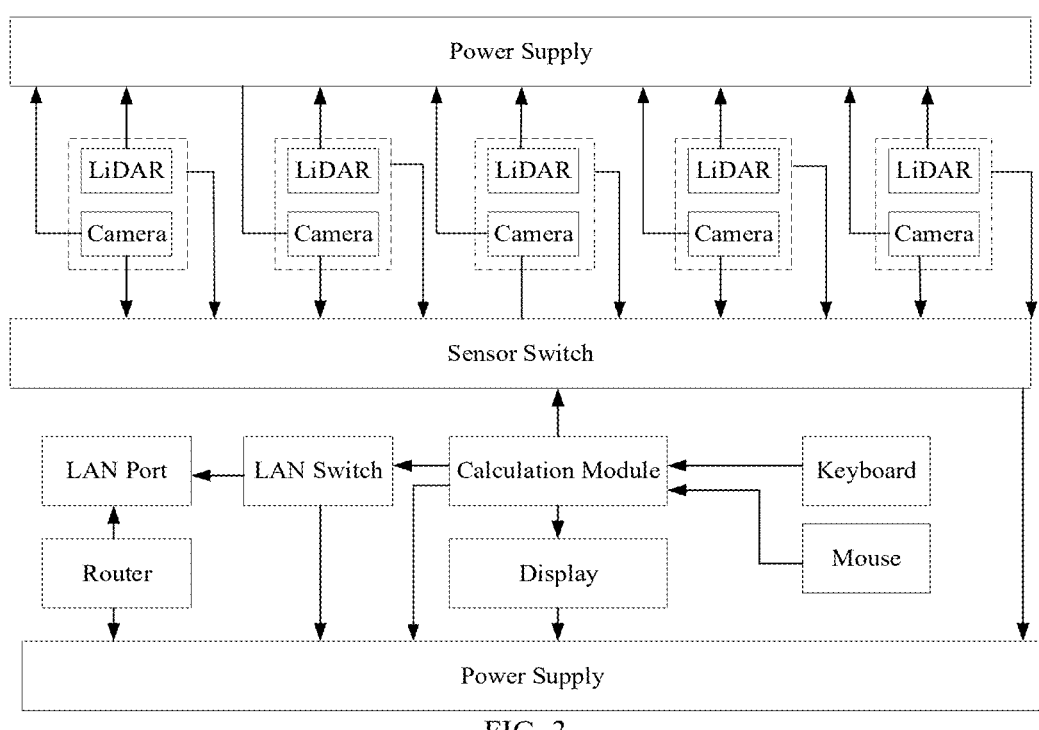
FIG. 3 is a schematic diagram of a connection between a data acquisition module and a calculation module according to some embodiments of the present disclosure.

FIG. 3 is a schematic diagram of connection between a data acquisition module and a calculation module according to some embodiments of the present disclosure. As shown in FIG. 3, there are five data acquisition modules, each including a LiDAR and a camera and connected to a power supply. The LiDAR and the camera are respectively connected to a sensor switch via network cables, and the sensor switch is further connected to the calculation module via a network cable, thereby establishing a data transmission channel between the data acquisition modules and the calculation module. In an actual operation process, the data acquisition modules continuously collect data of the autonomous mobile machine in the calibration room, and the data is transmitted to the sensor switch via network cables in form of electrical signals. The sensor switch is configured to sort and classify the data from different data acquisition modules and transmit the data to the calculation module, serving to aggregate and forward data. The calculation module is configured to calibrate the autonomous mobile machine based on the received data.

The embodiment of the present disclosure further provides an interaction component, which includes a display, a keyboard, and a mouse, to assist user in controlling during the calibration process of the autonomous mobile machine. The calculation module is connected to the keyboard and mouse via a USB (Universal Serial Bus) interface, and the display is connected to the calculation module via an HDMI (High-Definition Multimedia Interface) interface. Further, a LAN (Local Area Network) port is connected to a LAN switch via a network cable to implement data forwarding between different devices. The LAN port is connected to a router via a network cable to enable connection to an external network via the router. The router, the LAN switch, the display, and the sensor switch are all provided with a power supply.

Figure 4:
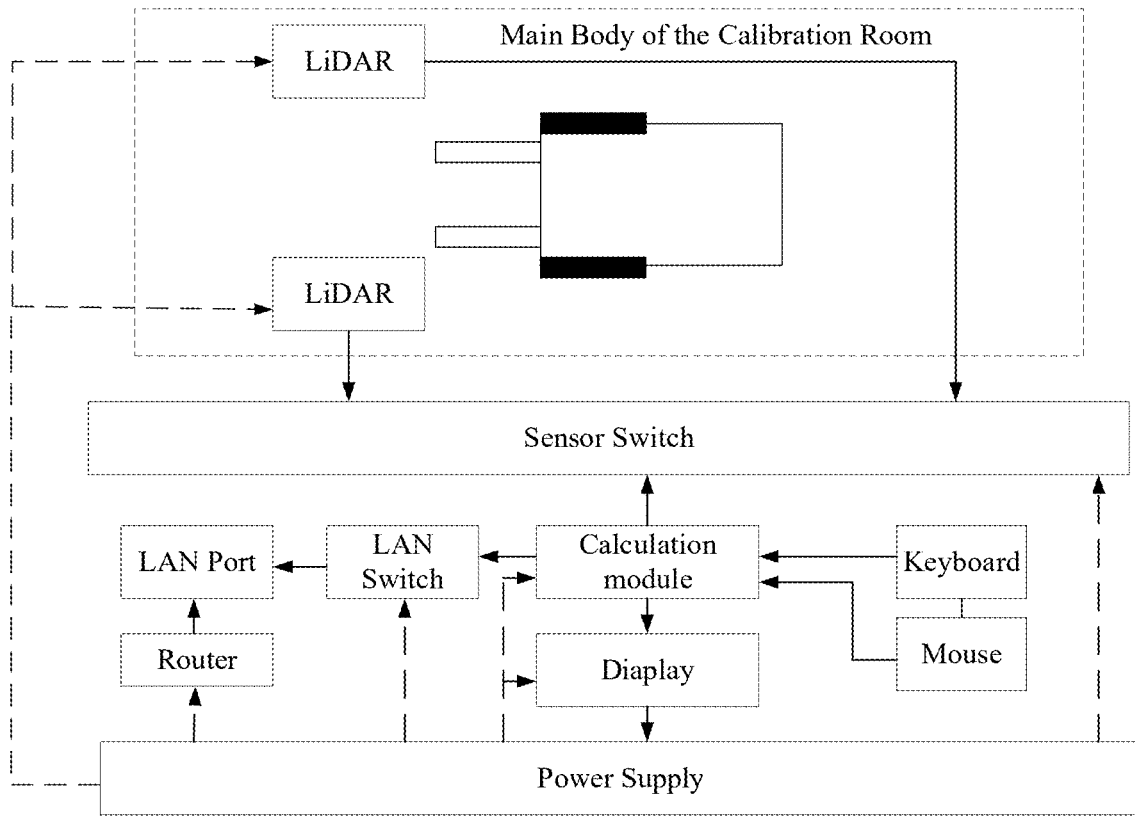
FIG. 4 is a schematic layout diagram of a data acquisition module according to some embodiments of the present disclosure.

FIG. 4 is a schematic layout diagram of a data acquisition module according to some embodiments of the present disclosure. As shown in FIG. 4, the LiDAR (i.e., the data acquisition module) is configured to collect point cloud data of the calibration room and the autonomous mobile machine, and the point cloud data is transmitted to the calculation module via the sensor switch. Users interact with the calculation module through the interaction component such as a display, a keyboard, and a mouse to control the calibration process. A LAN port, a LAN switch, and a router are provided to enable data sharing between different devices. As indicated by dashed lines in FIG. 4, the LiDAR, the sensor switch, the LAN switch, the calculation module, the display, the router, and other components are all provided with a power supply for electrical support. With the layout mentioned above, the calibration room achieves a standardized environment, automated measurement, and networked data transmission, significantly improving efficiency, accuracy, and consistency of calibration for the autonomous mobile machine.

In some embodiments, the data acquisition module and other modules together form a server, which provides accurate detection data to the calculation module. The calculation module is disposed on the control system of the autonomous mobile machine. The server and the control system communicate and collaborate via an internal network to accomplish tasks such as data acquisition, feature extraction, pose calculation, external parameter calibration, and parameter writing. Accordingly, the calibration room adopts a software-hardware collaborative architecture and constructs a dual-end collaborative calibration software framework with "the control system and the server" as the core, supporting a streamlined workflow that orchestrates multi-sensor data processing, task scheduling, calibration task management, and automated deployment. This enables fully automated, high-precision calibration of the autonomous mobile machine during the manufacturing stage.

Exemplarily, the autonomous mobile machine may include an automated guided forklift, and the control system is deployed on an industrial computer of the automated guided forklift. The control system encompasses the following functionalities: acquisition of on-board multi-sensor data; support for communication architecture; automatic calibration and diagnosis capabilities; write-back of calibration results, and parameter application.

Structures of the control system and the server will be illustrated with reference to FIGS. 5 and 6 in the following.

Figures 5, 6, 7:
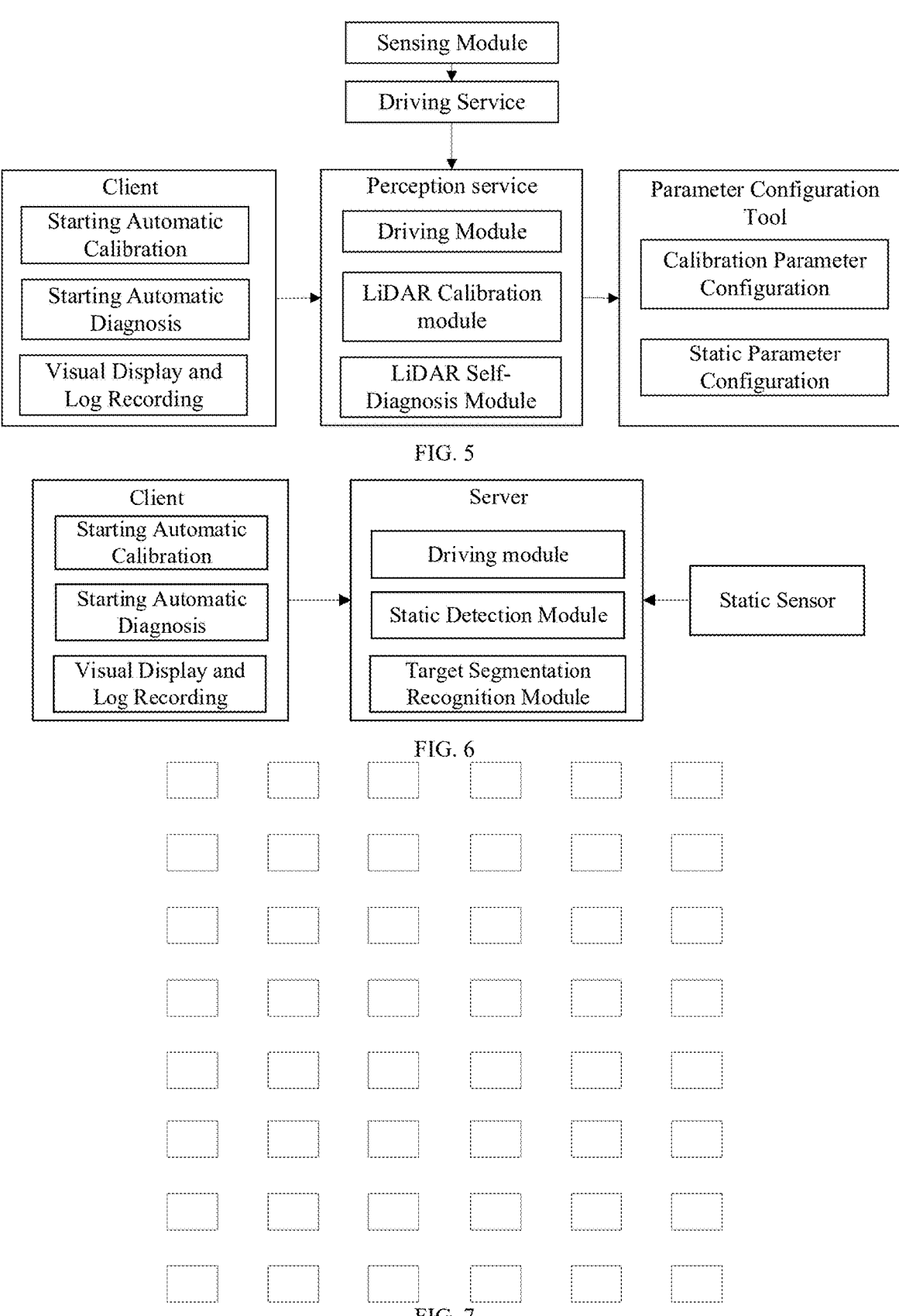
FIG. 5 is a schematic structural diagram of a control system according to some embodiments of the present disclosure.
FIG. 6 is a schematic structural diagram of a server according to some embodiments of the present disclosure.
FIG. 7 is a schematic diagram of an arrangement of first markers according to some embodiments of the present disclosure.

FIG. 5 is a schematic structural diagram of a control system according to some embodiments of the present disclosure. As shown in FIG. 5, a software module of the control system includes: a sensing module, a driving service, a perception service, and software in an application layer. The sensing module is configured to drive static sensors such as on-vehicle LiDARs and cameras and acquire data. The perception service includes a driving module, a radar calibration module, and a radar self-diagnosis module. The software in the application layer includes interfaces provided by a client and a parameter configuration tool. The client may include functions such as starting automatic calibration, starting automatic diagnosis, visual display and log recording. The parameter configuration tool includes options such as calibration parameter configuration and static parameter configuration. The driver service is configured to drive the aforementioned modules to work. Further, the software module of the control system may further include a communication component, which uses eCAL (enhanced Communication Abstraction Layer) for interaction of large amounts of data such as point cloud data and images, and uses MQTT (Message Queuing Telemetry Transport) and JSON-RPC (JavaScript Object Notation Remote Procedure Call) to implement parameter control and result communication.

FIG. 6 is a schematic structural diagram of a server according to some embodiments of the present disclosure. As shown in FIG. 6, the server is responsible for data acquisition of a static sensor, fusion, and target pose calculation. The server includes a driving module, a static detection module, and a target segmentation recognition module. The server is connected to the static sensor and the client respectively. The client is used for manual control of the detection process and viewing diagnostic information, such as starting automatic calibration, enabling detection functions, visual display, and log recording. The communication component performs data interaction with the control system. High-volume communication is implemented via eCAL, while low-frequency command and result transmission are performed via JSON-RPC and MQTT. The server enables functions such as synchronized acquisition of sensors, data fusion, feature recognition, feature extraction, pose estimation of static targets, generation of calibration results, and transmission of calibration results to the control system.

In the embodiment of the present disclosure, based on the data acquisition module disposed in the calibration room, the detection data reflecting features of the autonomous mobile machine and the calibration room is acquired through data collection performed on the calibration room and the autonomous mobile machine. The feature of the autonomous mobile machine and the calibration room is obtained without manual intervention. Furthermore, as the autonomous mobile machine is calibrated based on the detection data through the calculation module, the calibration of the autonomous mobile machine may be completed rapidly, realizing a high degree of automation, convenient operation and high efficiency. Calibration based on the data acquired by the data acquisition module ensures data consistency and improves accuracy of calibration results. Additionally, the calibration room is configured to accommodate the autonomous mobile machine, that is, the calibration room occupies little space, which enhances usability.

In some embodiments, the calibration room includes a first marking component. The first marking component is disposed on an inner wall of the calibration room, and the first marking component includes a plurality of first markers arranged in an array.

Specifically, the first markers may be made of a material which may be recognized by the LiDAR easily. Specifically, the material of the first markers may be foam. The first markers can be set to a color different from the inner wall of the calibration room. For example, if the inner wall of the calibration room is white, the first markers can be set to black to facilitate rapid identification of the first marker. The first markers provide high-precision and repeatable three-dimensional spatial feature points for the LiDAR to realize the calibration. Exemplarily, the first markers are square white foam with a length of 30 cm×30 cm.

By arranging the first markers in an array, the LiDAR is capable of clearly identifying positions of the first markers during scanning, thereby ensuring accuracy of data acquisition. The first markers arranged in the array may also provide abundant spatial feature information, which helps improve accuracy and stability of calibration results.

FIG. 7 is a schematic diagram of an arrangement of first markers according to some embodiments of the present disclosure. As shown in FIG. 7, the first markers are square and arranged at equal intervals with a certain spacing, thereby forming a regular grid-like structure. This arrangement not only facilitates scanning and recognition by the LiDAR but also ensures an accurate relative positional relationship between the first markers, providing convenience for subsequent data processing and calibration work. In addition, a size and a shape of the first marker may be modified according to actual requirements to meet calibration requirements of different accuracy. Exemplarily, the interval between adjacent first markers may be equal to a side length of the first marker. For example, the first marker is a square of 30 cm×30 cm and the interval between adjacent first markers is 30 cm.

In some embodiments, the calibration room may further include a second marking component. The second marking component is disposed on the inner wall of the calibration room and includes a plurality of second markers arranged in an array. The plurality of first markers and the plurality of second markers are arranged alternately in sequence. The second markers may adopt a same size as the first markers.

The material of the second marker is the same as the material of the first marker, and the color of the second marker is different from the color of the first marker. Exemplarily, if the color of the first marker is black, the color of the second marker may be white; if the color of the first marker is white, the color of the second marker may be black.

Exemplarily, the second marker may include black foam. The black foam has low reflectivity, forming a distinct contrast with white foam. Under LiDAR scanning, the black foam may present low-reflection areas, thereby creating a strong contrast with white foam, enabling the LiDAR to more accurately identify positions of the first markers and the second markers.

In the embodiments of the present disclosure, the plurality of first markers and the plurality of second markers are arranged alternately in sequence. The alternating arrangement may provide more feature points for the LiDAR, enhance data redundancy, and improves the stability and reliability of calibration.

In some embodiments, the first markers and the second markers may be alternately arranged in a staggered layout, that is, the first markers and the second markers are staggered in a horizontal or vertical direction, forming a staggered distribution visual effect. This arrangement can increase the richness of data acquisition and improve the accuracy of calibration.

In other embodiments, the plurality of first markers and the plurality of second markers are arranged in a checkerboard pattern. By arranging the first markers and the second markers alternately in a checkerboard pattern, a chessboard-like visual effect is formed. This arrangement provides uniformly distributed spatial feature points and abundant spatial feature information, improving the accuracy and stability of calibration.

A layout diagram of the calibration room will be illustrated below with reference to FIG. 8. FIG. 8 is a schematic layout diagram of a calibration room according to some embodiments of the present disclosure. As shown in FIG. 8, the calibration room includes a plurality of data acquisition modules 230, and each data acquisition module 230 includes a camera and a LiDAR. An angle between two line segments with arrows in FIG. 8 indicates an acquisition angle of view of the data acquisition module. A plurality of markers 250 are also disposed in the calibration room, and each marker 250 is located on an inner wall or the ground of the main body of the calibration room to facilitate feature extraction. The larger the size of the calibration room is, the higher the measurement accuracy during calibration will be. Exemplarily, dimensions of the main body of the calibration room may be 4.7 meters in width, 7.2 meters in length. A width of a door may be 2.44 meters. The autonomous mobile machine 220 is parked in the center of the calibration room to allow the data acquisition modules 230 to collect information of the autonomous mobile machine 220 in all directions.

In some embodiments, the calibration room may further include a positioning device. The positioning device is configured to assist in positioning the autonomous mobile machine in the calibration room.

Exemplarily, the positioning device may include a rectangular parking box, enclosing an area larger than dimensions of the autonomous mobile machine. For example, a width of a rectangular parking space enclosed by the rectangular parking box is larger than a width of the head of the autonomous mobile machine; a length of the rectangular parking space is larger than a length of the autonomous mobile machine. A position of the rectangular parking box in the calibration room may be used as a designated position of the autonomous mobile machine, thereby guiding the autonomous mobile machine to park at the position corresponding to the rectangular parking box in the calibration room.

Different positioning devices may be provided for different types of autonomous mobile machines. For example, for autonomous mobile machines of different sizes, rectangular parking boxes of different sizes may be set to facilitate the calibration of the autonomous mobile machines of different sizes, making the positioning adjustable and flexible.

In other embodiments, the calibration room is further provided with a positioning device. The positioning device may include: a guiding component, configured to guide the autonomous mobile machine to a designated position; and/ or a parking position measurement component, configured to assist the data acquisition module in detecting the autonomous mobile machine.

The guiding component is technological equipment that controls the autonomous mobile machine to the designated position, so that the LiDARs, the cameras, and other sensors of the data acquisition module are all within an optimal working distance from the autonomous mobile machine and have an optimal acquisition field of view. FIG. 9 is a schematic diagram of a guiding component according to some embodiments of the present disclosure. The guiding component may be configured as a marker of a specific shape to instruct the autonomous mobile machine to move to the designated position indicated by the guiding component. As shown in FIG. 9, the guiding component 910 may adopt a triangular auxiliary structure. When the wheels of the autonomous mobile machine abut against a side surface of the guiding component 910, it indicates that the autonomous mobile machine has moved to the designated position. The designated position may be determined based on the acquisition fields of view of the data acquisition module and the static sensors disposed on the autonomous mobile machine, so that when the autonomous mobile machine moves to the designated position, both the data acquisition module and the static sensors on the autonomous mobile machine can effectively and comprehensively collect the detection data in the current scene.

Optionally, the parking position measurement component may be installed on the autonomous mobile machine. For example, when the autonomous mobile machine is an automated guided forklift, the parking position measurement component may be installed at a coaxial position of the wheel assembly of the automated guided forklift. The parking position measurement component is configured to detect whether the autonomous mobile machine has reached the designated position, and send a detection result to the data acquisition module to control the data acquisition module to collect point cloud data of the autonomous mobile machine.

Exemplarily, the parking position measurement component may be a photoelectric sensor. The photoelectric sensor has characteristics of high measurement accuracy and fast response speed, and can perform real-time detection of the position information of the autonomous mobile machine. When the autonomous mobile machine moves to the designated position, the parking position measurement component will send a signal to the data acquisition module. When receiving the signal, the data acquisition module will starts collecting the point cloud data of the autonomous mobile machine.

In the embodiment of the present disclosure, through an integrated spatial design and a multi-sensor collaboration mechanism, the calibration room realizes fully automatic and high-precision calibration of structural parameters of key sensors and components of the autonomous mobile machine during a manufacturing stage. It significantly reduces manual operation costs, improves consistency during manufacturing, and provides core technical support for a large-scale delivery of autonomous mobile machines with high quality.

Based on the same concept, embodiments of the present disclosure further provide a calibration method. The calibration method is implemented in the aforementioned calibration room and used for calibrating an autonomous mobile machine.

In some embodiments, the autonomous mobile machine includes material handling equipment. To accurately handle cargoes, static sensors disposed on the material handling equipment usually include a navigation LiDAR and a handling LiDAR. To improve handling accuracy and safety, the navigation LiDAR includes a main navigation LiDAR and an auxiliary navigation LiDAR, and the handling LiDAR includes a main handling LiDAR and an auxiliary handling LiDAR, forming a redundant system. They are jointly responsible for detecting obstacles in front of the forks, preventing collisions during the movement of the forks, and working collaboratively to enhance operational safety and reliability. All the aforementioned main navigation LiDAR, auxiliary navigation LiDAR, main handling LiDAR, and auxiliary handling LiDAR may be LiDARs. In addition, the static sensors of the autonomous mobile machine may further include cameras.

All of the aforementioned main navigation LiDAR, auxiliary navigation LiDAR, main handling LiDAR, auxiliary handling LiDAR, and cameras may be calibrated through the calibration room provided by the embodiments of the present disclosure. In addition, various components on the autonomous mobile machine can also be calibrated through the calibration room provided by the embodiments of the present disclosure.

Specifically, the calibration room provided by the embodiments of the present disclosure may be used to automatically calibrate extrinsic parameters between the auxiliary navigation LiDAR and the main navigation LiDAR, as well as between the auxiliary handling LiDAR and the main handling LiDAR, to extract a center point of a vehicle body of the autonomous mobile machine. Meanwhile, the calibration room may further be used to automatically calibrate extrinsic parameters between the main navigation LiDAR and the main handling LiDAR, and spatial extrinsic parameters between the camera and a main LiDAR, enabling multi-modal sensor fusion. Additionally, the calibration room may further be used to automatically calibrate various encoders equipped on the autonomous mobile machine, including calibrating the encoders respectively when the fork assembly performs operations such as traversing, lifting, moving forward and backward, and tilting. In addition, the calibration room may further be used to automatically measure and verify basic structural parameters of the autonomous mobile machine, such as a length, a width, a height of the autonomous mobile machine, and a length and a width of a fork.

To enable a clearer and more comprehensive understanding of the calibration method implemented through the calibration room, the following separately describes the calibration method in several aspects, including LiDAR calibration, camera calibration, calibration between the LiDAR and the camera, encoder calibration, and determination of structural parameters.

Examples will be provided to illustrate multiple implementation of the calibration method of the LiDAR with reference to accompanying drawings.

FIG. 10 is a schematic flowchart of a calibration method according to some embodiments of the present disclosure. The calibration method provided by the embodiment of the present disclosure is applied to an autonomous mobile machine provided with a LiDAR. As shown in FIG. 10, the calibration method includes the following steps.

Step S1010: acquiring first point cloud data of a calibration room.

The first point cloud data is full-scene point cloud map data of the calibration room. Specifically, the first point cloud data is high-precision full-scene point cloud map data of the calibration room. The use of high-precision full-scene point cloud map data can improve calibration accuracy of the LiDAR to be calibrated.

The autonomous mobile machine can be parked at a designated location in the calibration room.

In some embodiments, the first point cloud data is original point cloud data of the calibration room preliminarily collected by an acquisition device. The acquisition device may be a handheld mapping device or a sensor module disposed on the autonomous mobile machine. The handheld mapping device includes a LiDAR, a camera, or an inertial measurement unit. Exemplarily, the acquisition device may be controlled to acquire data of the calibration room in all directions along a preset trajectory, thereby generating full-scene point cloud map data of the calibration room. The full-scene point cloud map data is designated as the first point cloud data.

In other embodiments, the first point cloud data is point cloud data obtained after performing data processing operations (such as point cloud filtering operations) on the original point cloud data.

Step S1020: calculating, based at least on the first point cloud data and coordinate system data of an autonomous mobile machine, a first transformation relationship.

The first transformation relationship is a transformation relationship between the coordinate system of the autonomous mobile machine and a coordinate system of the calibration room.

The coordinate system of the autonomous mobile machine is a three-dimensional spatial coordinate system established with the autonomous mobile machine itself as a reference origin. The coordinate system of the calibration room (that is, a main body of the calibration room) is a three-dimensional spatial coordinate system established with the calibration room as a reference origin.

The coordinate system data of the autonomous mobile machine refers to coordinate data of the calibration room recorded in the three-dimensional spatial coordinate system established with the autonomous mobile machine itself as the reference origin. In this step, the first transformation relationship can be calculated based on a correspondence relationship between the first point cloud data and coordinate system data of the autonomous mobile machine.

During the calibration process, the autonomous mobile machine may be fixed to avoid movement or rotation during calibration, which may affect the calibration result.

Step S1030: acquiring second point cloud data of a marker in the calibration room through a LiDAR to be calibrated.

The LiDAR to be calibrated refers to a LiDAR disposed on the autonomous mobile machine that needs to be calibrated, and a quantity of the LiDAR to be calibrated may be one or more.

In some embodiments, the calibration room includes at least one marker. During the calibration of the autonomous mobile machine, the marker is used as a feature point to calibrate the autonomous mobile machine. The marker may be an object included in the calibration room or a fixed object placed in the calibration room. For example, the marker may be a door, a window, a wall corner, and the like of the calibration room, or an indicator placed in the calibration room.

To effectively and quickly complete the calibration, clear and effective second point cloud data may be acquired by using the aforementioned first marking component and/or the second marking component in the calibration room. The marker in the calibration room may be a first marker and/or a second marker.

Specifically, the second point cloud data of at least one marker in the calibration room may be collected by the LiDAR to be calibrated. The second point cloud data refers to coordinate data of the marker in a coordinate system of the LiDAR to be calibrated. Exemplarily, point cloud data of a plurality of first markers and point cloud data of a plurality of second markers may be collected separately by the LiDAR to be calibrated, which jointly form the second point cloud data.

Step S1040: performing registration on the second point cloud data and the first point cloud data to obtain a second transformation relationship.

The second transformation relationship is a transformation relationship between the coordinate system of the LiDAR to be calibrated and the coordinate system of the calibration room.

A core objective of registration is to unify several sets of point cloud data collected by different devices into a unified coordinate system, thereby eliminating discrepancies in position, orientation, and scale between the different point cloud data. Exemplarily, a point cloud registration algorithm may be adopted to register the first point cloud data with the second point cloud data. By registering the second point cloud data with the first point cloud data, a transformation matrix for transforming the coordinate system of the LiDAR to be calibrated to the coordinate system of the calibration room may be obtained. The transformation matrix includes a translation matrix and a rotation matrix, which reflect changes from the coordinate system of the LiDAR to be calibrated to the coordinate system of the calibration room through translation and rotation respectively.

Step S1050: acquiring, based on the first transformation relationship and the second transformation relationship, a transformation relationship between a coordinate system of the LiDAR to be calibrated and a coordinate system of the autonomous mobile machine as a first calibration result.

Since the first transformation relationship is the transformation relationship between the coordinate system of the autonomous mobile machine and the coordinate system of the calibration room, and the second transformation relationship is the transformation relationship between the coordinate system of the LiDAR to be calibrated and the coordinate system of the calibration room, both transformation relationships are associated with the coordinate system of the calibration room. The coordinate system of the calibration room can thus be used as an intermediate coordinate system to establish an association between the coordinate system of the autonomous mobile machine and the coordinate system of the LiDAR to be calibrated, and thus obtain the transformation relationship between the coordinate system of the LiDAR to be calibrated and the coordinate system of the autonomous mobile machine, which is taken as the calibration result.

In the embodiment of the present disclosure, the first transformation relationship and the second transformation relationship are obtained based on the first point cloud data, the coordinate system data of the autonomous mobile machine, and the second point cloud data. Since the first transformation relationship is the transformation relationship between the coordinate system of the autonomous mobile machine and the coordinate system of the calibration room, and the second transformation relationship is the transformation relationship between the coordinate system of the LiDAR to be calibrated and the coordinate system of the calibration room, both transformation relationships are associated with the coordinate system of the calibration room and the transformation relationship between the coordinate system of the LiDAR to be calibrated and the coordinate system of the autonomous mobile machine can thus be obtained based on the two transformation relationships, realizing the calibration of the LiDAR to be calibrated. As the calibration result is obtained only through point cloud registration and transformation relationship conversion, an entire process requires no manual intervention, which makes the registration process convenient and efficient to operate, thereby improving the accuracy of the calibration result.

In some embodiments, a quantity of LiDARs to be calibrated is greater than one. An example will be provided to illustrated how to determine a calibration result of a plurality of LiDARs to be calibrated.

FIG. 11 is a schematic flowchart of a calibration method according to some embodiments of the present disclosure. The embodiment shown in FIG. 11 is extended based on the embodiment shown in FIG. 10. The following focuses on describing a difference between the embodiments shown in FIG. 11 and FIG. 10, and the similarities will not be described.

As shown in FIG. 11, in the embodiment of the present disclosure, a quantity of the LiDAR to be calibrated is greater than one, and the calibration method includes the following steps.

Step S1110: acquiring second point cloud data of the marker in the calibration room through each LiDAR to be calibrated.

The quantity of the LiDAR to be calibrated is less than or equal to a total quantity of LiDARs disposed on the autonomous mobile machine. Exemplarily, during factory calibration of the autonomous mobile machine, all LiDARs disposed on the autonomous mobile machine may be calibrated as the LiDARs to be calibrated. Each LiDAR to be calibrated may be controlled to collect the second point cloud data of the marker in the calibration room.

In some embodiments, all LiDARs to be calibrated can be simultaneously controlled to collect the second point cloud data of the marker in the calibration room to improve calibration efficiency. Different LiDARs to be calibrated can be used to collect point cloud data of different markers as the second point cloud data. In practice, as different LiDARs to be calibrated are installed at different positions on the autonomous mobile machine, collection accuracy of data acquired from different markers in the calibration room also varies due to distinct installation positions and sensing distances. The point cloud data of the markers whose collection accuracy meets an accuracy requirement may be retained and used as the second point cloud data.

Step S1120: performing registration on the first point cloud data and the second point cloud data corresponding to each LiDAR to be calibrated to obtain the second transformation relationship corresponding to each LiDAR to be calibrated.

In some embodiments, the second point cloud data collected by each LiDAR to be calibrated is registered with the first point cloud data, to obtain the transformation relationship between the coordinate system of each LiDAR to be calibrated and the coordinate system of the calibration room.

Step S1130: acquiring, based on the first transformation relationship and the second transformation relationship corresponding to each LiDAR to be calibrated, the transformation relationship between the coordinate system of each LiDAR to be calibrated and the coordinate system of the autonomous mobile machine as the calibration result.

For each LiDAR to be calibrated, the transformation relationship between the coordinate system of the LiDAR to be calibrated and the coordinate system of the autonomous mobile machine may be calculated separately, which is taken as the calibration result for each LiDAR to be calibrated. Through the calibration results, the position and pose information of each LiDAR to be calibrated on the autonomous mobile machine can be determined, thereby achieving precise calibration of the LiDAR to be calibrated.

The calibration method for the plurality of LiDARs to be calibrated will be clearly illustrated with reference to FIG. 12.

FIG. 12 is a schematic diagram of a transformation relationship between coordinate systems according to some embodiments of the present disclosure. As shown in FIG. 12, a quantity of the LiDARs to be calibrated is three, and each LiDAR to be calibrated has a corresponding coordinate system of the LiDAR to be calibrated, such as a coordinate system of LiDAR 1, a coordinate system of LiDAR 2 and a coordinate system of LiDAR 3. There is a second transformation relationship between each coordinate system of the LiDAR to be calibrated and the coordinate system of the calibration room, that is, the coordinate system of LiDAR 1, the coordinate system of LiDAR 2 and the coordinate system of LiDAR 3 are respectively associated with the coordinate system of the calibration room. Based on the first transformation relationship, an association is established between the coordinate system of the calibration room and the coordinate system of the autonomous mobile machine. Furthermore, by using the coordinate system of the calibration room as an intermediate coordinate system, transformation relationships between the coordinate system of LiDAR 1, the coordinate system of LiDAR 2 and the coordinate system of LiDAR 3, and the coordinate system of the autonomous mobile machine can be obtained respectively.

In the embodiment of the present disclosure, the calibration of the plurality of LiDARs to be calibrated is realized, so that no manual intervention is required during the calibration process, thereby reducing labor costs and time costs. Moreover, the same calibration method is adopted for each LiDAR to be calibrated, which ensures consistency of the calibration processes for different LiDARs and improves the accuracy of the calibration result.

An example will be provided to illustrate the calibration method for a LiDAR in the following with reference to FIG. 13.

FIG. 13 is a schematic flowchart of a calibration method according to another embodiment of the present disclosure. The embodiment shown in FIG. 13 is extended from the embodiment shown in FIG. 11. The following focuses on describing a difference between the embodiments shown in FIG. 13 and FIG. 11, and the similarities will not be described.

As shown in FIG. 13, in the embodiment of the present disclosure, before the step of performing registration on the first point cloud data and the second point cloud data corresponding to each LiDAR to be calibrated to obtain the second transformation relationship corresponding to each LiDAR to be calibrated (Step S1120), the method further includes the following steps.

Step S1310: generating, based on a plurality of LiDARs to be calibrated, a calibration task thread pool.

The calibration task thread pool includes a plurality of calibration task threads, and the plurality of calibration task threads are in a one-to-one correspondence with the plurality of LiDARs to be calibrated.

Exemplarily, a quantity of calibration task threads included in the calibration task thread pool is consistent with a quantity of the LiDARs to be calibrated. Each calibration task thread corresponds to a LiDAR to be calibrated and is used for executing a calibration task corresponding to that LiDAR to be calibrated.

Step S1320: starting a calibration task thread corresponding to a target LiDAR to be calibrated to calibrate the target LiDAR to be calibrated after acquiring the second point cloud data corresponding to the target LiDAR to be calibrated.

The target LiDAR to be calibrated is one of the plurality of LiDARs to be calibrated.

In some embodiments, a data acquisition request is periodically sent to each LiDAR to be calibrated, and the second point cloud data sent by the LiDARs to be calibrated will be received. The LiDAR to be calibrated corresponding to the received second point cloud data is referred to as the target LiDAR to be calibrated. After receiving the second point cloud data corresponding to at least one target LiDAR to be calibrated, the calibration task thread corresponding to the target LiDAR to be calibrated is started, and the target LiDAR to be calibrated is calibrated through this calibration task thread.

In some embodiments, different calibration task threads can be executed sequentially, that is, each calibration task thread needs to wait until the previous calibration task thread is completed, thereby reducing resource occupation.

In other embodiments, the quantity of target LiDARs to be calibrated is greater than one, that is, the plurality of target LiDARs to be calibrated may collect the second point cloud data in parallel. To improve calibration efficiency, the step of starting the calibration task thread corresponding to a target LiDAR to be calibrated to calibrate the target LiDAR to be calibrated after acquiring the second point cloud data corresponding to the target LiDAR to be calibrated may include: starting the calibration task threads corresponding to the plurality of target LiDARs to be calibrated in parallel to calibrate the plurality of target LiDARs to be calibrated after acquiring the second point cloud data corresponding to each of the plurality of target LiDARs to be calibrated.

Exemplarily, all the calibration task threads corresponding to the plurality of target LiDAR to be calibrated can be started in parallel; alternatively, a thread quantity threshold for calibration task threads to be started in parallel can be determined based on current remaining resources. An actual quantity of calibration task threads started in parallel will not exceed the thread quantity threshold, thereby improving calibration efficiency while ensuring the stability of the calibration process.

An example will be provided to illustrated determination of the second transformation relationship.

In the embodiment of the present disclosure, the step of performing registration on the second point cloud data and the first point cloud data to obtain the second transformation relationship (S1040) includes: performing rough registration and fine registration in sequence on the second point cloud data and the first point cloud data based on a point cloud registration algorithm to obtain the second transformation relationship.

The point cloud registration algorithm includes a registration algorithm for performing fine registration on point cloud data and a registration algorithm for performing rough registration on the point cloud data.

During the rough registration, the second point cloud data and the first point cloud data may be quickly and roughly aligned to reduce a positional difference between them. An initial difference between the second point cloud data and the first point cloud data is large. When there are significant positional and angular differences between the second point cloud data and the first point cloud data, direct fine registration will lead to a sharp increase in computational load. However, through a simplified feature matching logic, rough registration enables the second point cloud data and the first point cloud data to be roughly aligned, providing a better initial position for subsequent fine registration and improving registration efficiency.

During the fine registration, based on a preliminary alignment result of the rough registration, the second point cloud data and the first point cloud data may be further precisely aligned to improve registration accuracy and ensure the accuracy of the registration result.

By combining the rough registration and the fine registration, efficiency of the rough registration and accuracy of the fine registration are both preserved. This effectively improves overall registration efficiency and accuracy, ensures the accuracy of the second transformation relationship, and consequently improves stability and reliability of an entire calibration process.

An example will be provided to illustrated a point cloud registration method with reference to FIG. 14.

FIG. 14 is a schematic flowchart of point cloud registration according to some embodiments of the present disclosure. As shown in FIG. 14, in the embodiment of the present disclosure, a point cloud registration algorithm includes an iterative closest point (ICP) algorithm and a generalized iterative closest point (GICP) algorithm. The step of performing, based on the point cloud registration algorithm, the rough registration and the fine registration in sequence on the second point cloud data and the first point cloud data to obtain the second transformation relationship includes the following steps.

Step S1410: performing, based on the iterative closest point algorithm, the rough registration on the second point cloud data and the first point cloud data to obtain a first transformation matrix.

The first point cloud data may be used as target point cloud data, and the second point cloud data may be used as source point cloud data. A factory calibration matrix of the LiDAR to be calibrated may be used as an initialization parameter of the ICP algorithm to perform rough registration on the first point cloud data and the second point cloud data. The first transformation matrix obtained from rough registration may include a rotation matrix and a translation matrix. The second point cloud data may be roughly transformed, based on the first transformation matrix, to a position aligned with the first point cloud data, that is, the rough registration is completed. Through the rough registration, positional difference between different point cloud data can be quickly reduced, providing a better initial position for subsequent fine registration, which improves the efficiency and accuracy of the fine registration.

Step S1420: taking the first transformation matrix as an initialization parameter of the generalized iterative closest point algorithm, and performing, based on the generalized iterative closest point algorithm, the fine registration on the second point cloud data and the first point cloud data to obtain the second transformation relationship.

In practice, after the second point cloud data is transformed by the first transformation matrix obtained from the rough registration, there is still a slight deviation from the first point cloud data. To further improve registration accuracy, the generalized iterative closest point (GICP) algorithm may be used for the fine registration of the second point cloud data and the first point cloud data. Compared with the ICP algorithm, the GICP algorithm has higher registration accuracy but a relatively larger computational load. Therefore, after the rough registration, registration accuracy may be effectively improved by the fine registration using the GICP algorithm. With the first transformation matrix obtained from the rough registration as the initialization parameter of the GICP algorithm, a convergence speed of the fine registration may be accelerated, thereby improving the efficiency of fine registration. Through the GICP algorithm, the second point cloud data and the first point cloud data are precisely aligned to obtain the second transformation relationship.

An example will be provided to illustrate a calculation method of the first transformation relationship in the following.

In the embodiment of the present disclosure, before the acquiring the second point cloud data of the marker in the calibration room through the LiDAR to be calibrated (Step S1030), the method may further include: controlling the autonomous mobile machine to move to a designated position in the calibration room.

Exemplarily, the step of controlling the autonomous mobile machine to move to the designated position in the calibration room may be implemented by the following step: controlling the autonomous mobile machine to move to the designated position in the calibration room through a preset navigation path or manual operation. After the autonomous mobile machine stops moving, further positioning and calibration operations can be performed to ensure the stability and accuracy of the autonomous mobile machine. For example, a parking position measurement component can be used for detecting whether the autonomous mobile machine has reached the designated position. If the autonomous mobile machine has reached the designated position, the parking position measurement component will send a signal to the data acquisition module and the LiDAR to be calibrated on the autonomous mobile machine. If the autonomous mobile machine has not reached the designated position, a distance between the autonomous mobile machine and the designated position may be determined and sent to the control system of the autonomous mobile machine. The control system controls the autonomous mobile machine to move to the designated position based on this distance.

In the embodiment of the present disclosure, by controlling the autonomous mobile machine to move to the designated position, both the data acquisition module and the LiDAR disposed on the autonomous mobile machine can comprehensively and effectively collect data of the autonomous mobile machine and the calibration room, improving the accuracy of the calibration result.

An example will be provided to illustrate a calculation method of the first transformation relationship with reference to FIG. 15 in the following.

FIG. 15 is a schematic flowchart of determining a first transformation relationship according to some embodiments of the present disclosure. The embodiment shown in FIG. 15 is extended from the embodiment shown in FIG. 10. The following focuses on describing a difference between the embodiments shown in FIG. 15 and FIG. 10, and the similarities will not be described.

As shown in FIG. 15, in the embodiment of the present disclosure, the calculating, based at least on the first point cloud data and coordinate system data of the autonomous mobile machine, the first transformation relationship (Step S1020) includes the following steps.

Step S1510: acquiring third point cloud data of the marker in the calibration room through the data acquisition module.

Exemplarily, when the data acquisition module is a LiDAR, original point cloud data of the marker collected by the LiDAR may be directly used as the third point cloud data. When the data acquisition module is a camera, the camera can collect RGB images and depth images of the marker in the calibration room, and coordinate data formed by projecting the RGB images and the depth images into three-dimensional space can be used as the third point cloud data.

Step S1520: performing registration on the third point cloud data and the first point cloud data to obtain a third transformation relationship.

The third transformation relationship is a transformation relationship between a coordinate system of the data acquisition module and the coordinate system of the calibration room.

Since the first point cloud data is the full-scene point cloud map data of the calibration room, the first point cloud data contains point cloud data of the marker. That is, both the first point cloud data and the third point cloud data include the point cloud data of the marker. Taking the marker as a feature point, the third transformation relationship can be determined by performing registration on the third point cloud data and the first point cloud data using a point cloud registration algorithm.

Exemplarily, to reduce a workload during the registration process, point cloud data corresponding to the marker in the first point cloud data may be extracted. Based on the extracted point cloud data, the first point cloud data may be updated, and then the updated first point cloud data is registered with the third point cloud data, which greatly reduces an amount of registration data and improves registration efficiency.

Step S1530: acquiring fourth point cloud data of the autonomous mobile machine collected by the data acquisition module, and determining, based on the fourth point cloud data, a fourth transformation relationship.

The fourth transformation relationship is a transformation relationship between the coordinate system of the autonomous mobile machine and the coordinate system of the data acquisition module.

In some embodiments, structural information of the autonomous mobile machine may be acquired, and a first positional relationship between two positions on the autonomous mobile machine may be determined based on the structural information. The first positional relationship is an inherent positional relationship between various structures on the autonomous mobile machine, while the fourth point cloud data is point cloud data of each structure collected by different LiDARs of the data acquisition module. Therefore, the fourth transformation relationship can be established based on the inherent positional relationship between various structures and the point cloud data corresponding to each structure.

For example, the device positions may include a center point of a front wheel of the autonomous mobile machine and a point on a rear-view mirror. Based on the fourth point cloud data, a second positional relationship between these two positions on the autonomous mobile machine may also be determined.

Exemplarily, based on the structural information of the autonomous mobile machine, the first positional relationship between a position 1 and a position 2 on the autonomous mobile machine may be determined. Based on the fourth point cloud data, the second positional relationship between the position 1 and the position 2 can be determined. And based on the first positional relationship and the second positional relationship, the fourth transformation relationship may be determined.

Step S1540: acquiring, based on the third transformation relationship and the fourth transformation relationship, the first transformation relationship.

Since both the third transformation relationship and the fourth transformation relationship are associated with the coordinate system of the data acquisition module, the coordinate system of the data acquisition module may be used as an intermediate coordinate system to transform and obtain the transformation relationship between the coordinate system of the autonomous mobile machine and the coordinate system of the calibration room.

In the embodiment of the present disclosure, by using the data acquisition module in the calibration room, the first transformation relationship is determined without manual intervention, realizing a high degree of automation, and further reducing labor costs and time costs.

An example will be provided to illustrate a calculation method of the fourth transformation relationship in the following with reference to FIG. 16.

FIG. 16 is a schematic flowchart of determining a fourth transformation relationship according to some embodiments of the present disclosure. The embodiment shown in FIG. 16 is extended from the embodiment shown in FIG. 15. The following focuses on describing a difference between the embodiments shown in FIG. 16 and FIG. 15, and the similarities will not be described.

As shown in FIG. 16, the step of acquiring the fourth point cloud data of the autonomous mobile machine collected by the data acquisition module, and determining, based on the fourth point cloud data, the fourth transformation relationship (Step S1530) includes the following steps.

Step S1610: acquiring coordinates of a center of the autonomous mobile machine in the coordinate system of the autonomous mobile machine.

The center of the autonomous mobile machine is a geometric center or a centroid of the autonomous mobile machine.

Coordinates of the center of the autonomous mobile machine in the coordinate system of the autonomous mobile machine may be determined through a positional relationship between a feature point corresponding to an origin of the coordinate system of the autonomous mobile machine on the autonomous mobile machine and the center of the autonomous mobile machine. Exemplarily, the origin of the coordinate system of the autonomous mobile machine may correspond to a rear wheel axle center of the autonomous mobile machine. Based on a positional relationship between the feature point and the center of the autonomous mobile machine, as well as the coordinates of the origin of the coordinate system of the autonomous mobile machine, the coordinates of the center of the autonomous mobile machine in the coordinate system of the autonomous mobile machine may be determined.

Step S1620: calculating, based on the fourth point cloud data of the autonomous mobile machine collected by the data acquisition module, coordinates of the center of the autonomous mobile machine in the coordinate system of the data acquisition module.

The coordinates of the center of the autonomous mobile machine in the coordinate system of the data acquisition module are determined through a positional relationship between a feature point corresponding to an origin of the coordinate system of the data acquisition module and the center of the autonomous mobile machine. Exemplarily, when the data acquisition module is a LiDAR, the origin of the coordinate system of the data acquisition module is an installation position of the LiDAR. Based on a positional relationship between the installation position and the center of the autonomous mobile machine, as well as coordinates of the origin of the coordinate system of the data acquisition module, the coordinates of the center of the autonomous mobile machine in the coordinate system of the data acquisition module may be determined.

Step S1630: determining, based on the coordinates of the center of the autonomous mobile machine in the coordinate system of the data acquisition module and the coordinates of the center of the autonomous mobile machine in the coordinate system of the autonomous mobile machine, the fourth transformation relationship.

The fourth transformation relationship includes a rotation matrix and a translation matrix. Specific values of the rotation matrix and the translation matrix can be calculated based on the coordinates of the center of the autonomous mobile machine in the coordinate system of the data acquisition module and the coordinates of the center of the autonomous mobile machine in the coordinate system of the autonomous mobile machine. Through the fourth transformation relationship, the point cloud data of the coordinate system of the autonomous mobile machine may be transformed to point cloud data of the coordinate system of the data acquisition module; alternatively, the point cloud data in the coordinate system of the data acquisition module may be transformed to point cloud data of the coordinate system of the autonomous mobile machine, thereby realizing data conversion and sharing between different coordinate systems.

An example will be provided to illustrate a determination method of the second transformation relationship.

In the embodiment of the present disclosure, the calibration room includes a target region, which is a region characterized by point features, as well as line features and/or surface features. The step of performing registration on the second point cloud data and the first point cloud data to obtain the second transformation relationship (Step S1040) includes: performing registration on point cloud data of the target region in the first point cloud data and point cloud data of the target region in the second point cloud data to obtain the second transformation relationship.

The target region is a partial region in the calibration room, for example, at least one of inner walls, a floor of the calibration room, and an equipment-occupied region in the calibration room. Since both the first point cloud data and the second point cloud data are point cloud data corresponding to the calibration room, point cloud registration performed on the first point cloud data and the second point cloud data is equivalent to registration on all features in the calibration room which need a large amount of data processing. Therefore, the point cloud data corresponding to a partial region in the calibration room may be extracted for registration, thereby reducing a computational load, ensuring the accuracy of the registration result, and improving registration efficiency.

Exemplarily, the target region includes an intersection region of inner wall planes of the calibration room, and the intersection region of the inner wall planes includes either two intersecting planes or three mutually intersecting planes. Since the intersection region of inner wall planes can provide stable feature points and feature lines, the stability and accuracy of registration may be improved by using the intersection region as the target region.

An example will be provided to illustrate a specific implementation of point cloud registration in the following with reference to FIG. 17.

Figure 17:
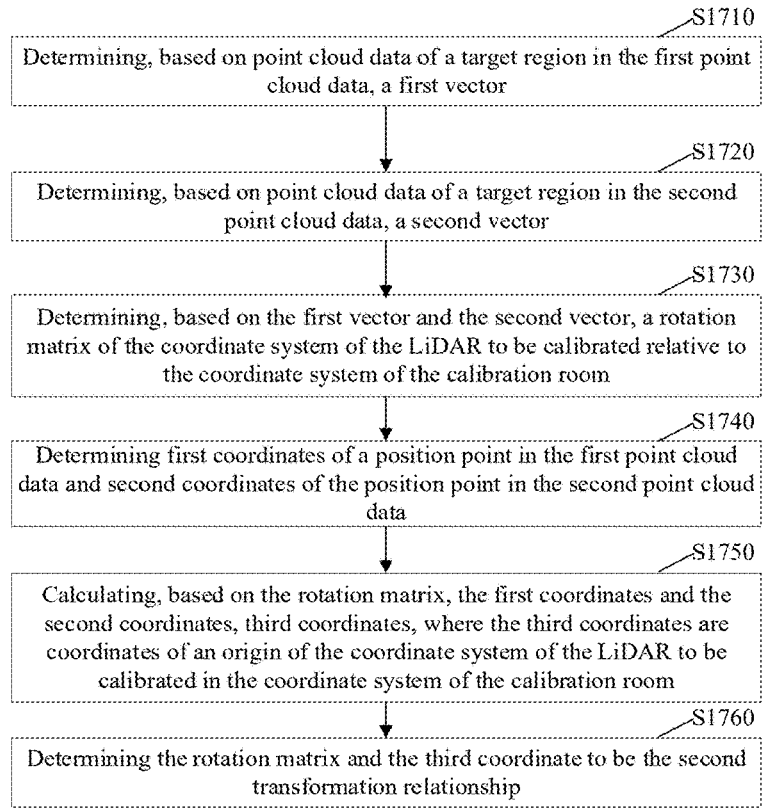
FIG. 17 is a schematic flowchart of determining a calibration result according to another embodiment of the present disclosure.

FIG. 17 is a schematic flowchart of point cloud registration according to another embodiment of the present disclosure.

As shown in FIG. 17, in the embodiment of the present disclosure, the step of performing registration on the point cloud data of the target region in the first point cloud data and the point cloud data of the target region in the second point cloud data to obtain the second transformation relationship includes the following steps.

Step S1710: determining, based on point cloud data of a target region in the first point cloud data, a first vector.

Step S1720: determining, based on point cloud data of a target region in the second point cloud data, a second vector.

In some embodiments, the first vector is a direction vector of the target region determined based on the first point cloud data; and the second vector is a direction vector of the target region determined based on the second point cloud data.

Step S1730: determining, based on the first vector and the second vector, a rotation matrix of the coordinate system of the LiDAR to be calibrated relative to the coordinate system of the calibration room.

The rotation matrix is used for describing a rotation relationship between the coordinate system of the LiDAR to be calibrated and the coordinate system of the calibration room, and is one of key parameters for realizing coordinate system transformation. Exemplarily, angle between the first vector and the second vector, as well as a rotation axis corresponding to this angle, can be calculated, and the rotation matrix may be determined based on the angle and the rotation axis.

Step S1740: determining first coordinates of a position point in the first point cloud data and second coordinates of the position point in the second point cloud data.

Exemplarily, the position point may be a feature point in the target region, such as an intersection point at the intersection region of inner wall planes.

Step S1750: calculating, based on the rotation matrix, the first coordinates and the second coordinates, third coordinates, where the third coordinates are coordinates of an origin of the coordinate system of the LiDAR to be calibrated in the coordinate system of the calibration room.

Exemplarily, based on the rotation matrix, the first coordinates can be transformed from the coordinate system of the calibration room corresponding to the first point cloud data to the coordinate system of the LiDAR to be calibrated corresponding to the second point cloud data to obtain transformed coordinates. Based on the transformed coordinates and the second coordinates, a translation vector of coordinates, corresponding to the position point, in the coordinate system of the LiDAR to be calibrated relative to the coordinate system of the calibration room is determined. Based on the translation vector, coordinates of the origin of the coordinate system of the LiDAR to be calibrated in the coordinate system of the calibration room may be determined as the third coordinate.

Step S1760: determining the rotation matrix and the third coordinate to be the second transformation relationship.

The second transformation relationship between the coordinate system of the LiDAR to be calibrated and to the coordinate system of the calibration room may be determined based on the third coordinate and the rotation matrix. In the embodiment of the present disclosure, accurate transformation between the coordinate system of the LiDAR to be calibrated and the coordinate system of the calibration room may be realized, so that labor costs and time costs may be reduced through an automated manner while improving the accuracy and efficiency of calibration.

An example will be provided to illustrate a preprocessing method for the point cloud data in the following.

In the embodiment of the present disclosure, before the step of performing registration on the second point cloud data and the first point cloud data to obtain the second transformation relationship (Step S1040), the method further includes: performing preprocessing on the second point cloud data.

The preprocessing includes at least one of initial parameter transformation, point cloud filtering, and point cloud down sampling.

In some embodiments, the initial parameter transformation refers to initialization of a transformation relationship between the coordinate system of the LiDAR to be calibrated and the coordinate system of the calibration room. Exemplarily, an initial transformation relationship between the coordinate system of the LiDAR to be calibrated and the coordinate system of the calibration room may be set based on the position of the autonomous mobile machine in the calibration room.

Point cloud filtering is used to remove noise points in the second point cloud data and improve accuracy of the point cloud data. Point cloud down sampling is used to reduce a quantity of points in the second point cloud data to reduce a data processing load while retaining overall features of the point cloud data. The accuracy and efficiency of the subsequent registration process may be improved by preprocessing the second point cloud data.

An example will be provided to illustrate a calibration method for a camera in the following.

Figure 18:
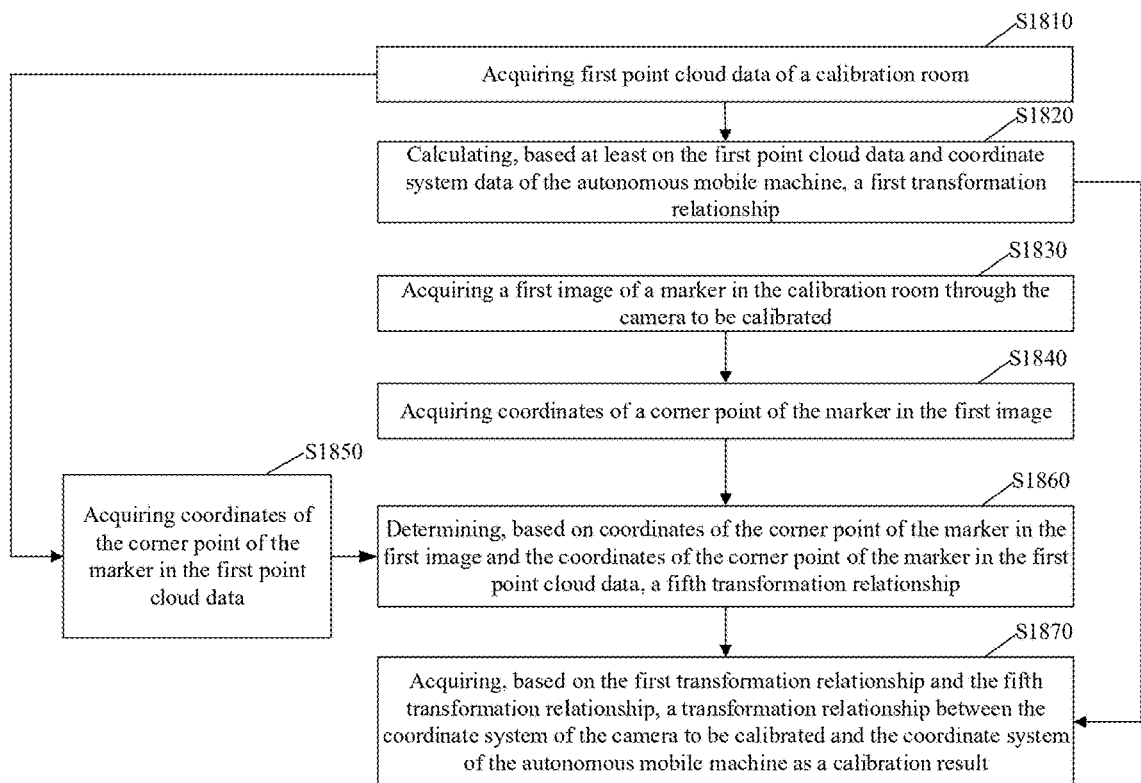
FIG. 18 is a schematic flowchart of a calibration method for a camera according to some embodiments of the present disclosure.

FIG. 18 is a schematic flowchart of a calibration method for a camera according to some embodiments of the present disclosure. As shown in FIG. 18, in the embodiment of the present disclosure, a camera to be calibrated is disposed on the autonomous mobile machine, and the calibration method includes the following steps.

Step S1810: acquiring first point cloud data of a calibration room.

The first point cloud data is full-scene point cloud map data of the calibration room.

Step S1820: calculating, based at least on the first point cloud data and coordinate system data of the autonomous mobile machine, a first transformation relationship.

The first transformation relationship is a transformation relationship between a coordinate system of the autonomous mobile machine and a coordinate system of the calibration room.

Step S1830: acquiring a first image of a marker in the calibration room through the camera to be calibrated.

The camera to be calibrated refers to a camera disposed on the autonomous mobile machine that needs to be calibrated.

A quantity of the camera to be calibrated may be greater than one. The first image of the marker in the calibration room may be acquired through each camera to be calibrated. The processes of image acquisition by different cameras to be calibrated do not affect each other. To improve calibration efficiency, cameras to be calibrated may be controlled to acquire the first images in parallel.

Step S1840: acquiring coordinates of a corner point of the marker in the first image.

Step S1850: acquiring coordinates of the corner point of the marker in the first point cloud data.

The corner point may be an inflection point of a contour of the marker, or an intersection point of a specific pattern on the marker. Exemplarily, if the marker is a wall corner in the calibration room, the wall corner is the corner point; if the marker is an indicator, with a cross pattern thereon, placed in the calibration room, an intersection point of the cross pattern is the corner point; and if the marker is a rectangular piece of white foam, a vertex of the white foam is the corner point.

Step S1860: determining, based on coordinates of the corner point of the marker in the first image and the coordinates of the corner point of the marker in the first point cloud data, a fifth transformation relationship.

The fifth transformation relationship is a transformation relationship between a coordinate system of the camera to be calibrated and the coordinate system of the calibration room.

In some embodiments, for each camera to be calibrated, the first image collected by the camera to be calibrated includes corner points of a plurality of markers, and the coordinates corresponding to each corner point may be determined respectively. Coordinate registration may be performed based on the coordinates of the corner points in the first image and the coordinates of the corner points in the first point cloud data to obtain the fifth transformation relationship.

Step S1870: acquiring, based on the first transformation relationship and the fifth transformation relationship, a transformation relationship between the coordinate system of the camera to be calibrated and the coordinate system of the autonomous mobile machine as a second calibration result.

Since the first transformation relationship is the transformation relationship between the coordinate system of the autonomous mobile machine and the coordinate system of the calibration room, and the fifth transformation relationship is the transformation relationship between the coordinate system of the camera to be calibrated and the coordinate system of the calibration room, both the first transformation relationship and the fifth transformation relationship are related to the coordinate system of the calibration room. Accordingly, the coordinate system of the calibration room may be used as an intermediate coordinate system to establish an association between the coordinate system of the autonomous mobile machine and the coordinate system of the camera to be calibrated, thereby obtaining the transformation relationship between the coordinate system of the camera to be calibrated and the coordinate system of the autonomous mobile machine, which is taken as the calibration result.

In the embodiment of the present disclosure, accurate calibration of the camera to be calibrated may be achieved by using the first point cloud data of the calibration room and the images collected by the camera to be calibrated. The calibration method requires no manual intervention, realizing a high degree of automation, which not only reduces labor costs and time costs, but also improves calibration efficiency and accuracy.

An example will be provided to illustrate a specific implementation of determining the first transformation relationship with reference to FIG. 19 in the following.

FIG. 19 is a schematic flowchart of determining a first transformation relationship according to another embodiment of the present disclosure. The embodiment shown in FIG. 19 is extended from the embodiment shown in FIG. 18. The following focuses on describing a difference between the embodiments shown in FIG. 19 and FIG. 18, and the similarities will not be described.

As shown in FIG. 19, in the embodiment of the present disclosure, the step of calculating, based at least on the first point cloud data and the coordinate system data of the autonomous mobile machine, the first transformation relationship (Step S1820) includes the following steps.

Step S1910: acquiring third point cloud data of the marker in the calibration room through the data acquisition module.

Step S1920: performing registration on the third point cloud data and the first point cloud data to obtain a third transformation relationship.

The third transformation relationship is a transformation relationship between a coordinate system of the data acquisition module and the coordinate system of the calibration room.

Step S1930: acquiring fourth point cloud data of the autonomous mobile machine collected by the data acquisition module, and determining, based on the fourth point cloud data, a fourth transformation relationship.

The fourth transformation relationship is a transformation relationship between the coordinate system of the autonomous mobile machine and the coordinate system of the data acquisition module.

Step S1940: acquiring, based on the third transformation relationship and the fourth transformation relationship, the first transformation relationship.

The determination method of the first transformation relationship used in the calibration of the LiDAR to be calibrated mentioned above may be adopted to determine the first transformation relationship in the embodiment of the present disclosure. By using the data acquisition module in the calibration room to determine the first transformation relationship, no manual intervention is required, realizing a high degree of automation, and further reducing labor costs and time costs.

An example will be provided to illustrate a specific implementation of determining the fourth transformation relationship with reference to FIG. 20 in the following.

FIG. 20 is a schematic flowchart of determining a fourth transformation relationship according to another embodiment of the present disclosure. The embodiment shown in FIG. 20 is extended from the embodiment shown in FIG. 19. The following focuses on describing a difference between the embodiments shown in FIG. 20 and FIG. 19, and the similarities will not be described.

As shown in FIG. 20, in the embodiment of the present disclosure, the step of acquiring the fourth point cloud data of the autonomous mobile machine collected by the data acquisition module, and determining, based on the fourth point cloud data, the fourth transformation relationship (Step S1930) includes the following steps.

Step S2010: acquiring coordinates of a center of the autonomous mobile machine in the coordinate system of the autonomous mobile machine.

Step S2020: calculating, based on the fourth point cloud data of the autonomous mobile machine collected by the data acquisition module, coordinates of the center of the autonomous mobile machine in the coordinate system of the data acquisition module.

Step S2030: determining, based on the coordinates of the center of the autonomous mobile machine in the coordinate system of the data acquisition module and the coordinates of the center of the autonomous mobile machine in the coordinate system of the autonomous mobile machine, the fourth transformation relationship.

The determination method of the fourth transformation relationship used in the calibration of the LiDAR to be calibrated mentioned above can be adopted to determine the fourth transformation relationship in the embodiments of the present disclosure. Through the fourth transformation relationship, the point cloud data in the coordinate system of the autonomous mobile machine may be transformed to the coordinate system of the data acquisition module, or the point cloud data in the coordinate system of the data acquisition module may be transformed to the coordinate system of the autonomous mobile machine, thereby realizing data conversion and sharing between different coordinate systems.

In a case where both a LiDAR and a camera are disposed on the autonomous mobile machine, the registration between the LiDAR and the camera disposed on the autonomous mobile machine may be completed by using the first point cloud data. By synchronously collecting projection coordinates of a feature point in the calibration room in the image and the point cloud, a pose relationship between the camera and the LiDAR may be calculated based on a Perspective-n-Point (PnP) algorithm, so as to realize joint calibration of the camera and the LiDAR.

An example will be provided to illustrate a specific implementation of calibrating the coordinate system of the LiDAR and the coordinate system of the camera with reference to FIG. 21 in the following.

Figure 21:
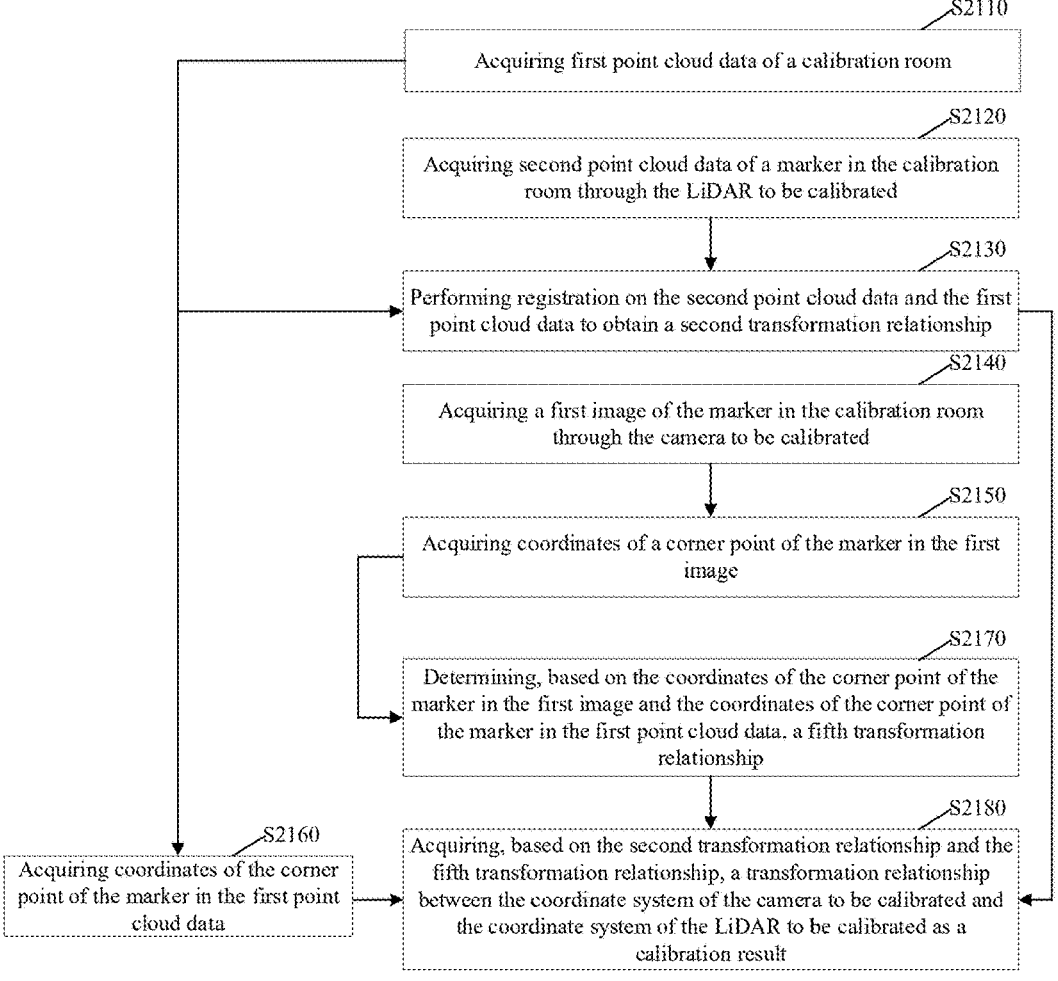
FIG. 21 is a schematic flowchart of a calibration method according to still another embodiment of the present disclosure.

FIG. 21 is a schematic flowchart of a calibration method according to still another embodiment of the present disclosure. As shown in FIG. 21, in the embodiment of the present disclosure, a camera to be calibrated and a LiDAR to be calibrated are disposed on the autonomous mobile machine, and the calibration method include the following steps.

Step S2110: acquiring first point cloud data of the calibration room.

The first point cloud data is full-scene point cloud map data of the calibration room.

Step S2120: acquiring second point cloud data of a marker in the calibration room through the LiDAR to be calibrated.

Step S2130: performing registration on the second point cloud data and the first point cloud data to obtain a second transformation relationship.

The second transformation relationship is a transformation relationship between a coordinate system of the LiDAR to be calibrated and a coordinate system of the calibration room.

Step S2140: acquiring a first image of the marker in the calibration room through the camera to be calibrated.

Step S2150: acquiring coordinates of a corner point of the marker in the first image.

Step S2160: acquiring coordinates of the corner point of the marker in the first point cloud data.

Step S2170: determining, based on the coordinates of the corner point of the marker in the first image and the coordinates of the corner point of the marker in the first point cloud data, a fifth transformation relationship.

The fifth transformation relationship is a transformation relationship between a coordinate system of the camera to be calibrated and the coordinate system of the calibration room.

Step S2180: acquiring, based on the second transformation relationship and the fifth transformation relationship, a transformation relationship between the coordinate system of the camera to be calibrated and the coordinate system of the LiDAR to be calibrated as a third calibration result.

Since the second transformation relationship is the transformation relationship between the coordinate system of the LiDAR to be calibrated and the coordinate system of the calibration room, and the fifth transformation relationship is the transformation relationship between the coordinate system of the camera to be calibrated and the coordinate system of the calibration room, both the second transformation relationship and the fifth transformation relationship are related to the coordinate system of the calibration room. Accordingly, the coordinate system of the calibration room may be used as an intermediate coordinate system to establish an association between the coordinate system of the LiDAR to be calibrated and the coordinate system of the camera to be calibrated, to obtain the transformation relationship between the coordinate system of the LiDAR to be calibrated and the coordinate system of the camera to be calibrated, which is taken as the third calibration result.

In the embodiment of the present disclosure, accurate calibration between the coordinate system of the LiDAR to be calibrated and the coordinate system of the camera to be calibrated may be achieved by using the first point cloud data of the calibration room and the images collected by the camera to be calibrated. The calibration method requires no manual intervention, realizing a high degree of automation, which not only reduces labor costs and time costs, but also improves calibration efficiency and accuracy.

An example will be provided to illustrate a method for determining a center of the autonomous mobile machine.

Exemplarily, taking the autonomous mobile machine as a forklift for illustration, the autonomous mobile machine includes a fork assembly, a first wheel assembly, and a second wheel assembly. The center of the autonomous mobile machine refers to a midpoint between axes of the first wheel assembly and the second wheel assembly.

Figure 22:
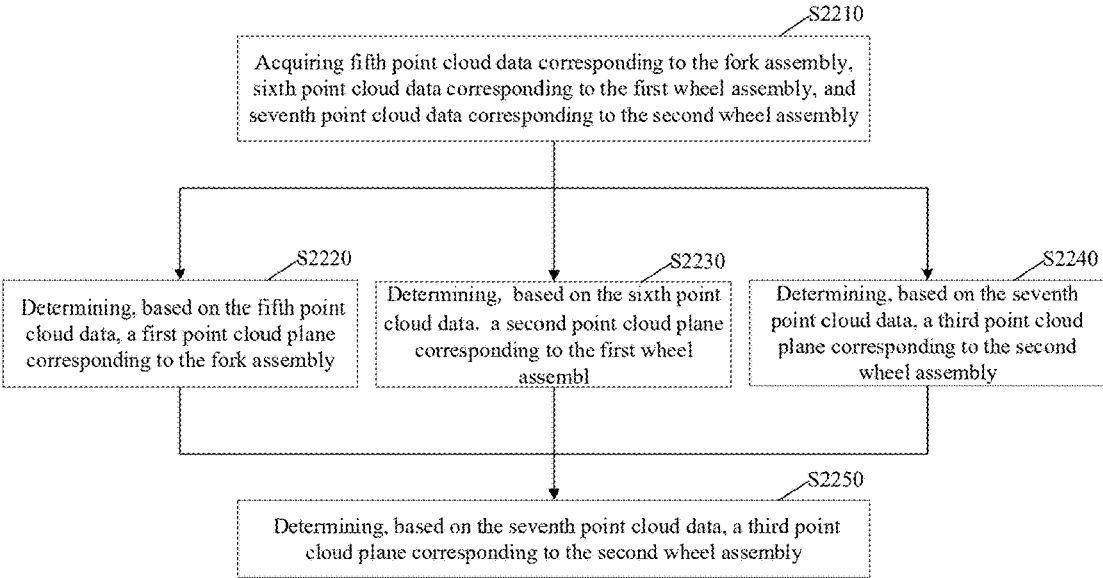
FIG. 22 is a schematic flowchart of a method for determining a center of an autonomous mobile machine according to some embodiments of the present disclosure.

FIG. 22 is a schematic flowchart of a method for determining a center of an autonomous mobile machine according to some embodiments of the present disclosure. As shown in FIG. 22, the method for determining the center of an autonomous mobile machine includes the following steps.

Step S2210: acquiring fifth point cloud data corresponding to the fork assembly, sixth point cloud data corresponding to the first wheel assembly, and seventh point cloud data corresponding to the second wheel assembly.

The autonomous mobile machine may be moved to a fixed position in a target environment. The center of the autonomous mobile machine may be used for calibrating a LiDAR to be calibrated on the autonomous mobile machine. Therefore, the target environment may be set as the calibration room for performing calibration operations, so as to further perform the calibration operation on the LiDAR to be calibrated after determining the center of the autonomous mobile machine.

Figure 23:
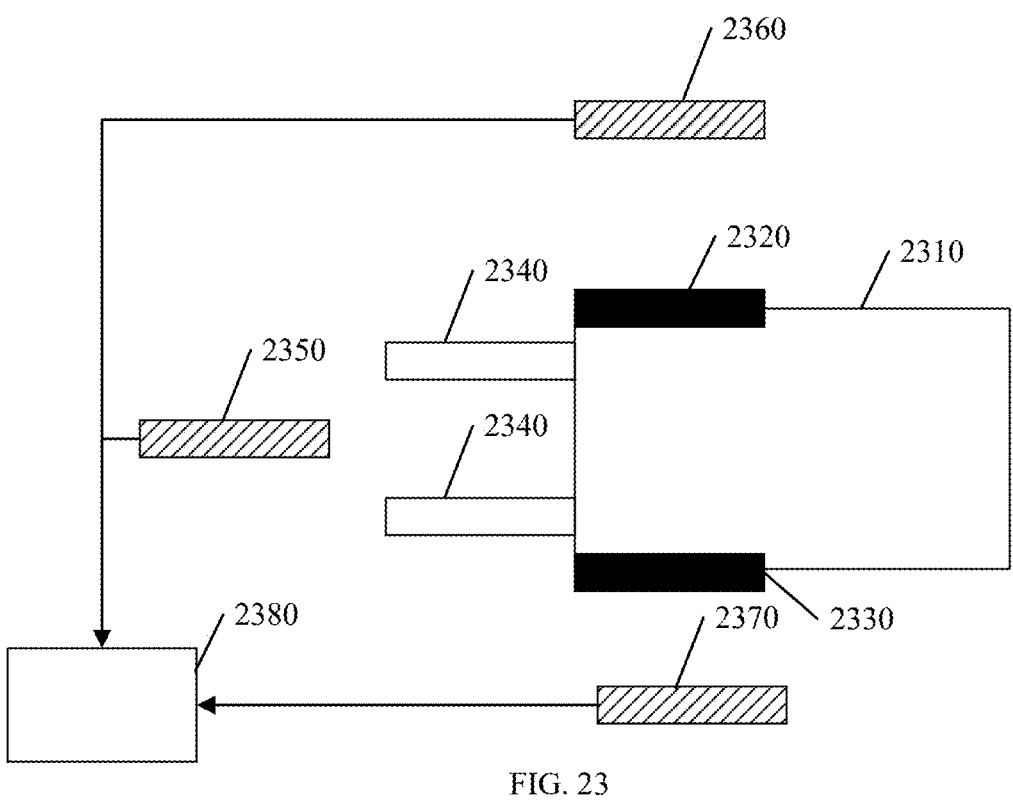
FIG. 23 is a schematic layout diagram of a data acquisition module according to another embodiment of the present disclosure.

To effectively collect point cloud data of different components on the autonomous mobile machine, a data acquisition module may be disposed on the fork assembly in advance, and the data acquisition module includes at least one LiDAR. FIG. 23 is a schematic layout diagram of a data acquisition module according to another embodiment of the present disclosure. As shown in FIG. 23, the autonomous mobile machine is a forklift, and components to be measured are installed on the forklift body 2310. The components to be measured include a first wheel assembly 2320, a second wheel assembly 2330, and a fork assembly 2340. LiDARs are disposed around the forklift body 2310 to collect point cloud data of the components to be measured. The installation position of the LiDARs are associated with a detection range of the LiDAR and the positions of the components to be measured, so that the detection range of the LiDAR is capable of cover all the components to be measured, thereby ensuring that the LiDARs can effectively collect the point cloud data of the components to be measured.

The LiDAR may be fixed by a bracket. Exemplarily, there are three brackets fixed on the ground, and a LiDAR is installed on each bracket. For example, a LiDAR 2350 is installed facing the fork assembly 2340 to collect fifth point cloud data corresponding to the fork assembly 2340; a LiDAR 2360 is installed facing the first wheel assembly 2320 to collect sixth point cloud data corresponding to the first wheel assembly 2320; a LiDAR 2370 is installed facing the second wheel assembly 2330 to collect seventh point cloud data corresponding to the second wheel assembly 2330. Furthermore, the fifth point cloud data, the sixth point cloud data, and the seventh point cloud data are all transmitted to the calculation module 2380 for calculation.

To facilitate subsequent processing of the point cloud data, calibration of external parameter between the three LiDARs is performed in advance. The fifth point cloud data, the sixth point cloud data, and the seventh point cloud data may be updated based on the calibration result, so that the fifth point cloud data, the sixth point cloud data, and the seventh point cloud data adopt a same coordinate system, thereby ensuring the accuracy and consistency of subsequent processing.

In some embodiments, the fifth point cloud data, the sixth point cloud data, and the seventh point cloud data are original point cloud data collected by a LiDAR of the data acquisition module, or point cloud data obtained after data processing (such as point cloud filtering operations) on the original point cloud data.

Optionally, the fifth point cloud data may be point cloud data corresponding to a root region of the fork assembly. In practice, the fork assembly is L-shaped and can be divided into a horizontal section and a vertical section. The horizontal section is used for placing goods; and the vertical section, which may also be referred to as the root region, is used for providing supporting force.

Step S2220: determining, based on the fifth point cloud data, a first point cloud plane corresponding to the fork assembly.

The fifth point cloud data is three-dimensional data of the entire fork assembly in a three-dimensional space. The first point cloud plane corresponding to the fork assembly may be a plane corresponding to an outer surface of the fork assembly.

In some embodiments, point cloud data corresponding to the outer surface of the fork assembly will be extracted from the fifth point cloud data. Then, the point cloud data corresponding to the outer surface of the fork assembly will be processed using a plane fitting algorithm to obtain the first point cloud plane. For example, the plane fitting algorithm includes methods such as the least squares method and Random Sample Consensus (RANSAC).

Step S2230: determining, based on the sixth point cloud data, a second point cloud plane corresponding to the first wheel assembly.

To determine the second point cloud plane corresponding to the first wheel assembly, point cloud data corresponding to an outer surface of the first wheel assembly is extracted from the sixth point cloud data. The point cloud data is capable of reflecting a shape of the first wheel assembly. Then, the extracted point cloud data is processed through the plane fitting algorithm to obtain the second point cloud plane. Through this process, the position information of the first wheel assembly in the three-dimensional space may be determined accurately.

Step S2240: determining, based on the seventh point cloud data, a third point cloud plane corresponding to the second wheel assembly.

In some embodiments, point cloud data corresponding to an outer surface of the second wheel assembly may be extracted from the seventh point cloud data. The point cloud data is capable of reflecting a shape of the second wheel assembly. Then, the extracted point cloud data is processed through the plane fitting algorithm to obtain the third point cloud plane. Through this process, the position information of the second wheel assembly in the three-dimensional space may be determined accurately.

Step S2250: determining, based on the first point cloud plane, the second point cloud plane and the third point cloud plane, the center of the autonomous mobile machine.

The first point cloud plane is a plane where the outer surface of the fork assembly is located. The second point cloud plane is a plane where the outer surface of the first wheel assembly is located, and the third point cloud plane is a plane where the outer surface of the second wheel assembly is located.

Since the second point cloud plane and the third point cloud plane are planes corresponding to the outer surfaces of the two wheel assemblies, and the planes corresponding to the outer surfaces of the two wheel assemblies are parallel to each other. The second point cloud plane is parallel to the third point cloud plane. The center of the autonomous mobile machine can be determined by extracting geometric features (such as normal vectors, intersection lines, centers, and plane distances, etc.) of the first point cloud plane, the second point cloud plane, and the third point cloud plane.

In the embodiment of the present disclosure, the first point cloud plane, the second point cloud plane, and the third point cloud plane are determined based on the fifth point cloud data corresponding to the fork assembly, the sixth point cloud data corresponding to the first wheel assembly, and the seventh point cloud data corresponding to the second wheel assembly. Furthermore, the center of the autonomous mobile machine is determined based on the first point cloud plane, the second point cloud plane and the third point cloud plane. That is to say, by using point cloud data of inherent components on the autonomous mobile machine, the center of the autonomous mobile machine is determined without moving the autonomous mobile machine, so that the autonomous mobile machine remains in a stationary state, and the control system of the autonomous mobile machine and its surrounding environment may keep stable, which reduces introduction of errors and improves the accuracy of the center determined. In addition, the method does not rely on manual operations, which reduces human intervention, thus improving overall operational efficiency, significantly lowering costs, enhancing usability and portability, and being applicable to a wider range of scenarios.

To determine each point cloud plane more accurately, a marking tool may be additionally provided on the fork assembly, the first wheel assembly, and the second wheel assembly respectively. The marking tool may be made of a material with high reflectivity, so as to effectively identify the fork assembly, the first wheel assembly, and the second wheel assembly.

An example will be provided to illustrate a specific implementation of an arrangement of a marking tool with reference to FIG. 24 in the following.

Figure 24:
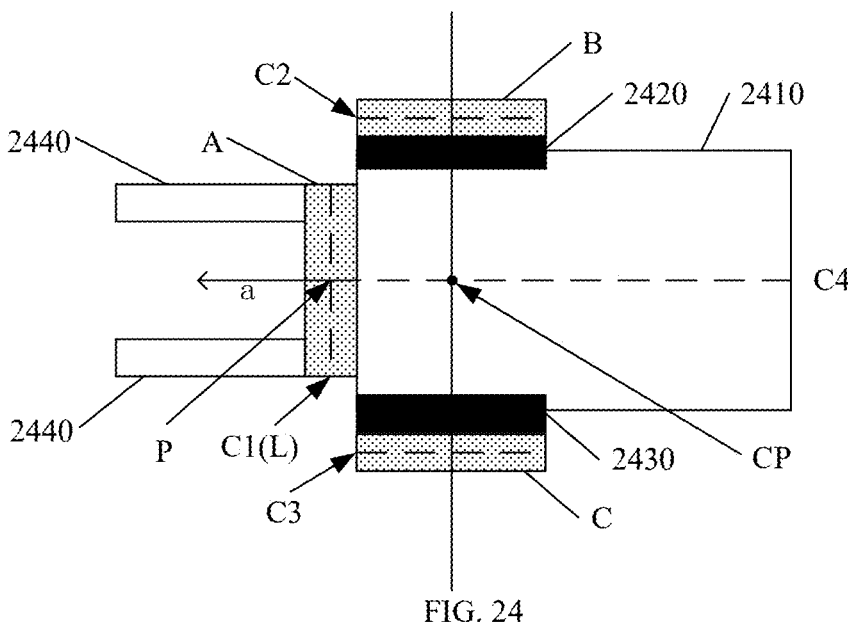
FIG. 24 is a schematic arrangement diagram of a marking tool according to some embodiments of the present disclosure.

FIG. 24 is a schematic arrangement diagram of a marking tool according to some embodiments of the present disclosure. As shown in FIG. 24, the autonomous mobile machine includes a forklift. A marking tool A, a marking tool B, and a marking tool C are disposed on the forklift body 2410, the marking tool A is disposed on a mast of the fork assembly 2440, where the mast is perpendicular to the ground. The marking tool B and the marking tool C are identical external tools, which are clamped on the first wheel assembly 2420 and the second wheel assembly 2430 respectively. A first point cloud plane C1 is a plane where the marking tool A is located, and a normal vector of the first point cloud plane C1 is shown as direction a in FIG. 24. The second point cloud plane C2 is a plane where the marking tool B is located, and the third point cloud plane C3 is a plane where the marking tool C is located. The first point cloud plane C1, the second point cloud plane C2, and the third point cloud plane C3 are indicated by dashed lines in FIG. 24, and all of them are perpendicular to the ground.

An example will be provided to illustrate a specific implementation of determining a first point cloud plane with reference to FIG. 25 in the following.

Figure 25:
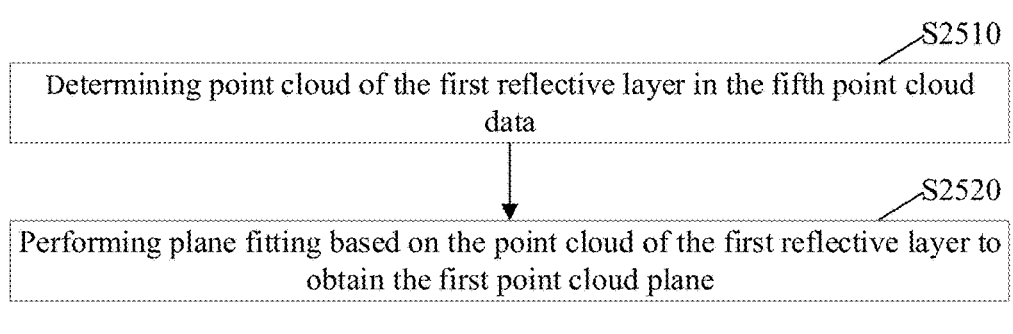
FIG. 25 is a schematic flowchart of a method for determining a first point cloud plane according to some embodiments of the present disclosure.

FIG. 25 is a schematic flowchart of a method for determining a first point cloud plane according to some embodiments of the present disclosure. As shown in FIG. 25, in the embodiment of the present disclosure, a marking tool is provided on the fork assembly, and the marking tool includes a first reflective layer. The step of determining the first point cloud plane corresponding to the fork assembly based on the fifth point cloud data includes:

Step S2510: determining point cloud of the first reflective layer in the fifth point cloud data.

Step S2520: performing plane fitting based on the point cloud of the first reflective layer to obtain the first point cloud plane.

A size, a shape, and an attachment form of the first reflective layer may be set based on characteristics of the fork assembly. Exemplarily, the shape of the first reflective layer may be rectangular or circular. The first reflective layer is made of white foam, which has a characteristic of high reflectivity and can ensure that no laser measurement error is caused by high-reflection distortion. At least one first reflective layer is attached to the fork assembly in advance. During the collection process of the point cloud data, an intensity of laser points of the white foam is higher than an intensity of laser points of other objects such as walls and metal components, facilitating better identification of the fork assembly. The fork assembly includes two forks, and a piece of white foam may be attached to each of the two forks, where the two pieces of white foam are located on a same plane.

Figure 26:
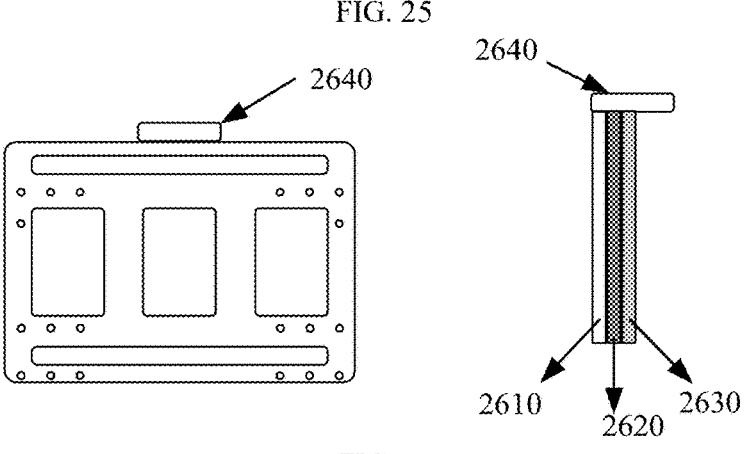
FIG. 26 is a schematic installation diagram of a marking tool according to some embodiments of the present disclosure.

Furthermore, the marking tool further includes a magnetic component, a metal bracket, and a level. FIG. 26 is a schematic installation diagram of a marking tool according to some embodiments of the present disclosure. The marking tool may be mounted on the mast of the fork assembly. As shown in FIG. 26, a piece of white foam 2610, the metal bracket 2620, and the magnetic component 2630 are stacked in sequence. The piece of white foam 2610 is disposed on an outer layer, the metal bracket 2620 is disposed in the middle layer, and the magnetic component 2630 is located on an inner layer. The marking tool is magnetically fixed on the mast through the magnetic component 2630. The level 2640 is located on an upper side of the marking tool, and the attitude of the mast is adjusted according to a detection result of the level 2640 to ensure that the mast is in a state perpendicular to the ground.

In some embodiments, the point cloud may be filtered based on an intensity of each laser point in the fifth point cloud data to obtain the point cloud corresponding to the first reflective layer. For example, each laser point in the fifth point cloud data is traversed to determine whether an intensity value of the laser point falls within an intensity range. If it does, the laser point is taken as the laser point corresponding to the first reflective layer. The point cloud of the first reflective layer is composed of laser points corresponding to the first reflective layer.

Furthermore, plane fitting is performed on the point cloud of the first reflective layer using a plane fitting algorithm to obtain the first point cloud plane.

In the embodiment of the present disclosure, the first point cloud plane is obtained by plane fitting based on the point cloud of the first reflective layer, which effectively removes the influence of noise and reduces the amount of fitting data. In addition, due to a high intensity of laser point cloud corresponding to the first reflective layer, the fitting accuracy and stability may be improved.

An example will be provided to illustrate a specific implementation of determining the point cloud of the first reflective layer with reference to FIG. 27 in the following.

Figure 27:
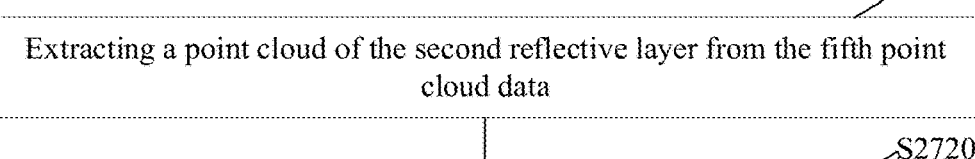
FIG. 27 is a schematic flowchart of a method for determining point cloud of a first reflective layer according to some embodiments of the present disclosure.

FIG. 27 is a schematic flowchart of a method for determining a point cloud of a first reflective layer according to some embodiments of the present disclosure.

In the embodiment of the present disclosure, the marking tool further includes a second reflective layer. Reflectivity of the first reflective layer is less than reflectivity of the second reflective layer, and an orthographic projection of the second reflective layer onto a plane where the first reflective layer is located partially covers the first reflective layer, or does not overlap with the first reflective layer. As shown in FIG.

27, the step of determining the point cloud of the first reflective layer in the fifth point cloud data (step S2510) includes the following steps.

Step S2710: extracting a point cloud of the second reflective layer from the fifth point cloud data.

Step S2720: determining a centroid of the point cloud of the second reflective layer and determining, based on the centroid, the point cloud of the first reflective layer.

Exemplarily, the second reflective layer includes a reflective film. The second reflective layer may cover the first reflective layer.

In some embodiments, an intensity of laser points of the second reflective layer may be determined based on a reflection characteristic of the material of the second reflective layer. Based on the intensity, the laser points of the second reflective layer are extracted from the fifth point cloud data.

Furthermore, an average value of coordinates of all laser points in the point cloud of the second reflective layer is determined, and the centroid of the point cloud of the second reflective layer is determined based on the average value. Alternatively, the centroid may be determined based on a clustering result of the point cloud of the second reflective layer.

An example will be provided to illustrate a specific implementation of determining the centroid with reference to FIG. 28 in the following.

Figure 28:
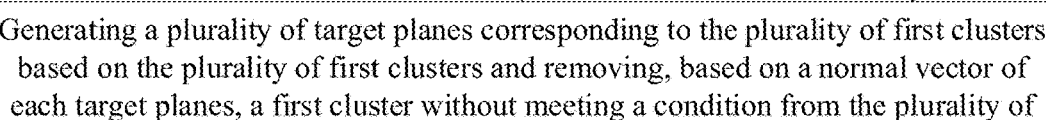
FIG. 28 is a schematic flowchart of a method for determining a centroid according to some embodiments of the present disclosure.

FIG. 28 is a schematic flowchart of a method for determining a centroid according to some embodiments of the present disclosure. As shown in FIG. 28, the step of determining a centroid of the point cloud of the second reflective layer (Step S2720) includes the following steps.

Step S2810: clustering the point cloud of the second reflective layer to obtain a plurality of first clusters.

Exemplarily, a clustering algorithm may be used for clustering the point cloud of the second reflective layer to obtain the plurality of first clusters. For example, the clustering algorithm includes a Density-Based Spatial Clustering of Applications with Noise (DBSCAN) algorithm. The DBSCAN algorithm is a density-based clustering algorithm that can divide regions with a high density into clusters and discover clusters of arbitrary shapes against a background of noise. Through the DBSCAN algorithm, the plurality of first clusters can be obtained, and each first cluster includes a plurality of points.

Step S2820: generating a plurality of target planes corresponding to the plurality of first clusters based on the plurality of first clusters and removing, based on a normal vector of each target planes, a first cluster without meeting a condition from the plurality of first clusters to obtain a second clusters.

In some embodiments, for each first cluster, a plane fitting algorithm is used for fitting a target plane corresponding to the first cluster based on laser points in the first cluster, and a normal vector corresponding to each target plane is determined. The normal vector reflects an orientation of the target plane. Since the orientation of the fork assembly is fixed, the normal vector of a plane to which the fork assembly belongs satisfies an angle condition. For example, an included angle between the normal vector of the plane of the fork assembly and a reference plane is greater than included angle threshold. Based on this, a condition that the included angle between the normal vector of the target plane and the reference plane is greater than the included angle threshold may be used as a filtering condition to obtain a first cluster that meet this condition as a second cluster, thereby eliminating clusters corresponding to noise. Exemplarily, the reference plane may be a plane located by a Z-axis and a Y-axis.

Step S2830: calculating, based on the second clusters, the centroid of the point cloud of the second reflective layer.

In some embodiments, the centroid of the point cloud corresponding to the second cluster may be determined, and this centroid is taken as the centroid of the point cloud of the second reflective layer.

In the embodiment of the present disclosure, point cloud clustering is performed and clusters are removed based on normal vectors to filter out noise points that do not meet the condition. In addition, the centroid is determined based on the clusters after removing the noise points, which avoids an impact of noise on the calculation result and improves the accuracy of the calculation result.

An example will be provided to illustrate a specific implementation of determining a point cloud of the first reflective layer based on the centroid with reference to FIG. 29 in the following.

FIG. 29 is a schematic flowchart of a method for determining a point cloud of a first reflective layer according to some embodiments of the present disclosure. As shown in FIG. 29, the determining the point cloud of the first reflective layer based on the centroid includes:

Step S2910: determining, based on the centroid, a target region corresponding to the first reflective layer.

Exemplarily, the target region corresponding to the first reflective layer may be determined based on the centroid and a size of the first reflective layer. For example, if the first reflective layer is rectangular, the target region is a rectangular region centered at the centroid, with a length and a width being equal to those of the first reflective layer respectively.

Step S2920: extracting, based on the target region, the point cloud of the first reflective layer.

Optionally, laser points located within the target region are filtered from the fifth point cloud data, and these laser points are taken as the point cloud of the first reflective layer. In this way, the point cloud of the first reflective layer can be accurately obtained, providing accurate data for subsequent plane fitting.

In the embodiment of the present disclosure, the second reflective layer further improves filtering accuracy of point cloud data. Since the reflectivity of the second reflective layer is higher than the reflectivity of the first reflective layer, the points of the second reflective layer is more prominent in intensity, facilitating quick identification and extraction. Therefore, interference from noise points may be effectively avoided, thereby improving accuracy and stability of plane fitting.

An example will be provided to illustrate a specific implementation of determining a second point cloud plane with reference to FIG. 30 in the following.

FIG. 30 is a schematic flowchart of a method for determining a second point cloud plane according to some embodiments of the present disclosure. As shown in FIG. 30, in the embodiment of the present disclosure, a marking tool is provided on the first wheel assembly, and the marking tool includes a first reflective layer. The step of determining, based on the sixth point cloud data, a second point cloud plane corresponding to the first wheel assembly includes the following steps.

Step S3010: determining point cloud of the first reflective layer in the sixth point cloud data.

Step S3020: performing plane fitting based on the point cloud of the first reflective layer to obtain the second point cloud plane.

A size, a shape, and an attachment form of the first reflective layer may be set based on characteristics of the first wheel assembly. Exemplarily, the first reflective layer is made of white foam. The shape of the first reflective layer may be a circular ring, which fits closely with the wheel of the first wheel assembly. Alternatively, a plurality of first reflective layers of a same shape may be attached to the wheel of the first wheel assembly, with the plurality of first reflective layers distributed at equal distances. For example, the first reflective layer is circular or triangular. The marking tool provided on the first wheel may further include a magnetic component and a metal bracket.

FIG. 31 is a schematic installation diagram of a marking tool according to another embodiment of the present disclosure. As shown in FIG. 31, the marking tool includes a piece of white foam 3110, a metal bracket 3120, and a magnetic component 3130 stacked in sequence. The white foam 3110 is disposed on an outer layer, the metal bracket 3120 is disposed in the middle layer, and the magnetic component 3130 is located on an inner layer. The marking tool is magnetically fixed on the first wheel assembly through the magnetic component 3130.

FIG. 32 is a schematic diagram of a first reflective layer according to some embodiments of the present disclosure. As shown in FIG. 32, the first reflective layer A1 is circular, and five first reflective layers A1 are distributed at equal intervals on the wheel of the first wheel assembly.

FIG. 33 is a schematic diagram of a first reflective layer according to another embodiment of the present disclosure. As shown in FIG. 33, the first reflective layer A1 is triangular, and five first reflective layers A1 are distributed at equal intervals on the wheel of the first wheel assembly.

In some embodiments, each laser point in the sixth point cloud data is traversed to determine whether an intensity value of the laser point falls within an intensity range. If it does, the laser point is taken as a laser corresponding to the first reflective layer. The point cloud of the first reflective layer is composed of laser points corresponding to the first reflective layer.

Furthermore, plane fitting is performed on the point cloud of the first reflective layer using a plane fitting algorithm to obtain the second point cloud plane.

In the embodiment of the present disclosure, the second point cloud plane is obtained by plane fitting based on the point cloud of the first reflective layer, effectively removing the influence of noise and reducing an amount of fitting data. In addition, due to a high intensity of the laser points of the first reflective layer, fitting accuracy and stability may be improved.

An example will be provided to illustrate a specific implementation of determining the point cloud of the first reflective layer with reference to FIG. 34 in the following.

FIG. 34 is a schematic flowchart of a method for determining a point cloud of a first reflective layer according to some embodiments of the present disclosure. As shown in FIG. 34, the marking tool further includes a second reflective layer. Reflectivity of the first reflective layer is less than reflectivity of the second reflective layer, and an orthographic projection of the second reflective layer onto a plane where the first reflective layer is located partially covers the first reflective layer, or does not overlap with the first reflective layer. The step of determining the point cloud of the first reflective layer in the sixth point cloud data includes the following steps.

Step S3410: extracting a point cloud of the second reflective layer from the sixth point cloud data.

Step S3420: determining a centroid of the point cloud of the second reflective layer and determining, based on the centroid, the point cloud of the first reflective layer.

Exemplarily, the second reflective layer includes a reflective film, and the second reflective layer may be attached to a wheel center of the first wheel assembly to distinguish the wheel from the wheel center and quickly determine the wheel center.

In some embodiments, an intensity of laser points of the second reflective layer may be determined based on a reflection characteristic of the material of the second reflective layer. Based on the intensity, the laser points of the second reflective layer are extracted from the sixth point cloud data.

Optionally, the step of determining the centroid of the point cloud of the second reflective layer includes: clustering the point cloud of the second reflective layer extracted from the sixth point cloud data to obtain third clusters; generating a plurality of target planes corresponding to the plurality of third clusters based on the plurality of third clusters, and removing, based on a normal vector of each target plane, a third cluster without meeting a condition from the plurality of third clusters to obtain a fourth cluster; and calculating, based on the fourth cluster, the centroid of the point cloud of the second reflective layer.

Further, the step of determining, based on the centroid, the point cloud of the first reflective layer includes: determining, based on the centroid, a target region corresponding to the first reflective layer; and extracting, based on the target region, the point cloud of the first reflective layer.

Thus, the point cloud of the first reflective layer may be accurately obtained, providing accurate data for subsequent plane fitting.

An example will be provided to illustrate a specific implementation of the center of the autonomous mobile machine with reference to FIGS. 35 and 36 in the following.

FIG. 35 is a schematic flowchart of a method for determining a center of an autonomous mobile machine according to another embodiment of the present disclosure. The embodiment shown in FIG. 35 is extended from the embodiment shown in FIG. 22. The following focuses on describing a difference between the embodiments shown in FIG. 35 and FIG. 22, and the similarities will not be described.

As shown in FIG. 35, in the embodiment of the present disclosure, the step of determining, based on the first point cloud plane, the second point cloud plane and the third point cloud plane, the center of the autonomous mobile machine includes:

Step S3510: determining a normal vector of the first point cloud plane, center coordinates of the second point cloud plane and center coordinates of the third point cloud plane.

In some embodiments, the normal vector of the first point cloud plane is determined based on coefficients of a plane equation of the first point cloud plane. The normal vector of the first point cloud plane is perpendicular to the first point cloud plane and indicates an orientation of the first point cloud plane. The center coordinates of the second point cloud plane are obtained by calculating arithmetic mean values of coordinates of all points in the second point cloud plane. The center coordinates of the third point cloud plane are obtained by calculating arithmetic mean values of coordinates of all points in the third point cloud plane.

Step S3520: determining, based on the normal vector of the first point cloud plane, the center coordinates of the second point cloud plane and the center coordinates of the third point cloud plane, the center of the autonomous mobile machine.

In some embodiments, a midpoint of a line connecting the center coordinates of the second point cloud plane and the center coordinates of the third point cloud plane is firstly calculated, and then the midpoint is taken as the center of the autonomous mobile machine. Furthermore, to more accurately determine the center of the autonomous mobile machine, the midpoint of the line may be adjusted in combination with the first point cloud plane, and the adjusted midpoint is determined as the coordinates of the center of the autonomous mobile machine.

Furthermore, pose information of the autonomous mobile machine in a three-dimensional space is determined based on the normal vector of the first point cloud plane.

In the embodiment of the present disclosure, the center of the autonomous mobile machine is determined based on the normal vector of the first point cloud plane, the center coordinates of the second point cloud plane and the center coordinates of the third point cloud plane. Accuracy and robustness of center determination are improved based on the structural correlation between the fork assembly and the wheel assembly.

FIG. 36 is a schematic flowchart of a method for determining a center of an autonomous mobile machine according to yet still another embodiment of the present disclosure. The embodiment shown in FIG. 36 is extended from the embodiment shown in FIG. 35. The following focuses on describing a difference between the embodiments shown in FIG. 36 and FIG. 35, and the similarities will not be described.

In the embodiment of the present disclosure, the center of the autonomous mobile machine includes coordinates of the center of the autonomous mobile machine, a yaw angle, a pitch angle and a roll angle of the autonomous mobile machine. As shown in FIG. 36, the step of determining, based on the normal vector of the first point cloud plane, the center coordinates of the second point cloud plane and the center coordinates of the third point cloud plane, the center of the autonomous mobile machine (Step S3520) includes the following steps.

Step S3610: determining, based on the second point cloud plane and the third point cloud plane, a fourth point cloud plane.

Referring to FIG. 24 again, the fourth point cloud plane C4 is parallel to the second point cloud plane C2 and the third point cloud plane C3, and perpendicular to the ground. A distance from the fourth point cloud plane C4 to the second point cloud plane C2 is equal to a distance from the fourth point cloud plane C4 to the third point cloud plane C3. The fourth point cloud plane C4 can be regarded as a midplane between the second point cloud plane C2 and the third point cloud plane C3.

In some embodiments, since the second point cloud plane C2 is parallel to the third point cloud plane C3, the distance between the second point cloud plane C2 and the third point cloud plane C3 may be calculated, and the midpoint position of the distance is determined. Then the fourth point cloud plane C4 parallel to both the second point cloud plane C2 and the third point cloud plane C3 is constructed based on this midpoint position.

Step S3620: determining an intersection line between the first point cloud plane and a fifth point cloud plane.

The fifth point cloud plane is determined based on point cloud data of a plane carrying the autonomous mobile machine, that is, the fifth point cloud plane represents the plane carrying the autonomous mobile machine.

Exemplarily, the plane carrying the autonomous mobile machine may be the ground, a warehouse floor, or the like. When the autonomous mobile machine is stationary, point cloud data of the plane carrying the autonomous mobile machine may be collected by a data acquisition device such as a LiDAR, to obtain the fifth point cloud plane.

The first point cloud plane C1 is perpendicular to the fifth point cloud plane, and the two intersect at an intersection line L. With reference to FIG. 24, the intersection line L coincides with a dashed line representing the first point cloud plane C1.

Step S3630: determining an intersection point between the fourth point cloud plane and the intersection line.

The fourth point cloud plane C4 intersects with the intersection line L at point P.

Step S3640: determining, based on a normal vector of the first point cloud plane, the yaw angle of the autonomous mobile machine.

In some embodiments, a projection direction of the normal vector of the first point cloud plane on the horizontal plane is taken as the orientation of the autonomous mobile machine, and then the yaw angle of the autonomous mobile machine may be determined. The yaw angle represents a rotation angle of the autonomous mobile machine around a vertical axis (Z-axis) and reflects the orientation information of the autonomous mobile machine on the horizontal plane.

Step S3650: determining, based on a normal vector of the fifth point cloud plane, the pitch angle and the roll angle of the autonomous mobile machine.

In some embodiments, a rotation angle of the normal vector of the fifth point cloud plane around the Y-axis is taken as the pitch angle of the autonomous mobile machine. A rotation angle of the normal vector of the fifth point cloud plane around the X-axis is taken as the roll angle of the autonomous mobile machine. The pitch angle reflects tilt of the autonomous mobile machine in the X-Z plane; and the roll angle reflects tilt of the autonomous mobile machine in the Y-Z plane. The yaw angle, the pitch angle and the roll angle of the autonomous mobile machine are determined with reference to a world coordinate system.

Step S3660: determining, based on the intersection point, the center coordinates of the second point cloud plane and the center coordinates of the third point cloud plane, the coordinates of the center of the autonomous mobile machine.

In some embodiments, the midpoint of the line connecting the center coordinates of the second point cloud plane and the center coordinates of the third point cloud plane is firstly calculated, and then this midpoint is taken as the center of the autonomous mobile machine. With reference to FIG. 24, the center of the autonomous mobile machine is denoted as CP. Furthermore, to more accurately determine the center of the autonomous mobile machine, the midpoint of the line may be adjusted in combination with the intersection point between the fourth point cloud plane and the intersection line, and the adjusted midpoint is determined as the coordinates of the center of the autonomous mobile machine.

Furthermore, the center of the autonomous mobile machine may be combined with the direction a in FIG. 24 to establish a self-coordinate system with the center of the autonomous mobile machine as the origin.

In the embodiment of the present disclosure, a more stable reference plane for determining the center of the autonomous mobile machine is determined based on the fourth point cloud plane, so that the coordinates of the center of the autonomous mobile machine may be accurately determined. In addition, by determining the yaw angle, the pitch angle and the roll angle of the autonomous mobile machine, an accurate description of a pose of the autonomous mobile machine in three-dimensional space is achieved.

FIG. 37 is a schematic flowchart of a method for determining a center of an autonomous mobile machine according to yet another embodiment of the present disclosure. The embodiment shown in FIG. 37 is extended from the embodiment shown in FIG. 36. The following focuses on describing a difference between the embodiments shown in FIG. 37 and FIG. 36, and the similarities will not be described.

As shown in FIG. 37, in the embodiment of the present disclosure, the step of determining, based on the intersection point, the center coordinates of the second point cloud plane and the center coordinates of the third point cloud plane, the coordinates of the center of the autonomous mobile machine (Step S3660) includes the following steps.

Step S3710: determining, based on the intersection point and the yaw angle, a first axis coordinate value of the center of the autonomous mobile machine.

The first axis coordinate value represents a coordinate value corresponding to the center of the autonomous mobile machine on the Y-axis.

An example will be provided to illustrate a specific implementation of determining the first axis coordinate value of the center of the autonomous mobile machine with reference to FIG. 38 in the following.

FIG. 38 is a schematic flowchart of a method for determining a first axis coordinate value according to some embodiments of the present disclosure. The embodiment shown in FIG. 38 is extended from the embodiment shown in FIG. 37. The following focuses on describing a difference between the embodiments shown in FIG. 38 and FIG. 37, and the similarities will not be described.

As shown in FIG. 38, in the embodiment of the present disclosure, the step of determining, based on the intersection point and the yaw angle, the first axis coordinate value of the center of the autonomous mobile machine (Step S3710) includes the following steps.

Step S3810: acquiring, based on a sine value of the yaw angle and a target distance value, a first value.

As shown in FIG. 39, based on a size and structure of the autonomous mobile machine, a distance from an outer surface of the fork assembly to the center CP of the autonomous mobile machine may be determined, and this distance is taken as a distance from the first point cloud plane C1 to the center CP of the autonomous mobile machine, i.e., the target distance value K.

Exemplarily, a product of the target distance value K and the sine value of the yaw angle yaw_c is calculated to obtain the first value, denoted as K*sin(yaw_c).

Step S3820: acquiring, based on a first axis coordinate value of the intersection point and the first value, a second value.

With reference to FIG. 24, specifically, the coordinates of the intersection point P are denoted as (px, py, pz), and the first axis coordinate value of the intersection point P is py.

Step S3830: acquiring, based on the first value and the second value, the first axis coordinate value of the center of the autonomous mobile machine.

The target distance value is a value of the distance from the first point cloud plane to the center of the autonomous mobile machine.

Exemplarily, a difference obtained by subtracting the first value from the first axis coordinate value of the intersection point P is taken as the second value. The second value is used as the first axis coordinate value of the center of the autonomous mobile machine, denoted as y_c, i.e., y_c=py−K*sin(yaw_c).

In the embodiment of the present disclosure, a method for determining the first axis coordinate value of the center of the autonomous mobile machine is provided. By introducing the target distance value and combining it with the sine value of the yaw angle for calculation, an adjustment amount can be obtained. Based on this adjustment amount, the first axis coordinate value of the center of the autonomous mobile machine is accurately obtained. The actual structural characteristics of the autonomous mobile machine are fully considered, ensuring the accuracy and reliability of the coordinate value of the center of the autonomous mobile machine.

Step S3720: determining, based on the center coordinates of the second point cloud plane and the center coordinates of the third point cloud plane, a second axis coordinate value of the center of the autonomous mobile machine.

The second axis coordinate value represents a coordinate value corresponding to the center of the autonomous mobile machine on the X-axis. The second point cloud plane and the third point cloud plane correspond to the two wheel assemblies of the autonomous mobile machine respectively, and the corresponding coordinate values of the two wheel assemblies on the X-axis are basically equal. Therefore, in some embodiments, values of coordinates of the center coordinates of the second point cloud plane or the third point cloud plane on the X-axis may be taken as the second axis coordinate value of the center of the autonomous mobile machine.

Specifically, the step of determining, based on the center coordinates of the second point cloud plane and the center coordinates of the third point cloud plane, the second axis coordinate value of the center of the autonomous mobile machine includes: determining an average value of a second axis coordinate value of the center coordinates of the second point cloud plane and a second axis coordinate value of the center coordinates of the third point cloud plane as the second axis coordinate value of the center of the autonomous mobile machine.

With reference to FIG. 24, the center coordinates of the second point cloud plane C2 are denoted as (Rx, Ry), and the center coordinates of the third point cloud plane C3 are denoted as (Lx, Ly).

To minimize errors, the average value of the second axis coordinate value of the center coordinates of the second point cloud plane C2 and the second axis coordinate value of the center coordinates of the third point cloud plane C3 may be taken as the second axis coordinate value, denoted as x_c, of the center of the autonomous mobile machine, where x_c=(Lx+Rx)/2. Thus, the center position of the autonomous mobile machine in the X-axis direction can be determined more accurately, improving the accuracy of the coordinate value of the center of the autonomous mobile machine.

Step S3730: determining, based on the first axis coordinate value, the second axis coordinate value and the fifth point cloud plane, a third axis coordinate value of the center of the autonomous mobile machine.

The third axis coordinate value represents a value of coordinate on the Z-axis corresponding to the center of the autonomous mobile machine. Referring to FIG. 39 again, the fifth point cloud plane C5 is determined based on the point cloud of the plane carrying the autonomous mobile machine, and the autonomous mobile machine is in contact with this plane. Therefore, the third axis coordinate value, denoted as z_c, of the center of the autonomous mobile machine can be determined based on the coordinate value of the fifth point cloud plane C5 on the Z-axis.

The embodiment of the present disclosure provides a method of determining the coordinates of the center of the autonomous mobile machine, which can effectively and accurately determine the coordinate values of the center of the autonomous mobile machine corresponding to three different axial directions.

In some embodiments, the step of determining, based on the first axis coordinate value, the second axis coordinate value and the fifth point cloud plane, the third axis coordinate value of the center of the autonomous mobile machine includes: substituting the first axis coordinate value and the second axis coordinate value into a plane equation of the fifth point cloud plane to obtain the third axis coordinate value of the center of the autonomous mobile machine.

Exemplarily, the plane equation of the fifth point cloud plane C5 is $Ax+By+Cz+D=0$, where A, B, C, and D are all parameters determined based on the point cloud of the plane carrying the autonomous mobile machine. Substitute the aforementioned first axis coordinate value y_c and second axis coordinate value x_c into the plane equation to obtain $Ax\_c+By\_c+Cz+D=0$, and take the solved z value as the third axis coordinate value z_c.

After determining the first axis coordinate value y_c, the second axis coordinate value x_c and the third axis coordinate value z_c of the center of the autonomous mobile machine, the coordinates of the center CP of the autonomous mobile machine, denoted as (x_c, y_c, z_c), can be determined.

Furthermore, the coordinates of the center CP of the autonomous mobile machine may also include the yaw angle yaw_c, the pitch angle pitch_c and the roll angle roll_c determined in the above steps, i.e., the coordinates of the center CP of the autonomous mobile machine is (x_c, y_c, z_c, roll_c, pitch_c, yaw_c), so as to improve the accuracy of the subsequent calibration process.

Optionally, after substituting the first-axis coordinate value y_c and the second-axis coordinate value x_c into the plane equation of the fifth point cloud plane C5, the coordinate value on the Z-axis of a mapping point corresponding to the center of the autonomous mobile machine on the plane carrying the autonomous mobile machine is obtained. The third axis coordinate value z_c of the center of the autonomous mobile machine is determined based on the radius of the wheel assembly of the autonomous mobile machine and the coordinate value of this mapping point on the Z-axis. Exemplarily, a value obtained by adding the radius to the coordinate value of the mapping point on the Z-axis is taken as the third axis coordinate value of the center of the autonomous mobile machine.

In the embodiment of the present disclosure, the third-axis coordinate value of the center of the autonomous mobile machine may be determined based on the fifth point cloud plane and the radius of the wheel assembly of the autonomous mobile machine, further improving accuracy of determination of the coordinate value of the center of the autonomous mobile machine.

In the process of determining the center of the autonomous mobile machine, the center coordinates of the second point cloud plane are used. An example will be provided to illustrate a specific implementation of determining the center coordinates of the second point cloud plane with reference to FIG. 40 in the following.

FIG. 40 is a schematic flowchart of a method for determining center coordinates of a second point cloud plane according to some embodiments of the present disclosure. As shown in FIG. 40, in the embodiment of the present disclosure, the step of determining the center coordinates of the second point cloud plane includes the following steps.

Step S4010: cropping, based on the second point cloud plane and a wheel radius of the first wheel assembly, the sixth point cloud data to obtain wheel point cloud of the first wheel assembly.

Referring to FIG. 39 again, the wheel point cloud of the first wheel assembly is the point cloud data in the sixth point cloud data corresponding to the outer surface of the first wheel assembly A2.

The sixth point cloud data is the point cloud data obtained by collecting the entire first wheel assembly, including, for example, point cloud data of parts such as an outer surface, an inner surface, and a wheel rim of the first wheel assembly. It can be seen that there is point cloud data, that is irrelevant to the second point cloud plane, in the sixth point cloud data. To reduce the amount of calculation and improve the accuracy of the center coordinates, it is necessary to crop the sixth point cloud data.

An example will be provided to illustrate a specific implementation of determining the wheel point cloud of the first wheel assembly with reference to FIG. 41 in the following.

FIG. 41 is a schematic flowchart of a method for determining point cloud of a wheel according to some embodiments of the present disclosure. As shown in FIG. 41, in the embodiment of the present disclosure, the step of cropping, based on the second point cloud plane and the wheel radius of the first wheel assembly, the sixth point cloud data to obtain wheel point cloud of the first wheel assembly include the following steps.

Step S4110: cropping the sixth point cloud data to obtain laser points, lying on the second point cloud plane, of the sixth point cloud data as target point cloud.

With reference to FIGS. 24 and 39, each laser point in the sixth point cloud data is traversed to determine whether the laser point is located on the second point cloud plane C2. If yes, the laser point may be reserved and taken as a point in the target point cloud. Exemplarily, a first reflective layer is attached to the wheel of the first wheel assembly, and the determination of whether a laser point is located on the second point cloud plane C2 may be performed based on an intensity of the laser point. For example, if an intensity of a laser point falls within an intensity range corresponding to the first reflective layer, the laser point may be determined to be located on the second point cloud plane C2; otherwise, it means that the point does not belong to the second point cloud plane C2.

Step S4120: cropping the target point cloud based on the wheel radius of the first wheel assembly to obtain a rough wheel point cloud.

The target point cloud includes points corresponding to the outer surface of the first wheel assembly, as well as noise points outside the outer surface. To remove the noise points, it is necessary to further crop the target point cloud based on the wheel radius. Exemplarily, a second reflective layer is attached to the wheel center of the first wheel assembly; then, based on high reflection of the second reflective layer, a point cloud of high reflection is extracted from the target point cloud. Moreover, points in the target point cloud that are at a distance greater than the wheel radius from the center point of the high reflection points cloud are removed, and the rough wheel point cloud is obtained.

Furthermore, to minimize errors, the target point cloud can be cropped based on a cropping radius larger than the wheel radius to obtain point cloud corresponding to the complete wheel surface. In some embodiments, the step of cropping the target point cloud based on the wheel radius of the first wheel assembly to obtain the rough wheel point cloud includes: adding the wheel radius of the first wheel assembly to a target value to obtain a new wheel radius, and cropping the target point cloud based on the new wheel radius to obtain the rough wheel point cloud.

Specifically, if the wheel radius is r and the target value is m, the new wheel radius is r+m. Exemplarily, the target value may range from 2 cm to 5 cm.

FIG. 42 is a schematic diagram of rough point cloud of a wheel according to some embodiments of the present disclosure. As shown in FIG. 42, taking the new wheel radius as the cropping radius, a point cloud which are at a distance less than or equal to the cropping radius from the wheel axis of the first wheel assembly in the target point cloud are taken as the rough wheel point cloud.

In the embodiment of the present disclosure, cropping errors are taken into account, and the target point cloud is cropped based on a cropping radius larger than the wheel radius, ensuring that the obtained rough wheel point cloud contains the complete wheel surface and avoiding the loss of valid data.

Step S4130: filtering, based on a normal vector of each laser point in the rough wheel point cloud, laser points in the rough wheel point cloud to obtain wheel point cloud of the first wheel assembly.

Since all laser points corresponding to the wheel surface are located on the second point cloud plane, the directions of normal vectors of the laser points on the wheel surface are consistent. Thus, based on the normal vector of each point in the rough wheel point cloud, the noise point in the rough wheel point cloud can be filtered out to obtain an accurate wheel point cloud.

In some embodiments, the step of filtering, based on the normal vector of each laser point in the rough wheel point cloud, the laser points in the rough wheel point cloud to obtain the wheel point cloud of the first wheel assembly includes: acquiring laser points with a normal vector angle greater than a target angle in the rough wheel point cloud by filtering to obtain the wheel point cloud of the first wheel assembly.

The normal vector angle refers to an included angle between the normal vector of the point and the second point cloud plane. The normal vector of a laser point on the wheel surface is perpendicular to the wheel surface. Based on this, the points that belong to the wheel surface in the rough wheel point cloud may be obtained by filtering.

In the embodiment of the present disclosure, since the normal vector angle is less than or equal to 90 degrees, the target angle is set to be less than 90 degrees. Exemplarily, the target angle is 75 degrees. The points whose normal vector angle is greater than 75 degrees are taken as points in the wheel point cloud of the first wheel assembly, while the points whose normal vector angle is less than or equal to 75 degrees are excluded to eliminate the noise.

FIG. 43 is a schematic diagram of a point cloud of a wheel according to some embodiments of the present disclosure. As shown in FIG. 43, through the above steps, the laser points, whose normal vector angle is greater than the target angle, in the rough wheel point cloud are obtained by filtering, and the wheel point cloud of the first wheel assembly is obtained. The shape of this wheel point cloud is more consistent with an actual shape of the wheel.

In the embodiment of the present disclosure, by cropping the point cloud data in the second point cloud plane and retaining only the wheel point cloud of the first wheel assembly, the noise irrelevant to the wheel is eliminated, and the complexity and computational load of subsequent processing are reduced. Furthermore, based on the characteristic that the normal vector of the point on the wheel surface is perpendicular to the wheel surface, the wheel point cloud is filtered out, ensuring the accuracy of the point cloud.

Step S4020: determining, based on the wheel point cloud of the first wheel assembly, wheel edge point cloud data of the first wheel assembly.

In some embodiments, the points in the outermost circle of the wheel point cloud are taken as the wheel edge point cloud. Exemplarily, plane fitting is performed on the wheel point cloud to obtain a fitted surface of the wheel. Then, the outer edge of the wheel is determined based on the fitted surface, and the laser points on the outer edge are taken as the wheel edge point cloud. Referring to FIGS. 42 and 43 again, the outer edge of the wheel determined based on the fitted surface is R1.

An example will be provided to illustrate another method for determining the wheel edge point cloud with reference to FIG. 44 in the following.

FIG. 44 is a schematic flowchart of a method for determining a point cloud of a wheel edge according to some embodiments of the present disclosure. As shown in FIG. 44, in the embodiment of the present disclosure, the step of determining, based on the wheel point cloud of the first wheel assembly, the wheel edge point cloud of the first wheel assembly includes the following steps.

Step S4410: acquiring rough wheel edge point cloud based on the wheel point cloud of the first wheel assembly and the wheel radius of the first wheel assembly.

In the embodiment of the present disclosure, points with distances less than the wheel radius from the wheel axis of the first wheel assembly are removed from the wheel point cloud, and the remaining laser points are used as the rough wheel edge point cloud.

Step S4420: performing circle fitting based on the rough wheel edge point cloud to obtain the wheel edge point cloud.

Since the outer edge of the wheel is approximately circular, circle fitting can be performed on the rough wheel edge point cloud to obtain a more accurate wheel edge point cloud. During the circle fitting process, fitting algorithms such as the least squares method and RANSAC can be used to make the fitted circle closely match the actual wheel edge as much as possible, thereby improving the accuracy of the wheel edge point cloud.

The least squares circle fitting is a method used for fitting a given set of points to a circle. Its goal is to find parameters (such as center coordinates and radius) of a circle corresponding to which the sum of the squares of the distances from these points to the circle is minimized.

A core idea of RANSAC circle fitting is to select a small subset of points from a given point set as samples through random sampling, assuming these sample points are inliers that conform to the model, and then estimate the model parameters based on these inliers. Next, the estimated model is used to test the remaining points, and the number of points whose errors fall within a certain threshold range is calculated—these points are regarded as inliers. By repeating this process several times, the model estimation with the largest number of inliers is selected as the final result, thereby eliminating the interference of outliers and achieving more accurate circle fitting.

In the embodiment of the present disclosure, the wheel edge point cloud obtained through circle fitting can more accurately reflect a shape and a position of the wheel, providing a more reliable data basis for the subsequent determination of the center of the autonomous mobile machine.

Step S4030: acquiring a rough wheel center of the first wheel assembly.

In some embodiments, a second reflective layer is attached to the wheel center of the first wheel assembly; then, based on high reflection of the second reflective layer, a point cloud of high reflection are extracted from the target point cloud. The center of the point cloud of high reflection is determined to be the rough wheel center.

Step S4040: performing, based on the wheel edge point cloud, the wheel radius and the rough wheel center of the first wheel assembly, at least one iterative calculation to obtain a center of the first wheel assembly.

Step S4050: determining coordinates of the center of the first wheel assembly to be the center coordinates of the second point cloud plane.

The embodiment of the present disclosure provides an implementation method for determining the center coordinates of the second point cloud plane, which can effectively and accurately determine the center coordinates of the second point cloud plane; when determining the wheel center, multiple iterations are used for improving the accuracy and reliability of the calculation results. In addition, in the process of determining the center of the autonomous mobile machine, the noise points are effectively removed and the valid points are retained through reasonable cropping, filtering, and fitting processes, further improving the accuracy and efficiency of center coordinate determination.

An example will be provided to illustrate a specific implementation of determining a structural parameter of the autonomous mobile machine in the following.

FIG. 45 is a schematic flowchart of a method for determining a structural parameter according to some embodiments of the present disclosure. As shown in FIG. 45, in the embodiment of the present disclosure, a marking tool is disposed on a part to be measured of the autonomous mobile machine, and the method includes the following steps.

Step S4510: acquiring, based on point cloud data of the marking tool collected by the data acquisition module, position information of the marking tool.

The part to be measured may be any component of the autonomous mobile machine whose structural parameter need to be measured, where the structural parameter includes parameters such as a size, a shape, or a position of the component. For example, the part to be measured may be a wheel or a fork on the autonomous mobile machine.

The marking tool is a device disposed on the part to be measured for assisting in measurement, and it has known structural features, such as specific geometric shapes or sizes.

In some embodiments, the marking tool may be made of a material with high reflectivity to enable effective identification of the part to be measured. Exemplarily, the marking tool may include white foam and/or reflective film. The point cloud data of the marking tool may be collected by the data acquisition module. Then, the marking tool may be identified based on the point cloud data, and a position of the marking tool relative to the data acquisition module is determined to obtain the position information of the marking tool. This position information may include coordinates and a pose of the marking tool in the coordinate system of the data acquisition module.

Step S4520: acquiring, based on the position information of the marking tool and a relative positional relationship between the marking tool and the part to be measured, position information of the part to be measured.

The relative positional relationship between the marking tool and the part to be measured is predetermined when the autonomous mobile machine is placed. For example, the relative positional relationship between the marking tool and the part to be measured can be obtained through methods such as mechanical installation or manual measurement, and this relationship may include a relative distance, an offset angle, and the like. Based on the acquired position information of the marking tool and the aforementioned relative positional relationship between the marking tool and the part to be measured, the position information of the part to be measured in the coordinate system of the data acquisition module can be calculated. This position information may also include the coordinates, attitude, and other parameters of the part to be measured in the coordinate system of the data acquisition module.

Step S4530: extracting, based on the position information of the part to be measured, point cloud data of the part to be measured from the point cloud data of the marking tool collected by the data acquisition module.

In some embodiments, based on the position information of the part to be measured in the coordinate system of the data acquisition module, point cloud data located within a spatial range of the part to be measured can be screened from the point cloud data of the marking tool acquired by the data acquisition module, and used as the point cloud data of the part to be measured. This point cloud data can reflect the structural features of the part to be measured, such as its size and shape.

Step S4540: determining, based on the point cloud data of the part to be measured, a structural parameter of the part to be measured.

In some embodiments, methods such as filtering processing can be applied to the point cloud data of the part to be measured to denoise the point cloud data. Further, feature extraction is performed on the denoised point cloud data to extract key information that reflects the structural features of the part to be measured. The key information includes normal vectors, curvature, and the like. Based on the extracted key information, methods such as geometric calculation are used to calculate the structural parameters of the part to be measured.

In the embodiment of the present disclosure, the automatic measurement of the structural parameter of the part to be measured on the autonomous mobile machine is achieved through the marking tool. This method does not require manual participation in the measurement process, which reduces labor costs and improves the accuracy and efficiency of measurement at the same time.

FIG. 46 is a schematic flowchart of a method for determining a structural parameter according to another embodiment of the present disclosure. As shown in FIG. 46, in the embodiment of the present disclosure, the method includes the following steps.

Step S4610: acquiring point cloud data of the autonomous mobile machine through the data acquisition module.

Step S4620: performing point cloud segmentation on the point cloud data to obtain point cloud data of a part to be measured of the autonomous mobile machine.

Step S4630: determining a structural parameter of the part to be measured based on the point cloud data of the part to be measured.

In some embodiments, the point cloud data can be segmented based on the geometric features of the part to be measured to obtain the point cloud data of the part to be measured; alternatively, clustering processing can be performed on the point cloud data, the point cloud data can be segmented based on the clustering results, and then the point cloud data corresponding to the part to be measured can be identified from the segmented point cloud data according to the geometric features of the part to be measured.

In the embodiment of the present disclosure, the structural parameters of the part to be measured is automatically determined without requiring additional tooling for the autonomous mobile machine. This simplifies the operation process, reduces calibration costs, offers high usability, and has a wider range of applicable scenarios.

An example will be provided to illustrate a specific implementation of calibrating an encoder with reference to FIG. 47 in the following.

FIG. 47 is a schematic flowchart of a method for calibrating an encoder according to some embodiments of the present disclosure. As shown in FIG. 47, in the embodiment of the present disclosure, the autonomous mobile machine includes a material handling equipment, and the material handling equipment includes a fork assembly and an encoder. The method includes the following steps.

Step S4710: controlling the fork assembly to move to a designated position.

The encoder is a sensor mounted on the fork assembly, used for accurately measuring vertical displacement, horizontal displacement, and length displacement of the fork assemble. Encoder readings can be used to determine the position and angle parameters of the fork assembly.

In some embodiments, the designated position may be any one of multiple different vertical positions.

Step S4720: acquiring a target movement amount and controlling, based on the target movement amount, the fork assembly to move.

The target movement amount refers to the designated spatial displacement of the fork assembly in space, and this spatial displacement can be the displacement in a vertical direction, a horizontal direction, or a length direction.

In some embodiments, the fork assembly is controlled to move by the target movement amount based on the encoder reading. During the process of controlling the fork assembly to move by the target movement amount, the encoder records the movement amount of the fork assembly in real time. When the movement amount determined by the encoder is consistent with the target movement amount, the movement of the fork assembly is stopped. Exemplarily, a numerical reading value of the encoder before the fork assembly moves is a third value, and a numerical reading value of the encoder after the fork assembly moves is a fourth value.

Step S4730: acquiring a current position of the fork assembly based on point cloud data of the fork assembly collected by the data acquisition module, and calibrating the encoder based on the current position and the target movement amount.

In some embodiments, first the fork assembly is identified based on the point cloud data of the fork assembly obtained by the data acquisition module, and the current position of the fork assembly is determined. This current position may include coordinates, a pose, and other parameters of the fork assembly in the coordinate system of the data acquisition module. Based on the current position and the designated position, the actual displacement of the fork assembly may be calculated. Then, the encoder is calibrated using the actual displacement, the third value, and the fourth value to reduce measurement error of the encoder.

Exemplarily, a linear fitting method is adopted to calculate the zero point and scaling factor of the encoder based on the actual displacement, the third value, and the fourth value. This further establishes the correlation between the encoder readings and the displacement of the fork assembly, thereby completing the calibration of the encoder.

In the embodiment of the present disclosure, the encoder may be accurately calibrated based on the point cloud data of the fork assembly acquired by the data acquisition module. This calibration method not only improves the accuracy of calibration but also ensures the accurate operation of the encoder in the material handling equipment, thereby enhancing the overall performance and stability of the material handling equipment.

The calibration of the LiDAR on the autonomous mobile machine, the determination of the structural parameters and the center point of the autonomous mobile machine, and the calibration of the encoder, as proposed in the above embodiments, can all be implemented through the interaction between a client interface, a server and a control system. FIG. 48 is a schematic diagram of interaction according to some embodiments of the present disclosure. As shown in FIG. 48, in the embodiment of the present disclosure, firstly, the server is initialized, and then a calibration task is started in response to a triggering operation for the calibration process on the client interface. The point cloud data collected by the data acquisition module are detected by the server continuously and transmitted to the control system for calibration of the autonomous mobile machine. In response to a triggering operation of calibration diagnosis on the client interface, a diagnosis request is generated by the server and sent to the control system. The control system then performs self-diagnosis for the calibration of the autonomous mobile machine, which refers to diagnosis on the calibration results to improve reliability and accuracy of the calibration results. In response to a triggering operation for writing of the calibration results on the client interface, a result writing request is sent to the control system by the server, enabling the control system to write the calibration results into a parameter configuration tool.

Figure 49:
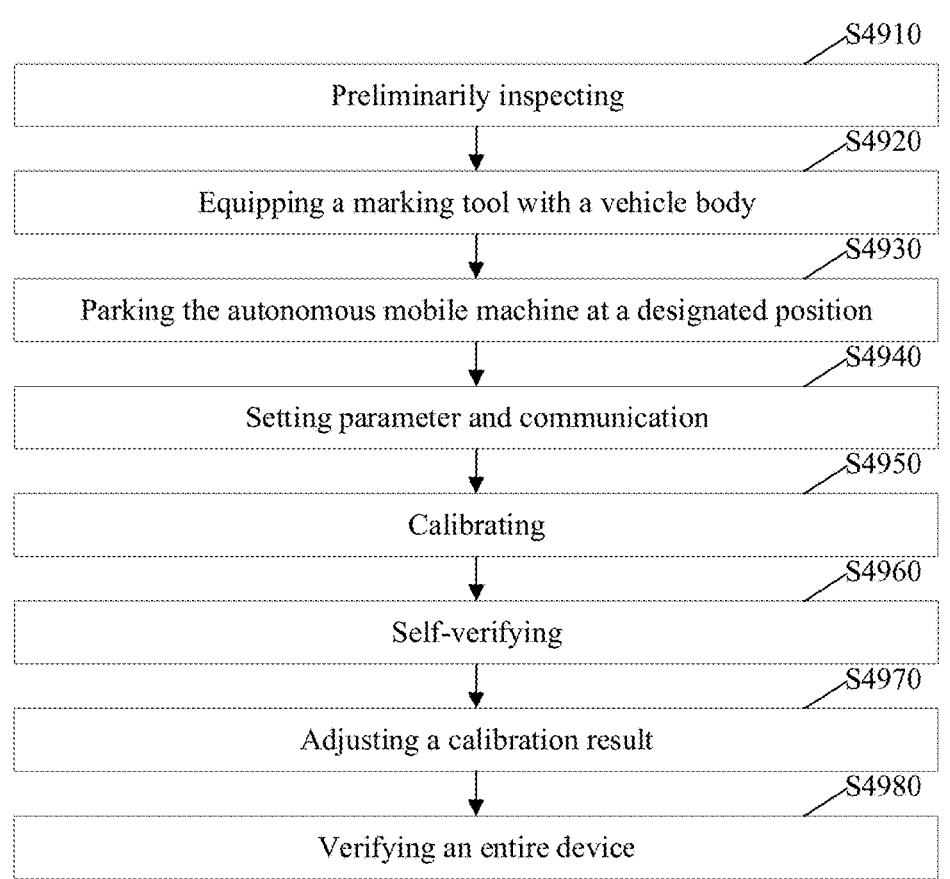
FIG. 49 is a schematic flowchart of a calibration method using a calibration room according to some embodiments of the present disclosure.

An example will be provided to illustrate a specific implementation of a calibration operation process in the following. As shown in FIG. 49, a usage process of the calibration room includes the following steps.

Step S4910: preliminarily inspecting. Before calibration, a preliminary inspection is conducted, i.e., checking whether devices required for calibration is complete. If the devices required for calibration is complete, the next step will be executed; if there is a missing of a required device, the device configuration will be executed first.

Step S4920: equipping a marking tool with a vehicle body. After passing the preliminary inspection, the marking tool is equipped on the vehicle body of the autonomous mobile machine. The marking tool may include white foam and magnetic strips, so that the white foam may be attached to the component of the autonomous mobile machine (e.g., the fork assembly and wheel assembly). The marking tool may help screen out the point cloud data of a component of the autonomous mobile machine, thereby determining the center of the autonomous mobile machine.

Step S4930: parking the autonomous mobile machine at a designated position. The autonomous mobile machine is parked at the designated position to improve calibration accuracy. Exemplarily, pre-marked parking lines can be used for parking the autonomous mobile machine in the pre-set optimal calibration region.

Step S4940: setting parameter and communication. To enable interaction between the server and the control system, communication between them may be established. For example, wireless communication can be adopted between the server and the control system.

Step S4950: calibrating. The calculation module in the control system is configured to perform calibration to complete calibration and write down the calibration results. Exemplarily, a calibration command may be input through the client interface. After receiving the calibration command, the server is configured to control the control system to perform the calibration operation, that is, automatically complete data detection, parameter calculation, and multi-LiDAR registration, and finally obtain the calibration results.

Step S4960: self-verifying. Finally, self-verification is conducted to verify whether there are errors in the calibration result.

Step S4970: adjusting a calibration result. If the autonomous mobile machine is a forklift, to further improve the accuracy of the calibration result, the calibration result may be fine-tuned based on a handling errors of the forklift in practice.

Step S4980: verifying an entire device. A stacking and picking environment may be simulated or actually set up to verify stability of the entire device in stacking and picking scenarios. Additionally, the autonomous mobile machine may be controlled to execute a same navigation task for multiple times to ensure the consistency of the results of multiple navigation tasks. Moreover, for a plurality of autonomous mobile machines calibrated, a same working environment may be set up, and each autonomous mobile machine is controlled to perform the same work to evaluate the consistency among the plurality of autonomous mobile machines.

Figure 50:
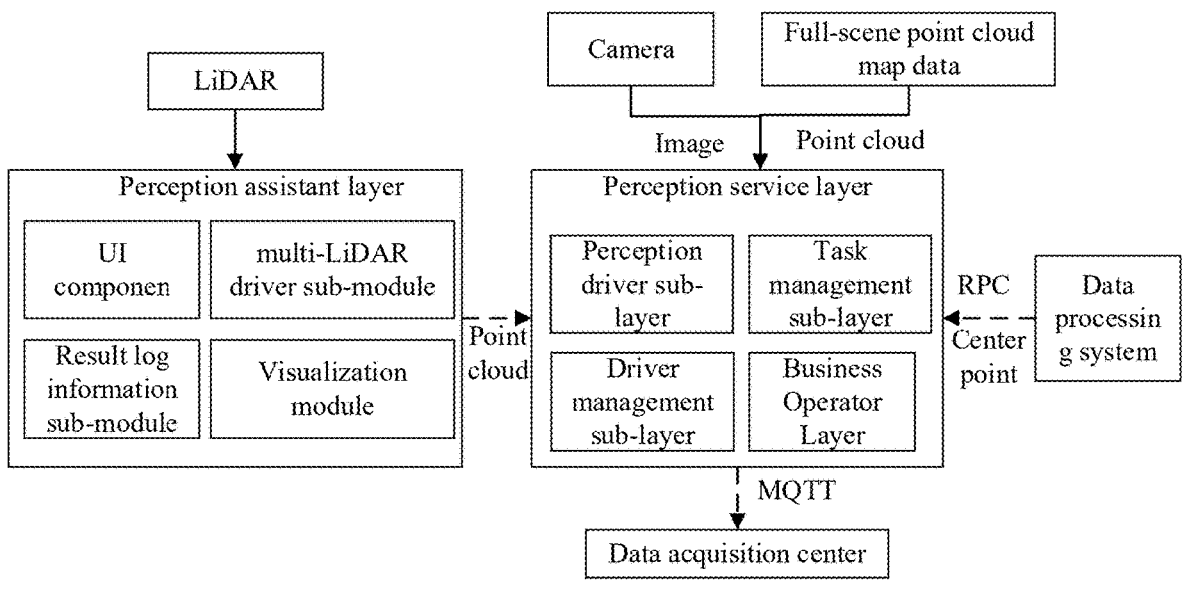
FIG. 50 is a schematic structural diagram of a calibration software system according to some embodiments of the present disclosure.

An example will be provided to illustrate the composition of a calibration software system for calibrating an automated guided forklift in an application scenario where the autonomous mobile machine is the automated guided forklift with reference to FIG. 50 in the following. FIG. 50 is a schematic structural diagram of a calibration software system according to some embodiments of the present disclosure. As shown in FIG. 50, the calibration software system mainly includes a perception service layer, a data processing system, and a data acquisition center.

In some embodiments, the perception service layer includes a perception driving sub-layer, a task management sub-layer, a driver management sub-layer, and a business sub-layer. It is used for receiving the coordinates of the center of the automated guided forklift in the coordinate system of the calibration room input by the data processing system, and calculate the transformation relationship between the coordinate system of the LiDAR to be calibrated and the coordinate system of the automated guided forklift based on the first point cloud data of the calibration room. Exemplarily, a handheld mapping device can be used for collecting the full-scene point cloud map data of the calibration room, and this full-scene point cloud map data is used as the first point cloud data. Additionally, a camera can be used for collecting images of the automated guided forklift and the calibration room. The data processing system is used for determining the coordinates of the center of the automated guided forklift in the coordinate system of the calibration room using the data acquisition module and send them to the perception service layer. The data acquisition center is used for storing initialization parameters and calibration results. The perception service layer and the data acquisition center can transmit data through the MQTT protocol, while the perception service layer and the data processing system can transmit data through the RPC (Remote Procedure Call) protocol.

In other embodiments, the calibration software system further includes a perception assistant layer. The perception assistant layer is connected to both the LiDAR to be calibrated and the perception service layer, and is used for obtaining the point cloud data collected by the LiDAR and transmit the point cloud data to the perception service layer. The perception assistant layer contains a plurality of key sub-modules: UI component, used for providing a user interaction interface, facilitating user operations and information reading; multi-LiDAR driver sub-module, responsible for the driving and control functions of a plurality of LiDARs, enabling multi-sensor collaborative work; result log information sub-module, used for recording the calibration results generated during the system operation; visualization sub-module, used for displaying the calibration result.

Next, a specific implementation of a calibration algorithm for an autonomous mobile machine is illustrated with reference to FIG. 51. In the embodiment of the present disclosure, the autonomous mobile machine includes an automated guided forklift.

Figure 51:
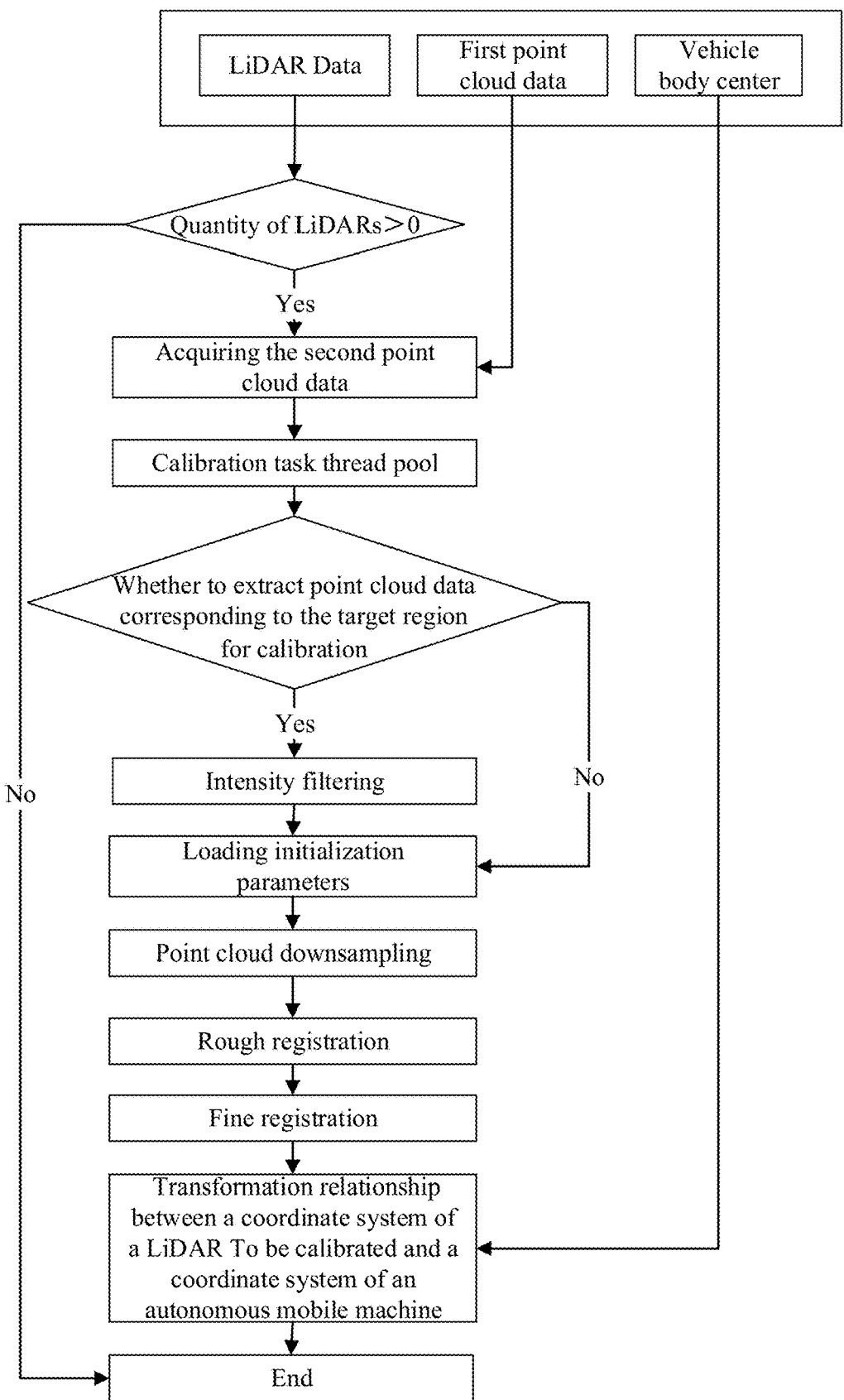
FIG. 51 is a schematic flowchart of a calibration method for an automated guided forklift according to some embodiments of the present disclosure.

FIG. 51 is a schematic flowchart of a calibration method for an automated guided forklift according to some embodiments of the present disclosure. As shown in FIG. 51, point cloud data can first be collected in a calibration room, and the first point cloud data can be obtained after data processing. The automated guided forklift is driven to a designated position in the calibration room, and this position is determined based on the acquisition field of view of the LiDAR to be calibrated and the data acquisition module.

Further, the coordinates of vehicle body center of the automated guided forklift in the coordinate system of the calibration room are determined through the data processing system, and the first transformation relationship is confirmed based on these coordinates. After receiving the first transformation relationship, the automated guided forklift side starts to acquire point cloud data collected by the LiDARs to be calibrated, identifies the number of such LiDARs disposed on the forklift, and automatically acquires the second point cloud data of a marker in the calibration room collected by the corresponding LiDARs to be calibrated, then initiates a task thread for independent calibration with progress tracking. If a quantity of LiDARs to be calibrated is no greater than 0, the calibration process is terminated. If the number exceeds 0, it starts loading the first point cloud data and activates each task thread in the calibration task thread pool. If the option to extract point cloud data corresponding to the target region for calibration is selected, point cloud data meeting the filtering condition is filtered out from both the first point cloud data and second point cloud data to eliminate noise. The filtering condition includes: belonging to the target region and with an intensity higher than an intensity threshold. Further, initialization parameters can be loaded, the initialization parameters includes the initial transformation relationship between the coordinate system of the LiDAR and the coordinate system of the calibration room. If the option to extract point cloud data corresponding to the target region for calibration is not selected, the initialization parameters can be loaded directly. After loading the initialization parameters, point cloud down sampling is performed on the first point cloud data and second point cloud data. The first point cloud data is updated with the down sampled result of itself, and the second point cloud data is updated similarly, which reduces the computational load. Additionally, rough registration is first performed on the two sets of point cloud data; based on the transformation matrix obtained from the rough registration, fine registration is then performed. Finally, the second transformation relationship (i.e., the transformation between the coordinate system of the LiDAR and the coordinate system of the calibration room) is obtained. Using the determined first transformation relationship and second transformation relationship, the transformation relationship between the coordinate system of the LiDAR and the coordinate system of the autonomous mobile machine is acquired as the calibration result.

The calibration algorithm proposed in the embodiment significantly improves the efficiency, accuracy, and consistency of multi-LiDAR calibration for automated guided forklifts. Taking a vehicle model with five LiDARs as an example, from actual test results, the algorithm time per LiDAR has been reduced from the original 30 minutes to a maximum of 90 seconds, the total calibration time for all LiDARs has been reduced from over 2 hours to less than 10 minutes, and the calibration accuracy has been improved from the previous registration error of 2 cm to less than 5 mm.

Based on the same concept, the embodiment of the present disclosure further provides an autonomous mobile machine. The autonomous mobile machine is provided with a LiDAR to be calibrated and the LiDAR to be calibrated is calibrated by the calibration method provided in the embodiments of the present disclosure.

During the calibration of the autonomous mobile machine in the embodiments of the present disclosure, no manual operation is required, realizing a high degree of automation, convenience and efficiency. Calibration is performed based on data acquired by the data acquisition module, which ensures data consistency and improves the accuracy of calibration results. Additionally, the calibration room is used for accommodating the autonomous mobile machine; that is, the calibration room occupies little space, which enhances usability.

Based on the same concept, the embodiment of the present disclosure further provides a control system. The control system is used for executing program instructions to implement the calibration method provided in the embodiments of the present disclosure.

The calibration method mentioned in the above embodiments may be executed not only by the control system, but also by other hardware devices, such as cloud-deployed servers or controllers, which is not limited in the present disclosure. An example is given below with reference to FIG. 52.

Figure 52:
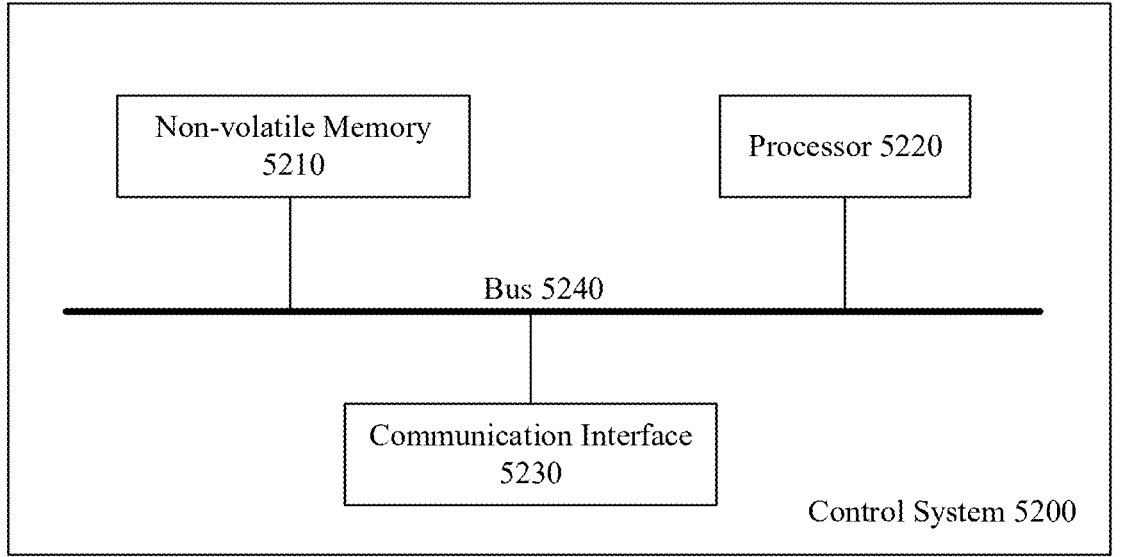
FIG. 52 is a schematic structural diagram of a control system according to another embodiment of the present disclosure.

FIG. 52 is a schematic structural diagram of a control system according to another embodiment of the present disclosure. The control system 5200 shown in FIG. 52 includes a non-volatile memory 5210, a processor 5220, a communication interface 5230, and a bus 5240. The non-volatile memory 5210, the processor 5220 and the communication interface 5230 are connected to each other through communication via the bus 5240.

The non-volatile memory 5210 is used to store program instructions and includes a Read Only Memory (ROM), a static storage device, a dynamic storage device, or a Random Access Memory (RAM), etc. The non-volatile memory 5210 is used to store computer programs. When the computer program stored in the non-volatile memory 5210 is executed by the processor 5220, the processor 5220 and the communication interface 5230 are used to execute each step of the calibration method according to the embodiments of the present disclosure.

The processor 5220 may adopt a general-purpose Central Processing Unit (CPU), microprocessor, Application Specific Integrated Circuit (ASIC), Graphics Processing Unit (GPU), or one or more integrated circuits, and is used for executing relevant programs to implement the functions that the control system needs to perform according to the embodiments of the present disclosure.

Specifically, the processor 5220 is used for executing program instructions to implement the following steps: acquiring first point cloud data of a calibration room, where the first point cloud data is full-scene point cloud map data of the calibration room; calculating, based at least on the first point cloud data and coordinate system data of the autonomous mobile machine, a first transformation relationship, where the first transformation relationship is a transformation relationship between a coordinate system of the autonomous mobile machine and a coordinate system of the calibration room; acquiring second point cloud data of a marker in the calibration room through the LiDAR to be calibrated; performing registration on the second point cloud data and the first point cloud data to obtain a second transformation relationship, where the second transformation relationship is a transformation relationship between a coordinate system of the LiDAR to be calibrated and the coordinate system of the calibration room; and acquiring, based on the first transformation relationship and the second transformation relationship, a transformation relationship between the coordinate system of the LiDAR to be calibrated and the coordinate system of the autonomous mobile machine as a calibration result.

The processor 5220 may also be an integrated circuit chip with signal processing capabilities. In the implementation process, each step of the calibration method of the present disclosure may be completed through integrated logic circuits of hardware in the processor 5220 or instructions in the form of software. The aforementioned processor 5220 may also be a general-purpose processor, Digital Signal Processor (DSP), Application Specific Integrated Circuit (ASIC), Field Programmable Gate Array (FPGA), or other programmable logic devices, discrete gate or transistor logic devices, discrete hardware components, etc. It can implement or execute the methods, steps, and logical block diagrams disclosed in the embodiments of the present disclosure. A general-purpose processor may be a microprocessor, or the processor may also be any conventional processor, etc. The steps of the method disclosed in conjunction with the embodiments of the present disclosure may be directly implemented by a hardware decoding processor, or implemented by a combination of hardware and software modules in the decoding processor. The software module may be located in a mature storage medium in the art, such as random access memory, flash memory, read-only memory, programmable read-only memory, electrically erasable programmable memory, or registers. The storage medium is located in the non-volatile memory 5210, and the processor 5220 reads information in the non-volatile memory 5210 and, in combination with its hardware, completes the functions that the control system needs to perform according to the embodiments of the present disclosure, or executes the calibration method according to the method embodiments of the present disclosure.

The communication interface 5230 uses a transceiver device such as but not limited to a transceiver to implement communication between the control system 5200 and other devices or communication networks. For example, sensor data can be obtained through the communication interface 5230.

The bus 5240 may include paths for transmitting information between various components of the control system 5200 (e.g., the non-volatile memory 5210, the processor 5220, and the communication interface 5230).

Although the control system 5200 shown in FIG. 52 only illustrates the memory, the processor, and the communication interface, in actual implementation, those skilled in the art should understand that the control system 5200 also includes other components necessary for normal operation. Meanwhile, according to specific needs, those skilled in the art should understand that the control system 5200 may also include hardware components for additional functions. In addition, those skilled in the art should understand that the control system 5200 may only include the components necessary to implement the embodiments of the present disclosure, and need not include all the components shown in FIG. 52.

In addition to the aforementioned method, calibration room, and autonomous mobile machine, the embodiments of the present disclosure may also be a computer program product, which includes computer program instructions. When executed by a processor, these computer program instructions implement each step of the calibration method provided by the various embodiments of the present disclosure.

The computer program product may be written in any combination of one or more programming languages to execute program codes for implementing the operations of the embodiments of the present disclosure. The programming languages include object-oriented programming languages such as Java, C++, etc., and also include conventional procedural programming languages such as C, or similar programming languages. The program code may be executed entirely on the user's computing device, partially on the user's device, as an independent software package, partially on the user's computing device and partially on a remote computing device, or entirely on the remote computing device or server.

Furthermore, the embodiments of the present disclosure may also be a computer-readable storage medium, on which computer program instructions are stored. When executed by a processor, these computer program instructions implement each step of the calibration method provided by the various embodiments of the present disclosure.

What is claimed is:

1. A calibration method applied to an autonomous mobile machine, wherein a LiDAR to be calibrated is disposed on the autonomous mobile machine, and the method comprises:

acquiring first point cloud data of a calibration room, wherein the first point cloud data is full-scene point cloud map data of the calibration room;

calculating, based at least on the first point cloud data and coordinate system data of the autonomous mobile machine, a first transformation relationship, wherein the first transformation relationship is a transformation relationship between a coordinate system of the autonomous mobile machine and a coordinate system of the calibration room;

acquiring second point cloud data of a marker in the calibration room through the LiDAR to be calibrated;

performing registration on the second point cloud data and the first point cloud data to obtain a second transformation relationship, wherein the second transformation relationship is a transformation relationship between a coordinate system of the LiDAR to be calibrated and the coordinate system of the calibration room; and acquiring, based on the first transformation relationship and the second transformation relationship, a transformation relationship between the coordinate system of the LiDAR to be calibrated and the coordinate system of the autonomous mobile machine as a calibration result.

2. The calibration method according to claim 1, wherein a quantity of the LiDAR to be calibrated is greater than one;

the acquiring the second point cloud data of the marker in the calibration room through the LiDAR to be calibrated comprises:

acquiring the second point cloud data of the marker in the calibration room through each LiDAR to be calibrated;

the performing registration on the second point cloud data and the first point cloud data to obtain the second transformation relationship comprises:

performing registration on the first point cloud data and the second point cloud data corresponding to each LiDAR to be calibrated to obtain the second transformation relationship corresponding to each LiDAR to be calibrated; and the acquiring, based on the first transformation relationship and the second transformation relationship, the transformation relationship between the coordinate system of the LiDAR to be calibrated and the coordinate system of the autonomous mobile machine as the calibration result comprises:

acquiring, based on the first transformation relationship and the second transformation relationship corresponding to each LiDAR to be calibrated, the transformation relationship between the coordinate system of each LiDAR to be calibrated and the coordinate system of the autonomous mobile machine as the calibration result.

3. The calibration method according to claim 2, before the performing registration on the first point cloud data and the second point cloud data corresponding to each LiDAR to be calibrated to obtain the second transformation relationship corresponding to each LiDAR to be calibrated, further comprising:

generating a calibration task thread pool based on a plurality of LiDARs to be calibrated, wherein the calibration task thread pool comprises a plurality of calibration task threads, and the plurality of calibration task threads are in a one-to-one correspondence with the plurality of LiDARs to be calibrated; and starting a calibration task thread corresponding to a target LiDAR to be calibrated to calibrate the target LiDAR to be calibrated after acquiring the second point cloud data corresponding to the target LiDAR to be calibrated, wherein the target LiDAR to be calibrated is one of the plurality of LiDARs to be calibrated.

4. The calibration method according to claim 3, wherein a quantity of the target LiDAR to be calibrated is greater than one; and the starting the calibration task thread corresponding to the target LiDAR to be calibrated to calibrate the target LiDAR to be calibrated after acquiring the second point cloud data corresponding to the target LiDAR to be calibrated comprises:

starting the calibration task thread corresponding to each of the plurality of target LiDARs to be calibrated in parallel to calibrate the plurality of target LiDARs to be calibrated after acquiring the second point cloud data corresponding to each of the plurality of target LiDARs to be calibrated.

5. The calibration method according to claim 1, wherein the performing registration on the second point cloud data and the first point cloud data to obtain the second transformation relationship comprises:

performing, based on a point cloud registration algorithm, rough registration and fine registration in sequence on the second point cloud data and the first point cloud data to obtain the second transformation relationship.

6. The calibration method according to claim 5, wherein the point cloud registration algorithm comprises an iterative closest point algorithm and a generalized iterative closest point algorithm; and the performing, based on the point cloud registration algorithm, the rough registration and the fine registration in sequence on the second point cloud data and the first point cloud data to obtain the second transformation relationship comprises:

performing, based on the iterative closest point algorithm, the rough registration on the second point cloud data and the first point cloud data to obtain a first transformation matrix; and taking the first transformation matrix as an initialization parameter of the generalized iterative closest point algorithm, and performing, based on the generalized iterative closest point algorithm, the fine registration on the second point cloud data and the first point cloud data to obtain the second transformation relationship.

7. The calibration method according to claim 1, wherein the calibration room is provided with a data acquisition module; and the calculating, based at least on the first point cloud data and the coordinate system data of the autonomous mobile machine, the first transformation relationship comprises:

acquiring third point cloud data of the marker in the calibration room through the data acquisition module;

performing registration on the third point cloud data and the first point cloud data to obtain a third transformation relationship, wherein the third transformation relationship is a transformation relationship between a coordinate system of the data acquisition module and the coordinate system of the calibration room;

acquiring fourth point cloud data of the autonomous mobile machine collected by the data acquisition module, and determining, based on the fourth point cloud data, a fourth transformation relationship, wherein the fourth transformation relationship is a transformation relationship between the coordinate system of the autonomous mobile machine and the coordinate system of the data acquisition module; and acquiring, based on the third transformation relationship and the fourth transformation relationship, the first transformation relationship.

8. The calibration method according to claim 7, wherein the acquiring the fourth point cloud data of the autonomous mobile machine collected by the data acquisition module, and determining, based on the fourth point cloud data, the fourth transformation relationship comprises:

acquiring coordinates of a center of the autonomous mobile machine in the coordinate system of the autonomous mobile machine;

calculating, based on the fourth point cloud data of the autonomous mobile machine collected by the data acquisition module, coordinates of the center of the autonomous mobile machine in the coordinate system of the data acquisition module; and determining, based on the coordinates of the center of the autonomous mobile machine in the coordinate system of the data acquisition module and the coordinates of the center of the autonomous mobile machine in the coordinate system of the autonomous mobile machine, the fourth transformation relationship.

9. The calibration method according to claim 1, wherein the calibration room is provided with a positioning device, and the positioning device is configured to assist in positioning the autonomous mobile machine in the calibration room.

10. The calibration method according to claim 9, wherein the calibration room is provided with a data acquisition module; and the positioning device comprises:

a guiding component, configured to guide the autonomous mobile machine to a designated position; and/or a parking measurement component, configured to assist the data acquisition module in detecting the autonomous mobile machine.

11. The calibration method according to claim 1, before the acquiring the second point cloud data of the marker in the calibration room through the LiDAR to be calibrated, further comprising:

controlling the autonomous mobile machine to move to a designated position in the calibration room.

12. The calibration method according to claim 1, wherein the calibration room comprises a target region, and the target region is a region with a point feature, a line feature and/or a surface feature; and the performing registration on the second point cloud data and the first point cloud data to obtain the second transformation relationship comprises:

performing registration on point cloud data of the target region in the first point cloud data and point cloud data of the target region in the second point cloud data to obtain the second transformation relationship.

13. The calibration method according to claim 12, wherein the performing registration on point cloud data of the target region in the first point cloud data and point cloud data of the target region in the second point cloud data to obtain the second transformation relationship comprises:

determining, based on the point cloud data of the target region in the first point cloud data, a first vector;

determining, based on the point cloud data of the target region in the second point cloud data, a second vector;

determining, based on the first vector and the second vector, a rotation matrix of the coordinate system of the LiDAR to be calibrated relative to the coordinate system of the calibration room;

determining first coordinates of a position point in the first point cloud data and second coordinates of the position point in the second point cloud data;

calculating, based on the rotation matrix, the first coordinates and the second coordinates, third coordinates, wherein the third coordinates are coordinates of an origin of the coordinate system of the LiDAR to be calibrated in the coordinate system of the calibration room; and determining the rotation matrix and the third coordinate to be the second transformation relationship.

14. The calibration method according to claim 13, wherein the target region comprises an intersection region of inner wall planes of the calibration room, and the intersection region of inner wall planes comprises two intersecting planes or three mutually intersecting planes.

15. The calibration method according to claim 1, wherein the calibration room comprises a first marking component, the first marking component is disposed on an inner wall of the calibration room, and the first marking component comprises a plurality of first markers arranged in an array.

16. The calibration method according to claim 15, wherein the calibration room further comprises a second marking component, the second marking component is disposed on the inner wall of the calibration room, the second marking component comprises a plurality of second markers arranged in an array, and the plurality of first markers and the plurality of second markers are arranged alternately in sequence.

17. The calibration method according to claim 16, wherein the plurality of first markers and the plurality of second markers are arranged in a checkerboard pattern.

18. The calibration method according to claim 1, before the performing registration on the second point cloud data and the first point cloud data to obtain the second transformation relationship, further comprising:

performing preprocessing on the second point cloud data, wherein the preprocessing comprises at least one of initial parameter transformation, point cloud filtering, and point cloud down sampling.

19. An autonomous mobile machine, wherein a LiDAR to be calibrated is disposed on the autonomous mobile machine, and the LiDAR to be calibrated is calibrated by the calibration method according to claim 1.

20. A control system, comprising:

a processor and a non-transitory memory, wherein the non-transitory memory is configured to store program instructions; and the processor is configured to execute the program instructions to implement the following steps:

acquiring first point cloud data of a calibration room, wherein the first point cloud data is full-scene point cloud map data of the calibration room;

calculating, based at least on the first point cloud data and coordinate system data of the autonomous mobile machine, a first transformation relationship, wherein the first transformation relationship is a transformation relationship between a coordinate system of the autonomous mobile machine and a coordinate system of the calibration room;

acquiring second point cloud data of a marker in the calibration room through the LiDAR to be calibrated;

performing registration on the second point cloud data and the first point cloud data to obtain a second transformation relationship, wherein the second transformation relationship is a transformation relationship between a coordinate system of the LiDAR to be calibrated and the coordinate system of the calibration room; and acquiring, based on the first transformation relationship and the second transformation relationship, a transformation relationship between the coordinate system of the LiDAR to be calibrated and the coordinate system of the autonomous mobile machine as a calibration result.

* * * * *